US011783358B2

(12) United States Patent
Mimassi

(10) Patent No.: US 11,783,358 B2
(45) Date of Patent: *Oct. 10, 2023

(54) SYSTEM AND METHOD FOR CUSTOMER AND BUSINESS REFERRAL WITH A CONCIERGE SYSTEM

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,360

(22) Filed: Jan. 18, 2022

(65) Prior Publication Data
US 2022/0148025 A1     May 12, 2022

Related U.S. Application Data

(63) Continuation-in-part of application No. 17/097,443, filed on Nov. 13, 2020, now Pat. No. 11,257,105, (Continued)

(51) Int. Cl.
*G06Q 30/00* (2023.01)
*G06Q 30/0214* (2023.01)
*G06Q 20/36* (2012.01)

(52) U.S. Cl.
CPC ......... *G06Q 30/0214* (2013.01); *G06Q 20/36* (2013.01)

(58) Field of Classification Search
None
See application file for complete search history.

(56) References Cited

U.S. PATENT DOCUMENTS 9,330,386 B2 * 5/2016 Hill ..................... G06K 7/0008
9,530,128 B1 * 12/2016 Bekmann ............... G06Q 20/34
(Continued)

FOREIGN PATENT DOCUMENTS

EP    3532900 A4 *  7/2020 ............. G06Q 50/10
JP    2019040298 A *  3/2019 ............. G06Q 30/02
(Continued)

OTHER PUBLICATIONS

Entrepreneur Media, Inc. Personal Concierge Service. (2012). Retrieved online Mar. 20, 2021. https://irp-cdn.multiscreensite.com/1c74f035/files/uploaded/SYO%20Personal%20Concierge%2C%203E%20compile.pdf (Year: 2012).*
(Continued)

*Primary Examiner* — James A Reagan
(74) *Attorney, Agent, or Firm* — Galvin Patent Law LLC; Brian R. Galvin

(57) ABSTRACT

A system and method for customer and business referral with a concierge system, comprising a database comprising customer and business information, a mobile device operating a concierge application, and a referral engine, to allow users to register for and install the concierge application, and use it to place orders for products, services, or reservations with participating businesses, gives or place these orders for other users who approve of receiving the product, service, or reservation, and compensating concierge application users who have a commercial interest in operating the application, called a commercial concierge, who may be compensated for referring users to various businesses for products, services, or reservations the user may enjoy or be searching for, in lieu of a traditional concierge that may help refer customers manually.

8 Claims, 36 Drawing Sheets

Related U.S. Application Data which is a continuation-in-part of application No. 17/091,925, filed on Nov. 6, 2020, now Pat. No. 11,334,866, which is a continuation-in-part of application No. 17/005,038, filed on Aug. 27, 2020, now Pat. No. 11,232,426, which is a continuation-in-part of application No. 16/796,342, filed on Feb. 20, 2020, now Pat. No. 10,803,442.

(60) Provisional application No. 63/073,814, filed on Sep. 2, 2020, provisional application No. 63/070,895, filed on Aug. 27, 2020, provisional application No. 62/964,413, filed on Jan. 22, 2020, provisional application No. 62/938,817, filed on Nov. 21, 2019.

(56) References Cited

U.S. PATENT DOCUMENTS

| | | | | |
|---|---|---|---|---|
| 9,686,386 | B1* | 6/2017 | Kubasik | G06Q 10/1093 |
| 9,946,998 | B1* | 4/2018 | Acharya | G06F 40/174 |
| 2002/0006787 | A1* | 1/2002 | Darby | G06Q 50/00 |
| | | | | 455/419 |
| 2003/0013438 | A1* | 1/2003 | Darby | H04L 67/00 |
| | | | | 455/419 |
| 2007/0260591 | A1* | 11/2007 | Ahi | G06Q 10/109 |
| 2008/0294469 | A1* | 11/2008 | Caballero | G06Q 50/14 |
| | | | | 705/5 |
| 2009/0234773 | A1* | 9/2009 | Hasson | G06Q 20/322 |
| | | | | 705/44 |
| 2010/0114773 | A1* | 5/2010 | Skowronek | G06Q 40/02 |
| | | | | 705/44 |
| 2011/0054978 | A1* | 3/2011 | Mohil | G06Q 10/06 |
| | | | | 705/7.18 |
| 2011/0231315 | A1* | 9/2011 | Bandyopadhyay | G06Q 20/10 |
| | | | | 705/44 |
| 2012/0190386 | A1* | 7/2012 | Anderson | G01S 19/14 |
| | | | | 455/456.3 |
| 2012/0209749 | A1* | 8/2012 | Hammad | G06Q 20/326 |
| | | | | 705/27.1 |
| 2012/0284187 | A1* | 11/2012 | Hammad | G06Q 20/32 |
| | | | | 705/44 |
| 2013/0012324 | A1* | 1/2013 | Amaitis | G06F 3/048 |
| | | | | 463/43 |
| 2013/0166329 | A1* | 6/2013 | Arnoux-Prost | G06Q 10/02 |
| | | | | 705/5 |
| 2013/0166332 | A1* | 6/2013 | Hammad | G06Q 20/12 |
| | | | | 705/28 |
| 2013/0304527 | A1* | 11/2013 | Santos, III | G06Q 30/0239 |
| | | | | 705/5 |
| 2014/0039912 | A1* | 2/2014 | Turinas | H04W 12/06 |
| | | | | 705/2 |
| 2014/0129453 | A1* | 5/2014 | Brazell | G06Q 30/016 |
| | | | | 705/304 |
| 2015/0039357 | A1* | 2/2015 | Segal | G06Q 10/10 |
| | | | | 705/5 |
| 2015/0248664 | A1* | 9/2015 | Makhdumi | G06Q 20/3274 |
| | | | | 235/380 |
| 2015/0286937 | A1* | 10/2015 | Hildebrand | H04L 51/046 |
| | | | | 706/11 |
| 2016/0239624 | A1* | 8/2016 | Short | A61B 3/113 |
| 2017/0061511 | A1* | 3/2017 | Korra | H04W 4/029 |
| 2017/0329922 | A1* | 11/2017 | Eberting | G16H 40/67 |
| 2018/0216946 | A1* | 8/2018 | Gueye | H04W 4/029 |
| 2018/0276645 | A1* | 9/2018 | Toomer | G06Q 20/3223 |
| 2018/0276739 | A1* | 9/2018 | Chopp | G06Q 30/0633 |
| 2019/0037264 | A1* | 1/2019 | Lyons | G06F 16/9535 |
| 2019/0102707 | A1* | 4/2019 | Wald | G06Q 10/02 |
| 2019/0214116 | A1* | 7/2019 | Eberting | G16H 80/00 |
| 2019/0266517 | A1* | 8/2019 | Nordstrom | G06Q 10/02 |
| 2019/0303807 | A1* | 10/2019 | Gueye | G06Q 10/02 |
| 2019/0392007 | A1* | 12/2019 | Jindra | G06Q 10/02 |
| 2020/0167699 | A1* | 5/2020 | Cohen | G06Q 20/045 |

FOREIGN PATENT DOCUMENTS

| | | | | |
|---|---|---|---|---|
| KR | 102115754 B1 * | 5/2020 | | G06Q 30/02 |
| WO | WO-2019070522 A1 * | 4/2019 | | G06Q 10/107 |

OTHER PUBLICATIONS

BuildFire. Implement In-App Referral Programs for Your Mobile App. (Mar. 15, 2018). Retrieved online Mar. 20, 2021. https://buildfire.com/mobile-app-referral-programs/ (Year: 2018).*

United Chase. United Explorer Card. (Jun. 2, 2018). Retrieved online Oct. 13, 2021. https://www.chase.com/personal/credit-cards/united/united-explorer-card/travel-benefits (Year: 2018).*

* cited by examiner

901. Each customer mobile device shows nearby customer devices also using the payment system

902. Customers dining together form a group by selecting one another (or accepting a group formation created by one or more of them)

903. Each customer's device displays a copy of the itemized bill on one side of the screen, and a photo (or other representational image) of each other customer in the group on the other side of the screen

904. One or more of the customers in the group assigns payment by clicking and dragging items from the itemized bill to the photo (or image) of the customer responsible for paying for that item

905. When the group is finished assigning payments, each customer approves his/her proposed payment assignments, with unassigned items being distributed equally among the customers in the group

906. After all customers in the group have approved their payment assignments, the payment system processes payments from each customer's account according to the approved payment assignments

Fig. 9

SYSTEM AND METHOD FOR CUSTOMER AND BUSINESS REFERRAL WITH A CONCIERGE SYSTEM

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/097,443
63/073,814
Ser. No. 17/091,925
63/070,895
Ser. No. 17/005,038
62/964,413
Ser. No. 16/796,342
62/938,817

BACKGROUND

Field of the Art

The disclosure relates to the field of automated customer service systems, and more particularly to the field of customer proximity detection and communications using wireless-enabled mobile devices.

Discussion of the State of the Art

Wireless mobile computing devices (e.g., smartphones) have enabled wireless payment technologies wherein the consumer makes a payment by receiving a payment request on the customer's mobile device and authorizing the payment by tapping an icon on the screen. As well, ecommerce and online shopping and placement of business reservations such as dinner reservations, hotel reservations, or airline tickets, have become commonplace. However, no technologies have been widespread and easily adopted for the purposes of generic and gamified concierge servicing to customers and cross-referring customers to businesses and services that they may enjoy, allowing the concierge in some instances to gain a commission or referral fee, and allowing detection of and compensation for customers downloading and installing the application by being referred by a business or concierge themselves.

What is needed is a system and method for customer and business referral with a concierge system, using mobile devices that nearly all customers already carry on their persons as it is, in a manner that entices customers and rewards them for using the system that provides this functionality, rather than being a hinderance or annoyance to customers, and which allows for a personalized experience beyond what having a customer use a search engine provides, much like a traditional concierge service, while allowing it to operate remotely and with third parties working together to refer customers to affiliated or interested businesses, with possible compensation being offered to successful commercial concierges that help customers find what they need and bring business to the businesses they refer customers to.

SUMMARY

Accordingly, the inventor has conceived and reduced to practice, a system and method for customer and business referral with a concierge system, comprising a database comprising customer and business information, a mobile device operating a concierge application, and a referral engine, to allow users to register for and install the concierge application, and use it to place orders for products, services, or reservations with participating businesses, gives or place these orders for other users who approve of receiving the product, service, or reservation, and compensating concierge application users who have a commercial interest in operating the application, called a commercial concierge, who may be compensated for referring users to various businesses for products, services, or reservations the user may enjoy or be searching for, in lieu of a traditional concierge that may help refer customers manually.

According to a preferred embodiment, a system for customer and business referrals with a concierge system is disclosed, comprising: a referral engine comprising a memory, a processor, and a plurality of programming instructions stored in the memory, and operating on the processor, wherein the plurality of programming instructions, when operating on the processor, cause the referral engine to: communicate with a mobile device operating a concierge application; register the mobile device as a commercial concierge; store a registration record of the commercial concierge; wherein the commercial concierge may receive compensation for referring non-users of a concierge application to install and use the concierge application, or for sending product orders or business reservations to other users of a concierge application; register a business as a concierge affiliate, wherein a concierge affiliate provides compensation to the commercial concierge based on the stored registration record for the commercial concierge; store a record of all successful and unsuccessful referral attempts by the commercial concierge; and store a record of the compensation distributed to the commercial concierge.

According to a second preferred embodiment, a method for customer and business referral with a concierge system is disclosed, comprising the steps of: communicating with a mobile device operating a concierge application; registering the mobile device as a commercial concierge; storing a registration record of the commercial concierge; wherein the commercial concierge may receive compensation for referring non-users of a concierge application to install and use the concierge application, or for sending product orders or business reservations to other users of a concierge application; registering a business as a concierge affiliate, wherein a concierge affiliate provides compensation to the commercial concierge based on the stored registration record for the commercial concierge; storing a record of all successful and unsuccessful referral attempts by the commercial concierge; and storing a record of the compensation distributed to the commercial concierge.

According to various aspects: wherein compensation is not given to a commercial concierge for a referring a user to download the concierge application; wherein compensation is not given to a commercial concierge for sending or receiving a product order or business reservation to or from another mobile device; and wherein the compensation is dispersed and received via a smart wallet.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 9 is a flow diagram showing the steps of an exemplary method for bill splitting among customers.

DETAILED DESCRIPTION

Figure 1:
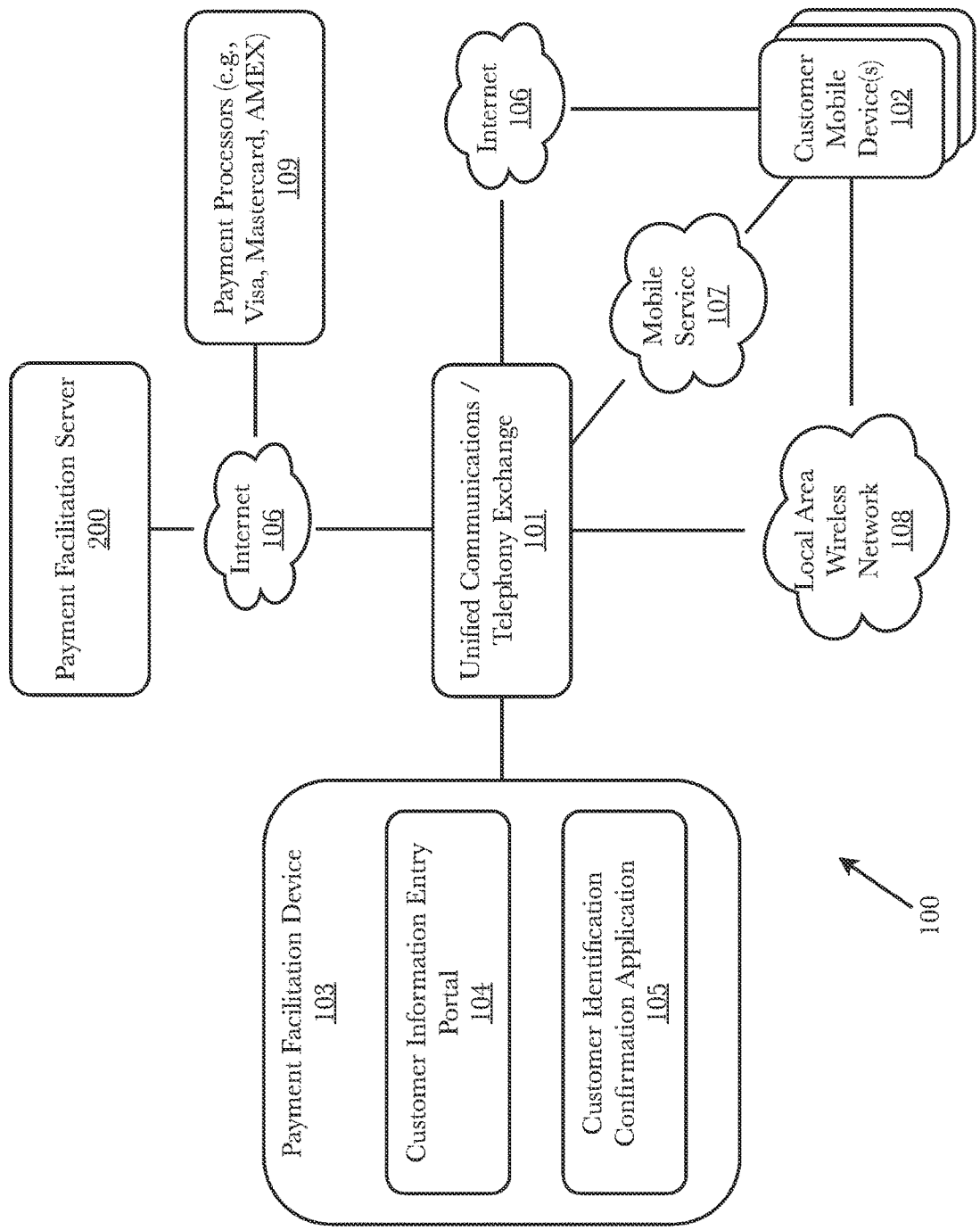
FIG. 1 is a block diagram illustrating an exemplary system architecture for a zero-step authentication system.

The inventor has conceived, and reduced to practice, a zero-step authentication system and method which uses wireless mobile devices to automatically make payments in a secure manner without requiring the customer to handle his or her mobile device The system and method uses a payment facilitation device at the business location which automatically detects and recognizes registered mobile devices, displays a photo of the customer to a business employee for identity confirmation, and automatically deducts payments for purchases from a pre-authorized customer account. The customer account is managed by a payment processing server, which stores the customer account data, makes appropriate deductions, sends confirmation of deductions to the customer's mobile device, and automatically refills the customer's account by making pre-authorized charges to the customer's banking institution.

Because the customer does not have to focus on his or her mobile device, the customer is free to interact naturally with the business environment and with employees of the business. For example, the customer is free to look around to experience the store's ambiance, which will tend to create a positive impression on the customer, and increase the likelihood that the customer will wish to return. Further, the customer is free to look at and speak with the business' employees, which facilitates personal interactions and relationships, making the customer feel more welcome and also increasing the likelihood that the customer will wish to return. These natural interactions are hindered by the handling and use of mobile phones, where the customer's attention is drawn away from the business environment and its employees in order to focus on the details of making or approving the transaction using his or her mobile device.

While the examples herein primarily discuss authorization of payments, the invention is not limited to authorization of monetary transactions, and can be used for authorization and transfer of any asset, or representation of an asset, that can be transferred electronically, for example: electronic transfers of real currency (credit card charges, bank transfers and payments, etc.), transfers of blockchain-based currencies such as Bitcoin, and transfers of digitized contracts or promises to pay or transfer physical assets (including, but not limited to, IOUs, certificates of ownership of stocks or other securities, and deeds for real estate).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Business establishment" or "place of business" as used herein mean the location of any business entity with which customers may transact business. Typically, this will be a physical location where customers may enter the location and transact business directly with employees of the business, but may also be a business without a physical location such as an online or telephone order retailer. Many examples herein use a restaurant as the business establishment, but the invention is not limited to use in restaurants, and is applicable to any business establishment.

The term "network" as used herein means any communication connection between two or more computing devices, whether such connection is made directly (e.g., from one device containing a Bluetooth radio to another device containing a Bluetooth radio) or through an intermediary device such as a router, where a number of devices connected to the router may all communicate with one another.

Conceptual Architecture

FIG. 1 is a block diagram illustrating an exemplary system architecture 100 for a zero-step authentication system. The primary components of the system are a payment facilitation device 103, a unified communications device or telephony exchange system (UC system) 101, and a payment facilitation server 200. Components or services that may connect to or be accessed by the system include wireless customer mobile devices 102, and payment processors 109. The payment facilitation device 103 is a computing device located at a business establishment that is connected (wired or wirelessly) to a UC system 101. The payment facilitation device 103 may be wired, or wireless, or both, depending on the implementation of a given embodiment. While a payment facilitation device 103 and UC system 101 are specified in this embodiment, it is not required that they be precisely in this configuration, and other configurations are possible, including a non-SIP computing device connected to a network without a US system 101. The payment facilitation device 103 comprises a screen (not shown) and applications for a customer information entry portal 104 and a customer identification confirmation application 105. The payment facilitation device 103 may be a mobile computing device like a mobile phone or tablet computer or may be a desktop or tabletop computing device.

The customer information entry portal 104 is an application on the payment facilitation device 103 that allows an employee of the business to enter customer details such as name, telephone number, device identifier, bank, debit, or credit card details, payment preferences, and, if necessary, customer account refill limits and customer account refill amounts. The device identifier may be any information that allows the system to identify the customer mobile device 102, including, but not limited to, a mobile access control (MAC) address (e.g., a MAC address for the device's WiFi radio, a MAC address for the device's Bluetooth radio, etc.), the device's 102 serial number, the device's mobile equipment identifier (MEID) or international mobile equipment identity (IMEI) number, the integrated circuit card identifier (ICCID) of the subscriber identity module (SIM) card inserted into the customer mobile device 102, and the device's 102 secure element identification (SEID) number.

The customer identification and confirmation application 105 is an application that provides security in financial transactions by allowing the employee of the business to visually confirm the identity of the customer making a transaction. For example, the payment facilitation device at a particular business location may be connected to multiple customer devices simultaneously. The customer identification and confirmation application 105 may display a photo of the user (customer) of each such connected customer device, and the employee may select the device of the customer making the transaction by clicking on the customer's photo as displayed by the customer identification and confirmation application 105 on the payment facilitation device 103.

The UC system 101 is a device or service (e.g., online service) that integrates different methods of communication (e.g., phone calls, video calls, short message service (SMS), instant messaging (chat), email) and allows for all of those different methods of communication to be accessed through a computing device such as a mobile phone or tablet computer. A UC system 101 is the modern, and much more flexible and powerful, form of a private branch exchange (PBX) telephone equipment system that allowed businesses to connect multiple internal telephones to a single incoming telephone line. In this example, the UC system 101 acts as the interface between the payment facilitation device 103, the customer mobile devices 102, and the payment facilitation server 200.

A customer mobile device 102 may be connected to the system via any wireless network connection, for example through the Internet 106, a mobile (cellular) network 107, or through a local wireless network 108 such as WiFI, Bluetooth, etc. In the case of remote connections such as those made through the Internet 106 or mobile service 107, the location of a customer mobile device 102 and its location relative to the payment facilitation device 103 or other customer mobile devices 102 may be established through use of the device's satellite positioning system hardware (e.g., GPS, GLONASS, Galileo), by identifying the location of an intermediary device to which the device is connected (e.g., a WiFi router, etc. In the case of local connections, which typically use short range wireless transmissions, it may not be necessary to determine the location of the mobile customer device 102 because the short range of wireless communications establishes that the payment facilitation device 103 or other mobile customer devices are nearby. For example, when using a Bluetooth Class 2 connection to connect to other devices, it will be apparent that the other devices are nearby because Bluetooth Class 2 has an effective range on the order of 10 meters.

In a typical scenario, the first time a customer enters a business establishment with a customer mobile device 102, an employee of the business establishment will enter the customer's information using the customer information entry portal 104 and register the customer mobile device 102 using the customer mobile device's 102 identification. When a customer mobile device 102 enters a business establishment, the payment facilitation device 103 and customer mobile device 102 will automatically detect each other and establish a network connection. The payment facilitation device 103 will recognize the customer mobile device 102 using the customer mobile device's identifier. As the customer makes an order, the business's employee will confirm the identity of the customer using the customer identification confirmation application 105. The payment facilitation device connects to the payment facilitation server 200, either directly or through the UC system 101, forwards the customer information and order information to the payment facilitation server 200. The payment facilitation server 200, checks the customer's account and either deducts and appropriate amount from the customer's prepaid account or sends the payment details to a payment processor 109 for processing. Once the payment is processed, the payment facilitation server 200 sends a confirmation of the payment either to the payment facilitation device 103, the customer mobile device 102, or both. In a scenario where the customer is in a remote location from the business establishment (e.g., a phone order or online order), the process is much the same except that the first time customer information entry and mobile device registration occurs remotely, and the employee does not visually identify the customer (although other methods of identifying the customer may apply, such as personal identification number (PIN) codes, voice print identification, telephone number identification, or customer mobile device 102 identifiers).

Figure 2:
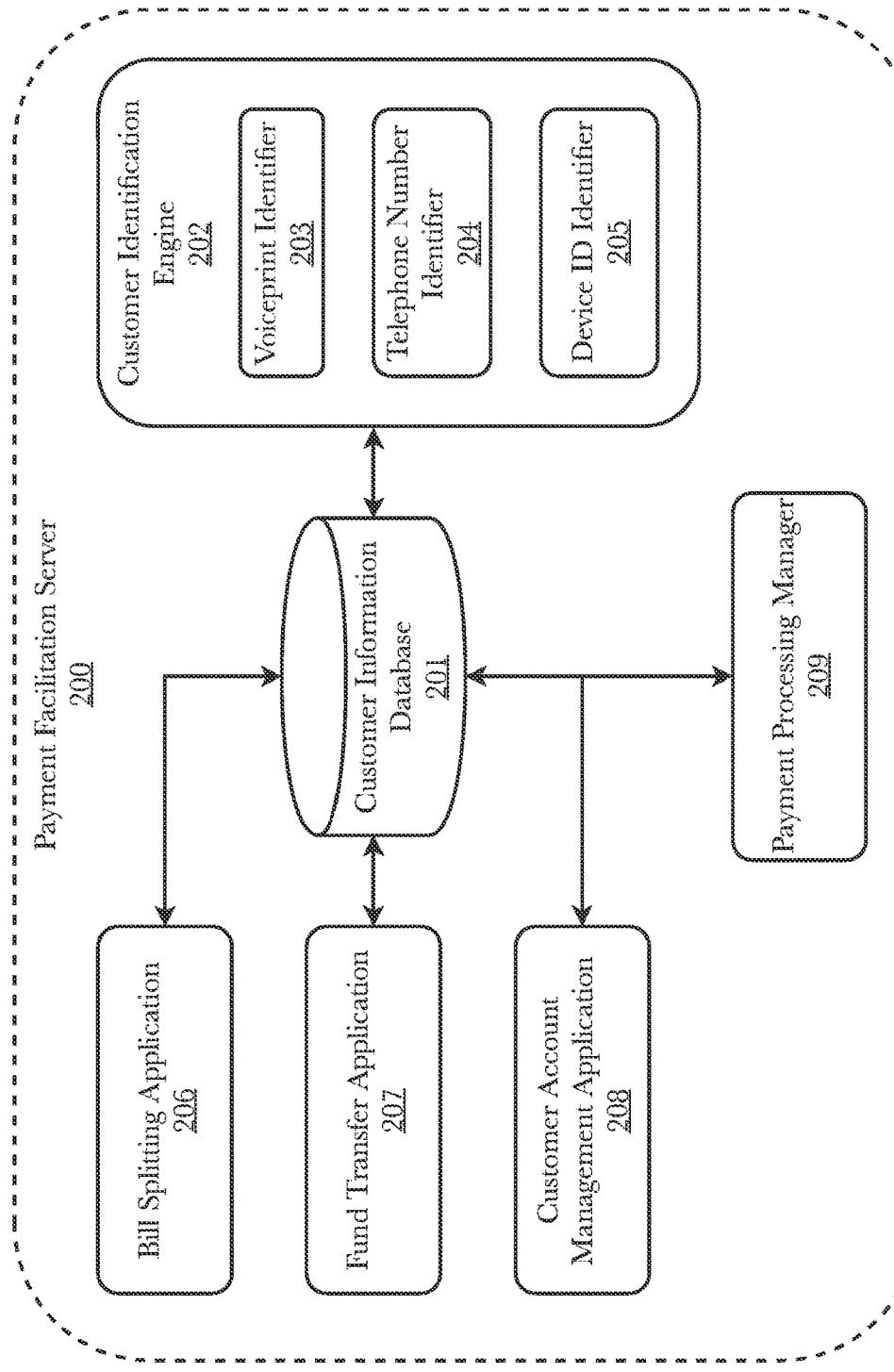
FIG. 2 is a block diagram illustrating an exemplary architecture for an aspect of zero-step authentication system, the payment facilitation server.

FIG. 2 is a block diagram illustrating an exemplary architecture for an aspect of zero-step authentication system, the payment facilitation server 200. The payment facilitation server 200 manages customer information and payments from multiple customers. In this example, the payment facilitation server comprises a customer information database 201, a customer identification engine 202, a payment processing manager 209, and one or more applications for managing bill splitting, fund transfers, and account information. Note that, in some embodiments, the bill splitting and fund transfer applications may be applications on the customer mobile device 102 instead of on the payment facilitation server 200. As the payment facilitation server receives customer information and device registrations, it stores them in a customer information database. Such customer information may comprise customer details such as name, telephone number, device identifier, bank, debit, or credit card details, payment preferences, and, if necessary, customer account refill limits and customer account refill amounts. The device identifier may be any information that allows the system to identify the customer mobile device 102, including, but not limited to, a mobile access control (MAC) address (e.g., a MAC address for the device's WiFi radio, a MAC address for the device's Bluetooth radio, etc.), the device's 102 serial number, the device's mobile equipment identifier (MEID) or international mobile equipment identity (IMEI) number, the integrated circuit card identifier (ICCID) of the subscriber identity module (SIM) card inserted into the customer mobile device 102, and the device's 102 secure element identification (SEID) number.

The customer identification engine 202 provides additional security by confirming the identity of the customer before processing payments. In this example, the customer identification engine 202 has three separate identification methods, a voiceprint identifier 203, a telephone number identifier 204, and a device ID identifier 205. The voiceprint identifier 203 can provide confirmations of customer identities either by matching voice samples of specific words and phrases provided by the customer as during account creation and device registration or, in a more sophisticated version, may match the customer's voice to any spoken words and phrases using machine learning algorithms. The telephone number identifier 204 receives caller identification (caller ID) information from the UC system 101, and verifies that the phone number from which the order is being made matches the phone number in the customer account information. The device ID identifier 205 receives a device identifier from the UC system 101 and matches it to the device identifier in the customer database 201 to confirm that the device is registered. In some embodiments, other methods of identifying the customer may be used, for example, PIN codes. In some embodiments, two or more of these identifiers may be used together to confirm the customer's identity.

As customer information and order information is received, the payment facilitation server 200 checks the customer's account using the customer account management application 208 and either deducts and appropriate amount from the customer's prepaid account or sends the payment details to the payment processing manager 209, which forwards the payment request to a payment processor 109 for processing. Once the payment is processed, the payment facilitation server 200 sends a confirmation of the payment either to the payment facilitation device 103, the customer mobile device 102, or both.

The bill splitting application 206 receives a bill that is to be shared by two or more customers (e.g., a restaurant dining bill), the device identifier of two or more customer mobile devices 102, and provides an interface for those customers to allocate items on the bill between the customers. Once each of the customers involved approves the allocation, the bill splitting application forwards each customer's portion of the bill to the payment processing manager 209 The fund transfer application 207 operates in a similar manner for fund transfers between customers. Customers involved in the fund transfer specify amounts to be transferred to other customers, and once approved by all customers involved in the fund transfer, the fund transfer application for forwards the approved funds transfers to the payment processing manager 209 for execution.

Figure 3:
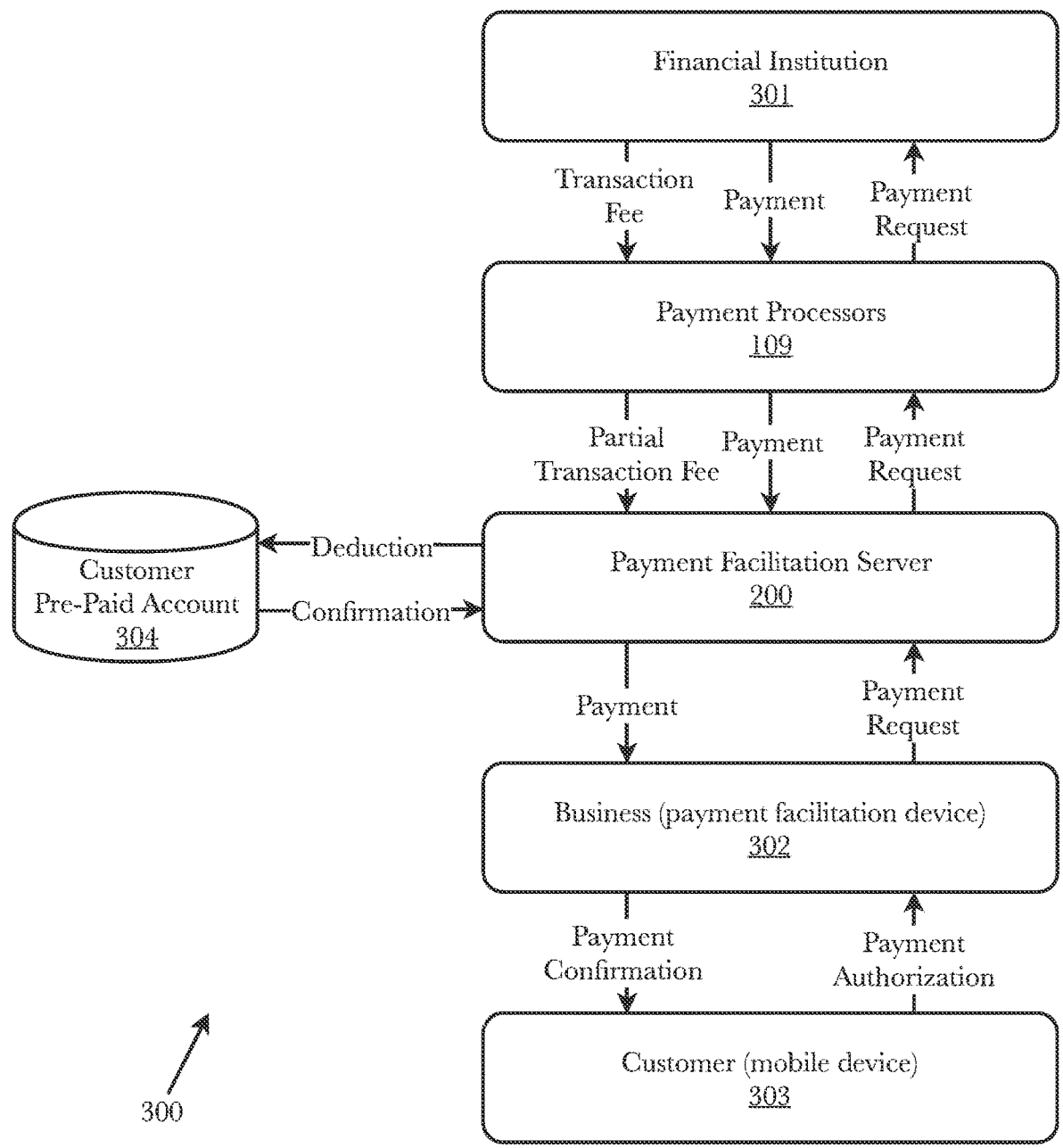
FIG. 3 is a flow diagram illustrating an exemplary flow of payments in an embodiment.

FIG. 3 is a flow diagram illustrating an exemplary flow of payments 300 in an embodiment. When a customer 303 authorizes a transaction (which authorization may be pre-approved) through his or her customer mobile device 102, the payment authorization is sent to the business 302 at the business' payment facilitation device 103. The payment facilitation device 103 of the business 302 sends a payment request to the payment facilitation server 200. The payment facilitation server 200 checks the customer's pre-paid account 304 to determine whether pre-paid funds are available. If such funds are available, a deduction is made from the customer pre-paid account 304 in the amount of the authorized payment, and a confirmation is confirmed by the payment facilitation server 200. If sufficient funds are not available in the customer pre-paid account, the account is either refilled or a direct payment request is made. In either such case, the payment facilitation server 200 sends a payment request to a payment processor 109, which are financial intermediaries like Visa and Mastercard, who process transactions on behalf of financial institutions 301 (i.e., banks). The payment processor 109 sends the payment request to a financial institution 301 at which the customer 303 has an account. The financial institution 301 receives the payment request, and sends a payment to the payment processor 109, typically along with a transaction fee. The payment processor 109 receives the payment and transaction fee, and forwards the payment to the payment facilitation server along with a portion of the transaction fee. The payment facilitation server 200 forwards the payment to the business 302, which forwards a confirmation of payment 303 to the customer, completing the transaction.

Detailed Description of Exemplary Aspects

Figure 4:
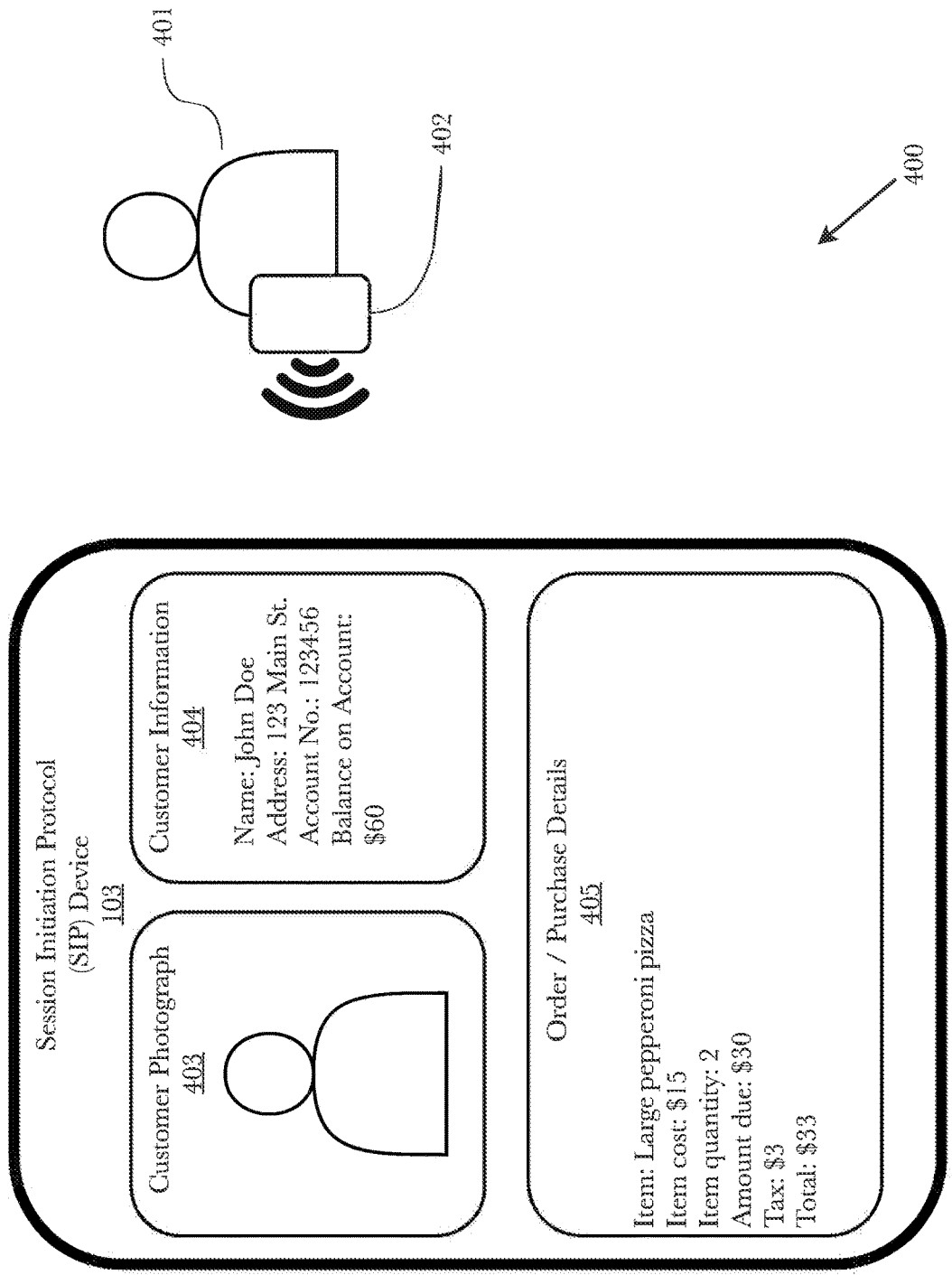
FIG. 4 is a diagram illustrating an exemplary business/customer interaction and showing an exemplary screenshot.

FIG. 4 is a diagram illustrating an exemplary business/customer interaction 400 and showing an exemplary screenshot. In this example, a customer 401 (who already has an account and registered device 402 at a business establishment) makes an order. The customer's device 402 and the payment facilitation device 103 detect each other and establish a connection when the customer 401 enters the business establishment. The customer's photograph 403 is displayed on the business' payment facilitation device 103, along with the customer's information 404 and order details 405. An employee of the business clicks on the customer photograph 403 to confirm the identity of the customer 401. Once confirmed, the customer device 402 automatically approves payment and receives confirmation of the payment without the customer having the handle the device 402. The customer device 402 may remain in the customer's pocket, purse, backpack, etc., and does not have to be removed to complete the transaction.

Figure 5:
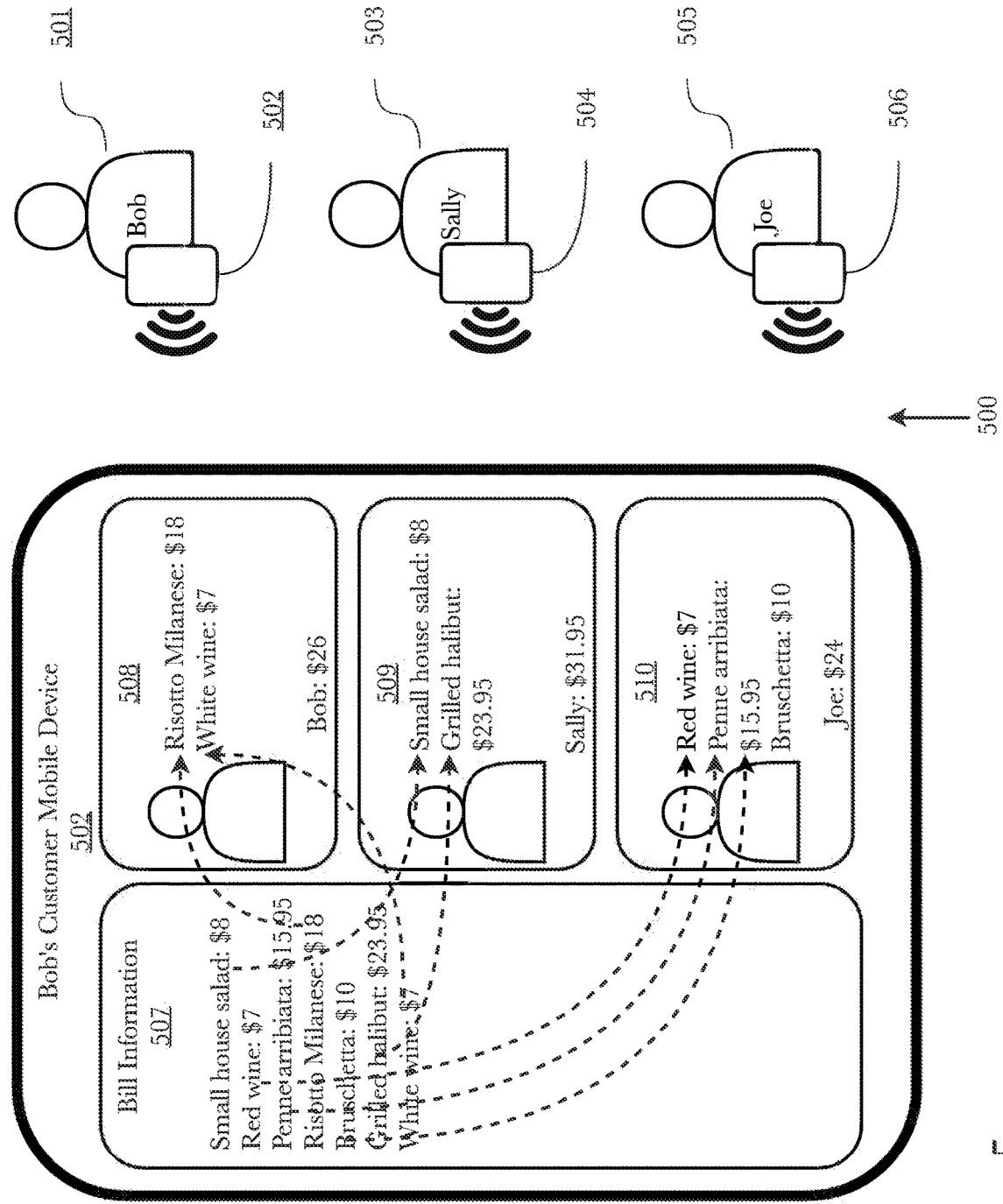
FIG. 5 is a diagram illustrating an exemplary bill splitting feature and showing an exemplary screenshot.

FIG. 5 is a diagram illustrating an exemplary bill splitting feature 500 and showing an exemplary screenshot. In this example, three customers, Bob 501, Sally 503, and Joe 505, each with their respective mobile devices 502, 504, and 506, have a meal together at a restaurant and want to split the bill among themselves. Each customer's mobile device has a bill splitting application installed on it, which shows a copy of the bill and the customers who dined together. For example, Bob's 501 mobile device 502 shows the bill information 507 for the group on the left-hand side of his screen, and a window for himself 508, a window for Sally 509, and window for Joe 510 on the right side. The mobile devices 504, 506 of Sally 503 and Joe 505 show similar screens. The windows 508, 509, 510, each show a photo (or other representation) of the customer, a space for allocating items from the bill, and a total of the items allocated to that customer. As each customer, on his or her respective mobile device 502, 504, 506, allocates food and drink items from the bill information 507 by clicking on them and dragging them to the window of a person on the right, the allocation of those food and drink items appears in the window of the person to whom the item has been allocated, as indicated by the arrows. For example, the risotto Milanese and white wine have been allocated to Bob (either by Bob or by one of the other two customers), a total due from Bob of $26 is shown, and this information is updated on all three mobile devices 502, 504, 506. Once all three customers 501, 503, 505 approve the allocation, each person's mobile device 502, 504, 506 processes the payment for the amount allocated to that customer. In some embodiments, unallocated items may be automatically split among the customers in the group.

Figure 6:
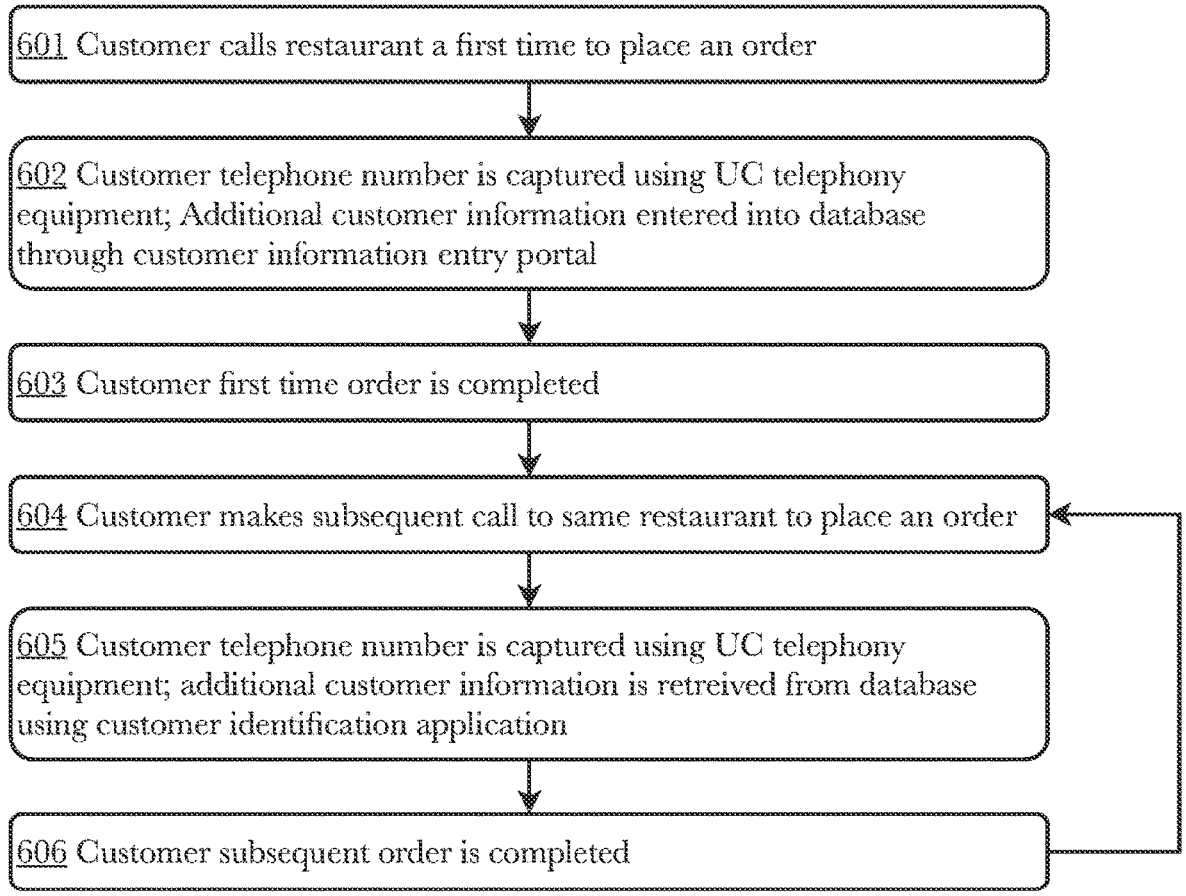
FIG. 6 is a flow diagram showing the steps of an exemplary method for registration of a customer's mobile device and order placement.

FIG. 6 is a flow diagram showing the steps of an exemplary method for registration of a customer's mobile device and order placement. When a customer calls restaurant a first time to place an order 601, the customer's telephone number is captured using UC telephony equipment, and additional customer information is gathered and entered into database by an employee of the business 602. The customer than makes his or her order and the order is completed 603. Each time the customer makes a subsequent call to same business to place an order 604, the customer's telephone number is captured using UC telephone equipment, and the customer's information is retrieved from a customer database using a customer identification application 605. The customer than makes his or her order and the order is completed 606 without the customer having to provide his or her information. The same procedure is used when a customer physically enters a business establishment, except that the registration is performed in person.

Figure 7:
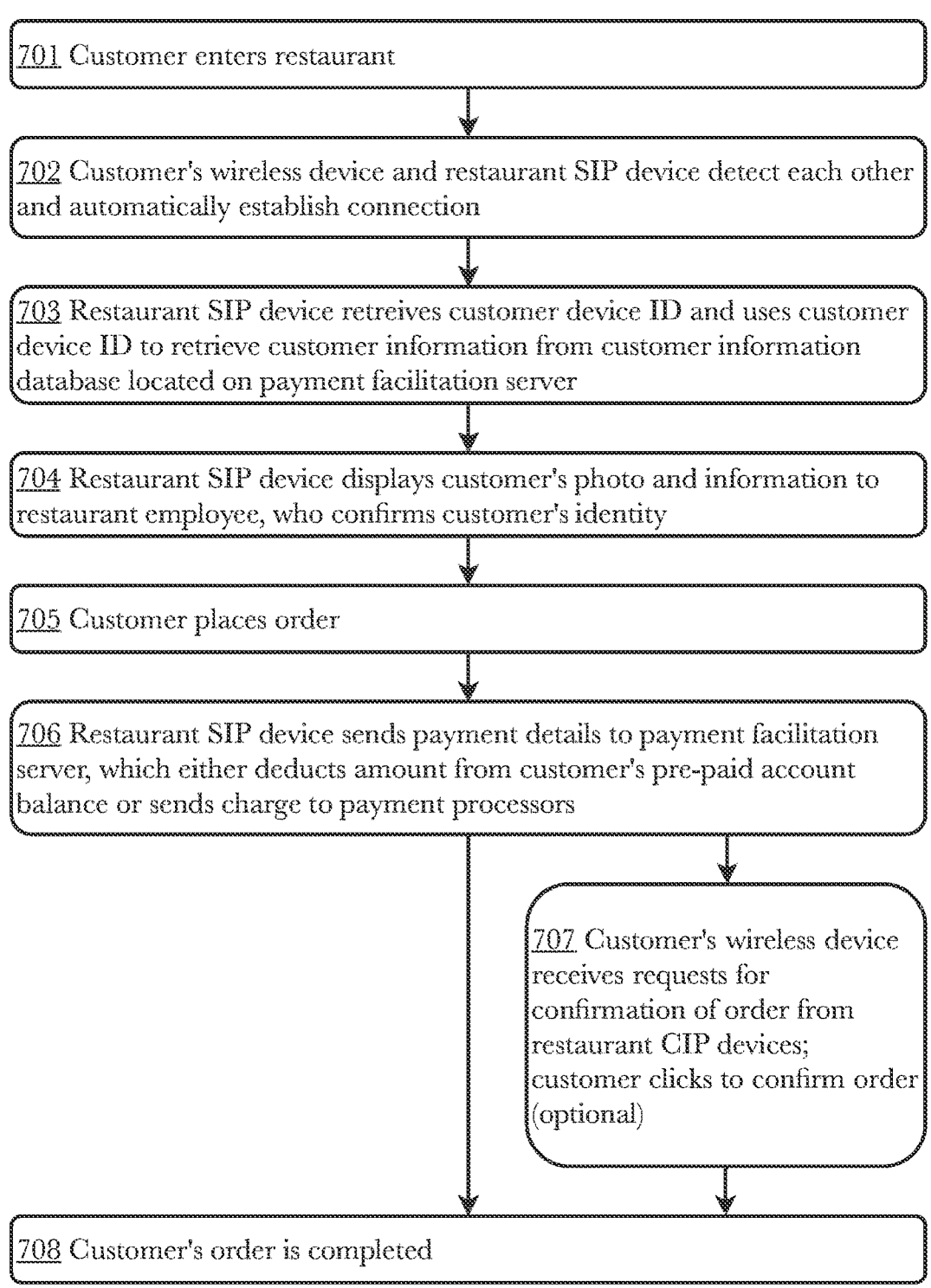
FIG. 7 is a flow diagram showing the steps of an exemplary method for zero-step authentication and completion of a transaction.

FIG. 7 is a flow diagram showing the steps of an exemplary method for zero-step authentication and completion of a transaction. When a customer enters a business establishment 701, the customer's wireless device and business payment facilitation device detect each other and automatically establish connection 702. The business payment facilitation device retrieves the customer device identifier (ID) and uses the customer device ID to retrieve customer information from customer information database located on a payment facilitation server 703. The business payment facilitation device displays customer's photo and information to a restaurant employee, who confirms customer's identity by clicking on the photo of the customer 704. The customer the places an order 705. When the order is placed, the business payment facilitation device sends payment details to payment facilitation server, which either deducts amount from customer's pre-paid account balance or sends charge to payment processors 706. Optionally, an additional security step may be inserted wherein the customer's wireless device receives and displays a request for confirmation of the order from the business CIP device and the customer clicks on the displayed request to confirm the order 707. Finally, the customer's order is completed 708.

Figure 8:
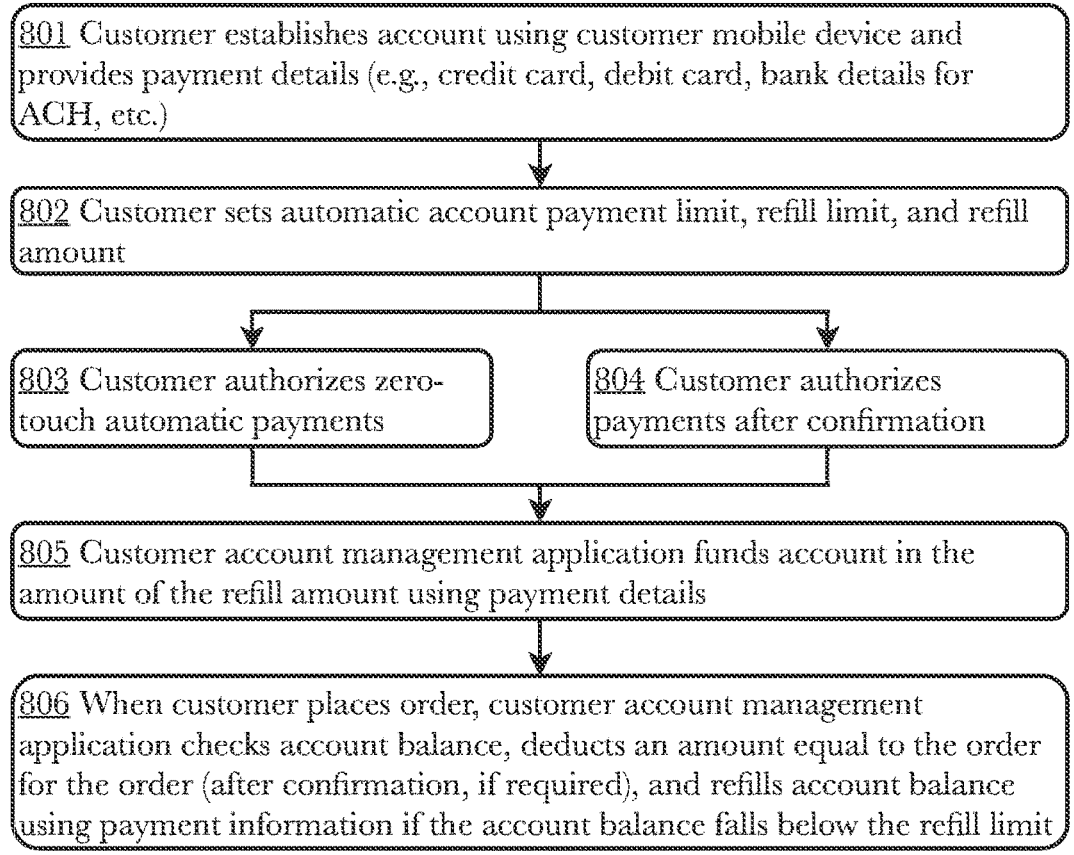
FIG. 8 is a flow diagram showing the steps of an exemplary method for establishment of an account and pre-authorization of payments.

FIG. 8 is a flow diagram showing the steps of an exemplary method for establishment of an account and pre-authorization of payments. First, a customer establishes and account using his or her customer mobile device and provides payment details (e.g., credit card, debit card, bank details for ACH, etc.) 801. The customer then sets automatic an account payment limit, a refill limit, and a refill amount 802. For example, the customer may set a payment limit for each transaction at $50, a refill limit (i.e., minimum account balance below which the account will be automatically refilled) of $10, and a refill amount of $100. The customer may choose to have such payments sent automatically without handling his or her mobile device (zero-step authentication) 803 or may choose to authorize each payment individually using his or her mobile device 804. A customer account management application funds the account in the amount of the refill amount using payment details 805. Thus, in this example, the customer has pre-authorized payments of up to $50 per transaction, and pre-authorized the system to automatically refill his account from the customer's financial institution (or credit card) in the amount of $100 whenever the account balance falls below $10. When the customer places an order, the customer account management application checks account balance, deducts an amount equal to the order for the order (after confirmation, if required), and refills account balance using payment information if the account balance falls below the refill limit 806.

FIG. 9 is a flow diagram showing the steps of an exemplary method for bill splitting among customers. Each customer mobile device runs an application that shows nearby customer devices also using the payment system 901. Customers dining together form a group by selecting one another (or accepting a group formation created by one or more of them) 902. Each customer's device displays a copy of the itemized bill on one side of the screen, and a photo (or other representational image) of each other customer in the group on the other side of the screen 903. One or more of the customers in the group assigns payment by clicking and dragging items from the itemized bill to the photo (or image) of the customer responsible for paying for that item 904. When the group is finished assigning payments, each customer approves his/her proposed payment assignments, with unassigned items being distributed equally among the customers in the group 905. After all customers in the group have approved their payment assignments, the payment system processes payments from each customer's account according to the approved payment assignments 906.

Figure 10:
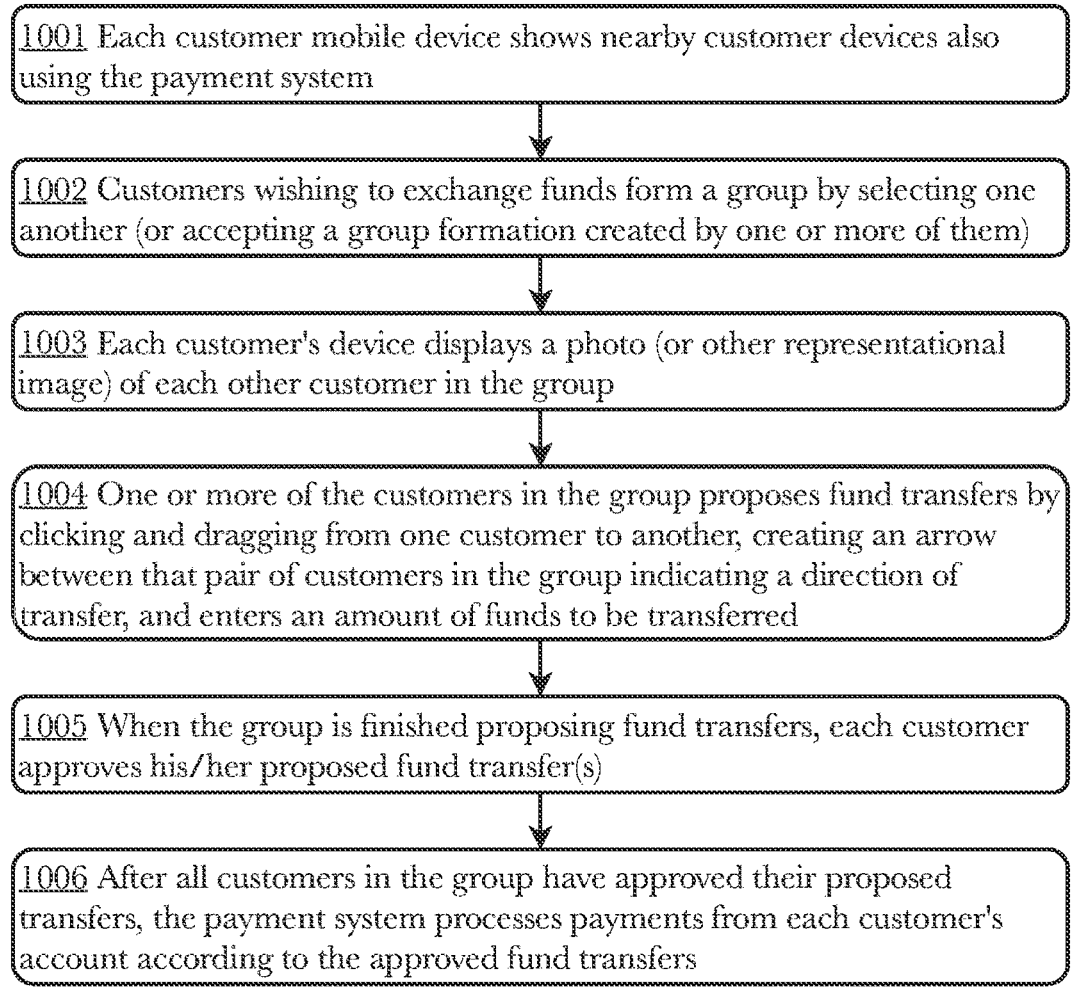
FIG. 10 is a flow diagram showing the steps of an exemplary method for funds transfer among customers.

FIG. 10 is a flow diagram showing the steps of an exemplary method for funds transfer among customers. Each customer mobile device runs an application that shows nearby customer devices also using the payment system 1001. Customers wishing to exchange funds form a group by selecting one another (or accepting a group formation created by one or more of them) 1002. Each customer's device displays a photo (or other representational image) of each other customer in the group 1003. One or more of the customers in the group proposes a fund transfer by clicking and dragging from one customer to another, creating an arrow between that pair of customers in the group indicating a direction of transfer, and enters an amount of funds to be transferred 1004. When the group is finished proposing fund transfers, each customer approves his/her proposed fund transfer(s) 1005. After all customers in the group have approved their proposed transfers, the payment system processes payments from each customer's account according to the approved fund transfers 1006.

Figure 15:
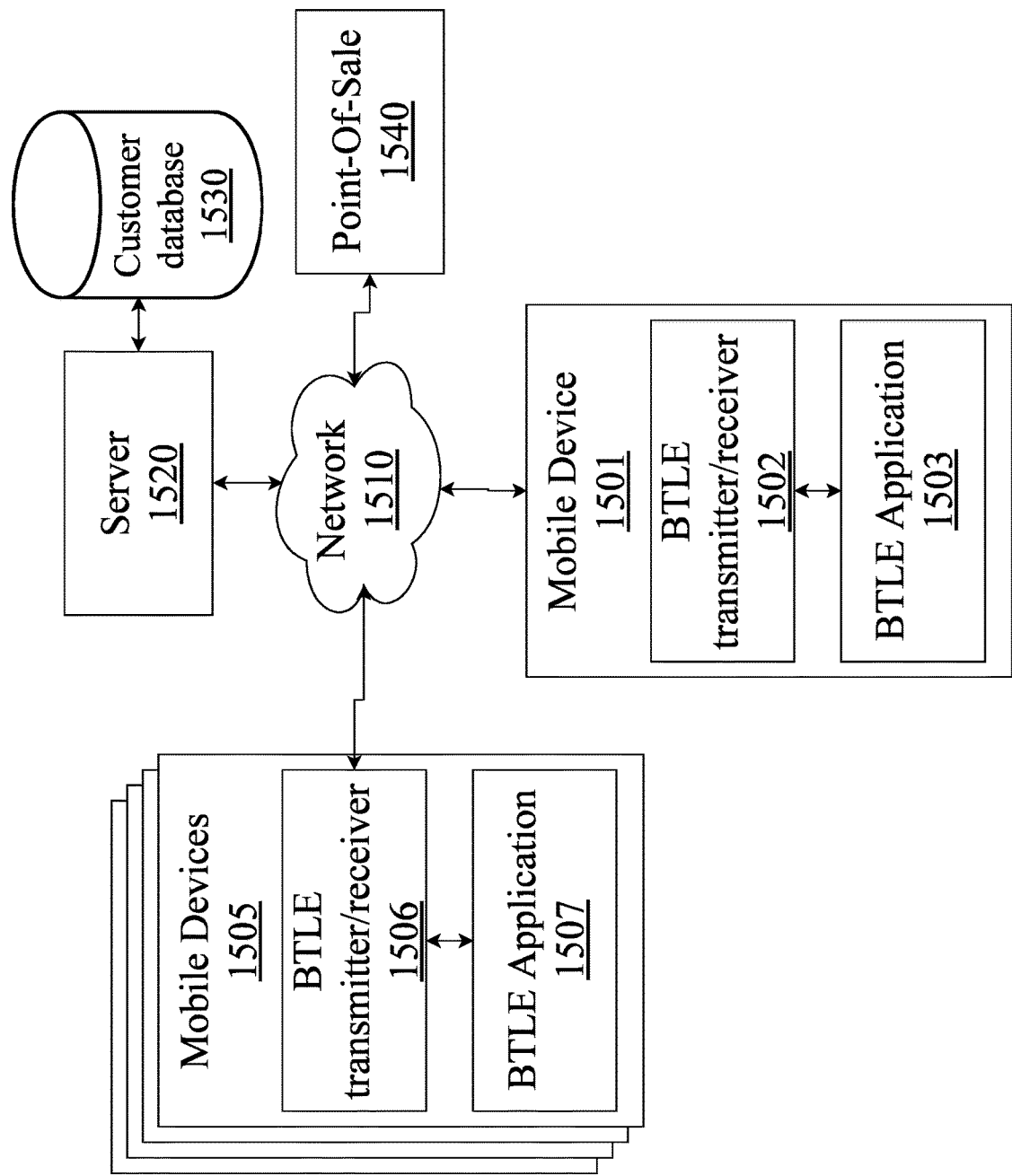
FIG. 15 is a system diagram illustrating a system for zero-step customer proximity detection using mobile device low emissions beacons.

FIG. 15 is a system diagram illustrating a system for zero-step customer proximity detection using mobile device low emissions beacons. A mobile device 1501 exists, such as a smartphone, PDA, tablet, or other device, which may run an operating system including IOS™, WINDOWS MOBILE™, ANDROID™, and potentially others, and which may be in the possession of a customer or business client. The mobile device 1501 is connected to, or has built into it, a BLUETOOTH™ Low Emissions ("BTLE") transmitter and receiver 1502, and an application that is configured to utilize such a transmitter/receiver 1503. Such an application may be written in a variety of programming languages, such as C, C++, C#, JAVA™, or others. The application may be written in a general-purpose manner to interact with any business BTLE beacon or mobile device acting as a beacon, such as a plurality of mobile devices operated by a business 1505, and may either maintain a local memory store of recognized and known businesses (which may be treated differently than unknown business beacons) or may connect to a network 1510 and server 1520 to determine of a business' supplied information over BTLE transmitter and receiver communications is legitimate. Business mobile devices 1505 may represent a plurality of devices such as smartphones, PDAs, tablets, or other devices, which do not necessarily need to all of one device type, which may run operating systems including IOS™, WINDOWS MOBILE™, ANDROID™, and potentially others, each of which possesses a BTLE transmitter and receiver 1506 and a business-side application configured to utilize the BTLE transmitter/receiver 1507. The business-side application may be the same application as the one operating on the client or customer device or devices 1503, merely configured differently, or it may be a separate application that merely is capable of interacting with the client-side application 1503. A business-side application 1507 is capable of communicating with a network 1510 over either a BTLE transmitter/receiver 1506, or over another form of transmitter/receiver such as WIFI™ or cellular data, to communicate with a network-connected server 1520 and a point-of-sale ("POS") system 1540. The purpose of the business-side application's 1507 communications with the server 1520 and POS 1540 are to both manage and interact with the business' items for sale and their inventory management, if any, and to interact with a server 1520 hosting a customer database 1530 for the purposes of identifying, retrieving, and saving customer information to provide personalized interactions with customer or client-side applications 1503. Such a system may also be used for zero-step authentication, for returning or known customers or clients. Such communications may occur over a local area network, the internet, or some other wide area network, and the server 1520 and customer database 1530 may be hosted either locally or remotely, or exist in a cloud infrastructure. A mobile device 1501 with the client application 1503 may communicate over a network 1510 or directly with a business device or devices 1505 and the business-side application 1507 to establish an initial point of contact, identify a customer if possible, calculate their proximity based on the energy levels of the signal transmissions to and from the user and business device or devices, and with a plurality of devices with different positioning sharing their proximity data, it is possible to calculate a user's location relative to the devices within or near a business, for purposes such as enforcing social distancing, managing table assignments in a restaurant, ensuring that there is an even distribution of employees on a business floor relative to customer positions and routing, and even apply machine learning to customer routes through a business to determine what paths customers may seem to take such as in retail outlets, to maximize their revenue potential by placing products in a manner along the route designed to entice customers more effectively to purchase them.

Figure 16:
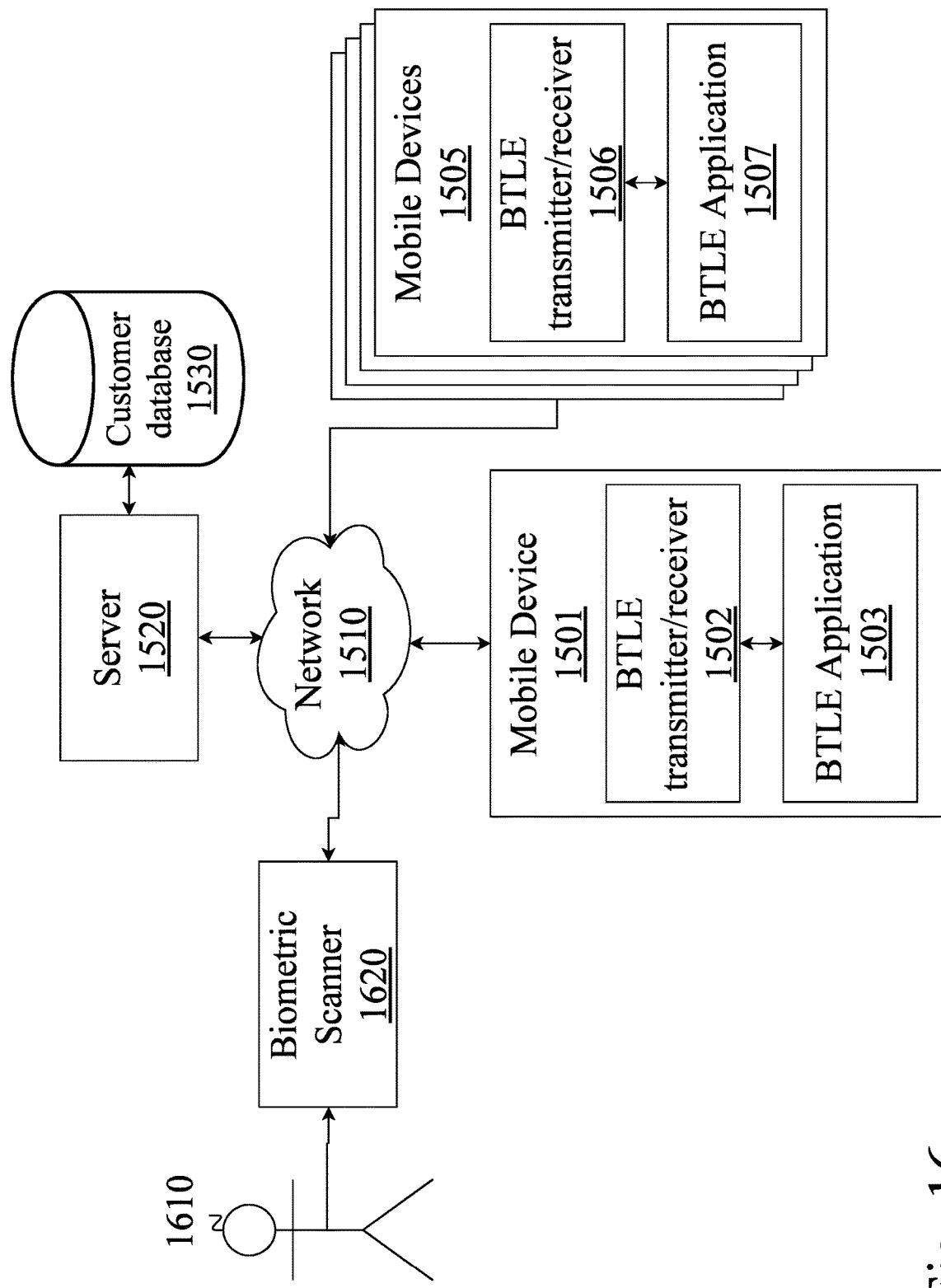
FIG. 16 is a system diagram illustrating a system for zero-step customer proximity detection using mobile device low emissions beacons, with a biometric scanner for customer identification.

FIG. 16 is a system diagram illustrating a system for zero-step customer proximity detection using mobile device low emissions beacons, with a biometric scanner for customer identification. A mobile device 1501 exists, such as a smartphone, PDA, tablet, or other device, which may run an operating system including IOS™, WINDOWS MOBILE™, ANDROID™, and potentially others, and which may be in the possession of a customer or business client. The mobile device 1501 is connected to, or has built into it, a BLUETOOTH™ Low Emissions ("BTLE") transmitter and receiver 1502, and an application that is configured to utilize such a transmitter/receiver 1503. Such an application may be written in a variety of programming languages, such as C, C++, C#, JAVA™, or others. The application may be written in a general-purpose manner to interact with any business BTLE beacon or mobile device acting as a beacon, such as a plurality of mobile devices operated by a business 1505, and may either maintain a local memory store of recognized and known businesses (which may be treated differently than unknown business beacons) or may connect to a network 1510 and server 1520 to determine of a business' supplied information over BTLE transmitter and receiver communications is legitimate. Business mobile devices 1505 may represent a plurality of devices such as smartphones, PDAs, tablets, or other devices, which do not necessarily need to all of one device type, which may run operating systems including IOS™, WINDOWS MOBILE™, ANDROID™, and potentially others, each of which possesses a BTLE transmitter and receiver 1506 and a business-side application configured to utilize the BTLE transmitter/receiver 1507. The business-side application may be the same application as the one operating on the client or customer device or devices 1503, merely configured differently, or it may be a separate application that merely is capable of interacting with the client-side application 1503. A business-side application 1507 is capable of communicating with a network 1510 over either a BTLE transmitter/receiver 1506, or over another form of transmitter/receiver such as WIFI™ or cellular data, to communicate with a network-connected server 1520 and a point-of-sale ("POS") system 1540. The purpose of the business-side application's 1507 communications with the server 1520 and POS 1540 are to both manage and interact with the business' items for sale and their inventory management, if any, and to interact with a server 1520 hosting a customer database 1530 for the purposes of identifying, retrieving, and saving customer information to provide personalized interactions with customer or client-side applications 1503. Such a system may also be used for zero-step authentication, for returning or known customers or clients. Such communications may occur over a local area network, the internet, or some other wide area network, and the server 1520 and customer database 1530 may be hosted either locally or remotely, or exist in a cloud infrastructure. A mobile device 1501 with the client application 1503 may communicate over a network 1510 or directly with a business device or devices 1505 and the business-side application 1507 to establish an initial point of contact, identify a customer if possible, calculate their proximity based on the energy levels of the signal transmissions to and from the user and business device or devices, and with a plurality of devices with different positioning sharing their proximity data, it is possible to calculate a user's location relative to the devices within or near a business, for purposes such as enforcing social distancing, managing table assignments in a restaurant, ensuring that there is an even distribution of employees on a business floor relative to customer positions and routing, and even apply machine learning to customer routes through a business to determine what paths customers may seem to take such as in retail outlets, to maximize their revenue potential by placing products in a manner along the route designed to entice customers more effectively to purchase them.

According to an embodiment, a customer 1610 may walk near or into a business establishment that operates a biometric scanner 1620, which may be any one of, or a combination of, a fingerprint scanner, iris scanner, facial recognition scanner, voice scanner, or other biometric scanner to identify individuals, for either one-step or zero-step authentication, supplementing or replacing the authentication steps taken by a customer's application 1503.

Figure 17:
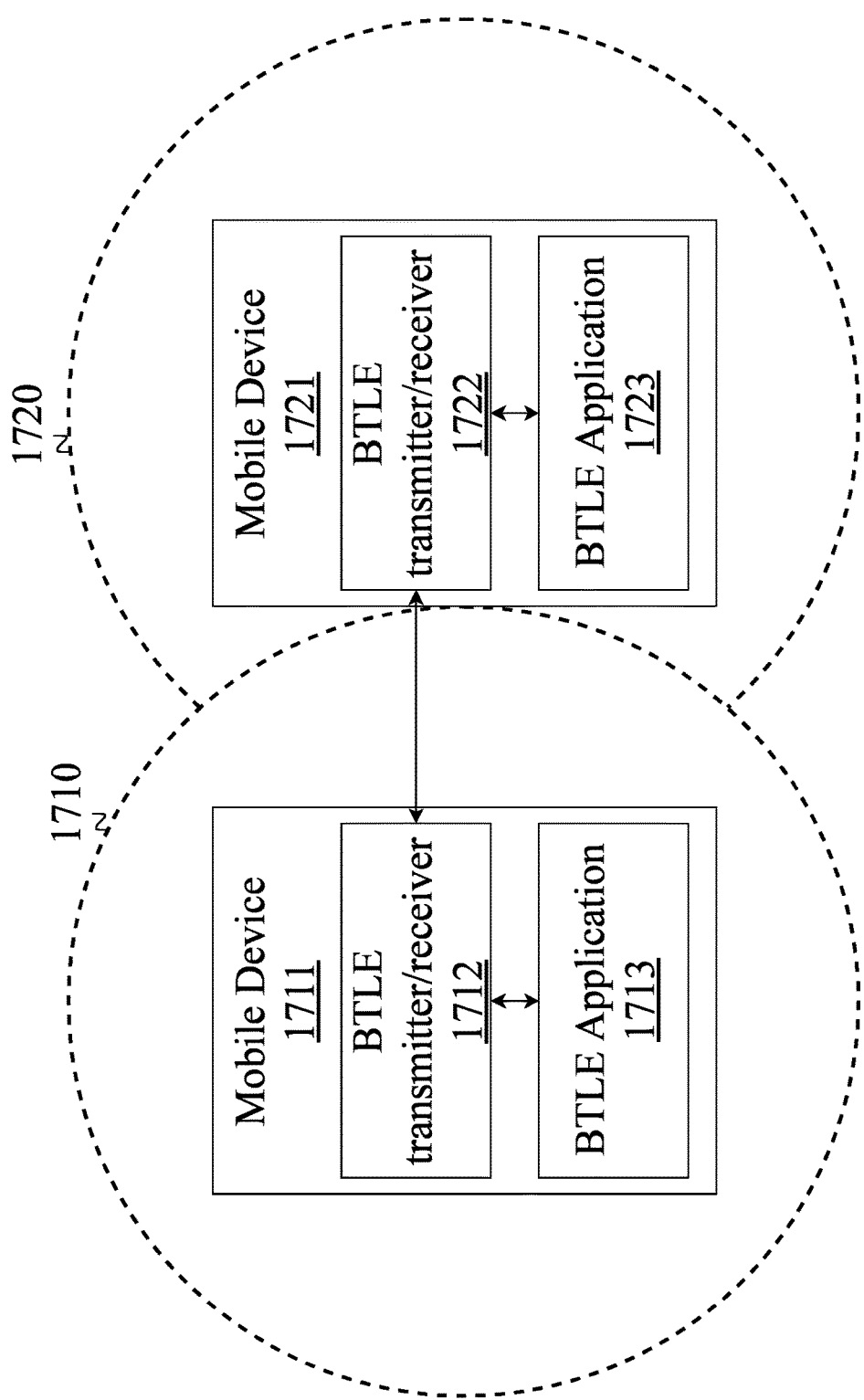
FIG. 17 is a system diagram illustrating two mobile devices with BTLE transmitters, receivers, and BTLE-enabled applications, measuring the distance between each other.

FIG. 17 is a system diagram illustrating two mobile devices with BTLE transmitters, receivers, and BTLE-enabled applications, measuring the distance between each other. Two mobile devices 1711, 1721 exist, such as smartphones, PDAs, tablets, or other devices, which may run an operating system including IOS™, WINDOWS MOBILE™, ANDROID™, and potentially others, and which may be in the possession of a customer or business client, and a business employee or be affixes to a part of a business such as a desk. Each mobile device 1711, 1721 is connected to, or has built into it, a BLUETOOTH™ Low Emissions ("BTLE") transmitter and receiver 1712, 1722, and an application that is configured to utilize such a transmitter/receiver 1713, 1723. Such an application may be written in a variety of programming languages, such as C, C++, C#, JAVA™, or others. The application may be written in a general-purpose manner to interact with any business or customer BTLE beacon or mobile device acting as a beacon, such as a plurality of mobile devices operated by a business. Business mobile devices may represent a plurality of devices such as smartphones, PDAs, tablets, or other devices, which do not necessarily need to all of one device type, which may run operating systems including IOS™, WINDOWS MOBILE™, ANDROID™, and potentially others, each of which possesses a BTLE transmitter and receiver 1712, 1722 and an application configured to utilize the BTLE transmitter/receiver 1713, 1723. Each device has an operating range 1710, 1720 for their BTLE transmitter/receiver to operate, and when a device crosses into this threshold, it may receive a beacon transmission from another device, and they may transmit communications with each other. The strength of the signal and other signal characteristics may be measured to determine a rough approximation of the distance between the devices.

Figure 18:
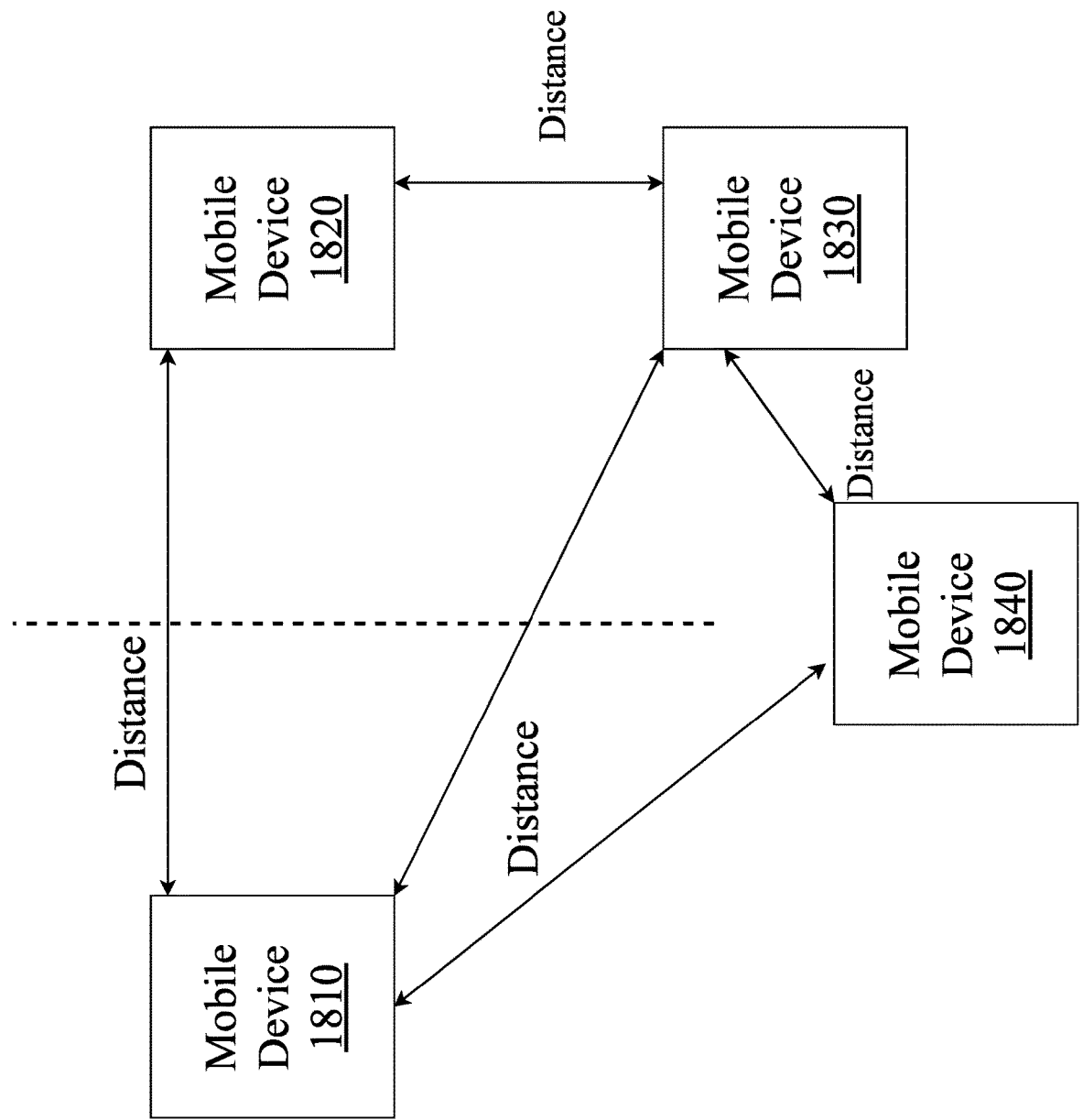
FIG. 18 is a system diagram illustrating multiple BTLE-enabled mobile devices measuring distances between each other, based on triangulations of position from overlapping distance values between each device.

FIG. 18 is a system diagram illustrating multiple BTLE-enabled mobile devices measuring distances between each other, based on triangulations of position from overlapping distance values between each device.

A plurality of mobile devices 1810, 1820, 1830, 1840 exist, such as smartphones, PDAs, tablets, or other devices, which may run an operating system including IOS™, WINDOWS MOBILE™, ANDROID™, and potentially others. Each mobile device 1810, 1820, 1830, 1840 is connected to, or has built into it, a BLUETOOTH™ Low Emissions ("BTLE") transmitter and receiver, and an application that is configured to utilize such a transmitter/receiver. Each device has an operating range for their BTLE transmitter/receiver to operate, and when a device crosses into this threshold, it may receive a beacon transmission from another device, and they may transmit communications with each other. The strength of the signal and other signal characteristics may be measured to determine a rough approximation of the distance between the devices.

Using a plurality of devices each with other devices in range of each other, but with different detected distances between them, as shown, triangulation of a target device may be possible, such as through the use of multiple overlapping distance circles centered on each device, similar to the method by which the epicenter of earthquakes may be detected by multiple detection stations at different points, by calculating how far away the epicenter was from each of the stations, in which case, with 3 or more stations, only one possible point could be the center.

Figure 19:
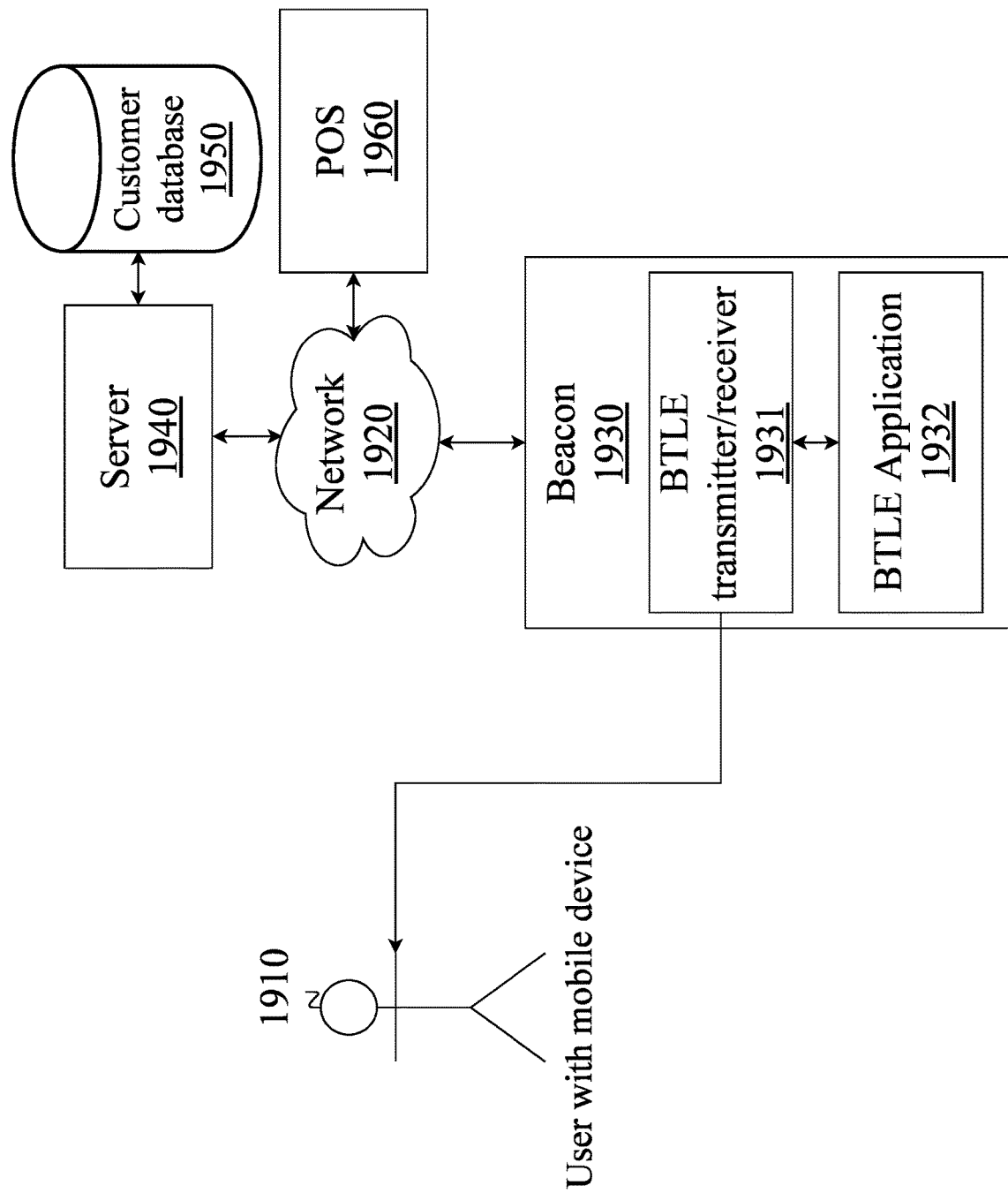
FIG. 19 is a system diagram illustrating a user walking within range of a BTLE-enabled beacon device that may be a mobile device or an affixed beacon device, connected to a point-of-sale device and a business server over a network.

FIG. 19 is a system diagram illustrating a user walking within range of a BTLE-enabled beacon device that may be a mobile device or an affixed beacon device, connected to a point-of-sale device and a business server over a network. A customer 1910 with a mobile device exists and walks within range of a BTLE beacon 1930, in which the customer mobile device and beacon may both or either be a smartphone, PDA, tablet, or other device, which may run an operating system including IOS™, WINDOWS MOBILE™, ANDROID™, and potentially others, and which may be in the possession of a customer or business client. The mobile device and beacon both are connected to, or have built into themselves, a BTLE transmitter and receiver 1931, and an application that is configured to utilize such a transmitter/receiver 1932. Such an application may be written in a variety of programming languages, such as C, C++, C#, JAVA™, or others. The application may be written in a general-purpose manner to interact with any business BTLE beacon or mobile device acting as a beacon, and may be capable of communicating with a network 1920 over either a BTLE transmitter/receiver 1931, or over another form of transmitter/receiver such as WIFI™ or cellular data, to communicate with a network-connected server 1940 and a point-of-sale ("POS") system 1960. The purpose of the business-side application's 1932 communications with the server 1940 and POS 1960 are to both manage and interact with the business' items for sale and their inventory management, if any, and to interact with a server 1940 hosting a customer database 1950 for the purposes of identifying, retrieving, and saving customer information to provide personalized interactions with customer or client-side applications. Such a system may also be used for zero-step authentication, for returning or known customers or clients. Such communications may occur over a local area network, the internet, or some other wide area network, and the server 1940 and customer database 1950 may be hosted either locally or remotely, or exist in a cloud infrastructure. A mobile device with the client application may communicate over a network 1920 or directly with a business beacon 1930 and the business-side application 1932 to establish an initial point of contact, identify a customer if possible, calculate their proximity based on the energy levels of the signal transmissions to and from the user and business device or devices, and with a plurality of devices with different positioning sharing their proximity data, it is possible to calculate a user's location relative to the devices within or near a business, for purposes such as enforcing social distancing, managing table assignments in a restaurant, ensuring that there is an even distribution of employees on a business floor relative to customer positions and routing, and even apply machine learning to customer routes through a business to determine what paths customers may seem to take such as in retail outlets, to maximize their revenue potential by placing products in a manner along the route designed to entice customers more effectively to purchase them.

According to the embodiment, a customer may walk past a business with a beacon 1930 affixed near the area where the customer may be walking, in order to detect the customer and potentially provide incentives via their mobile device to enter the business. Other uses for such a system may be apparent such as analytics for recognized customers that walk past the business at certain hours or in relation to certain changes in the business.

Figure 20:
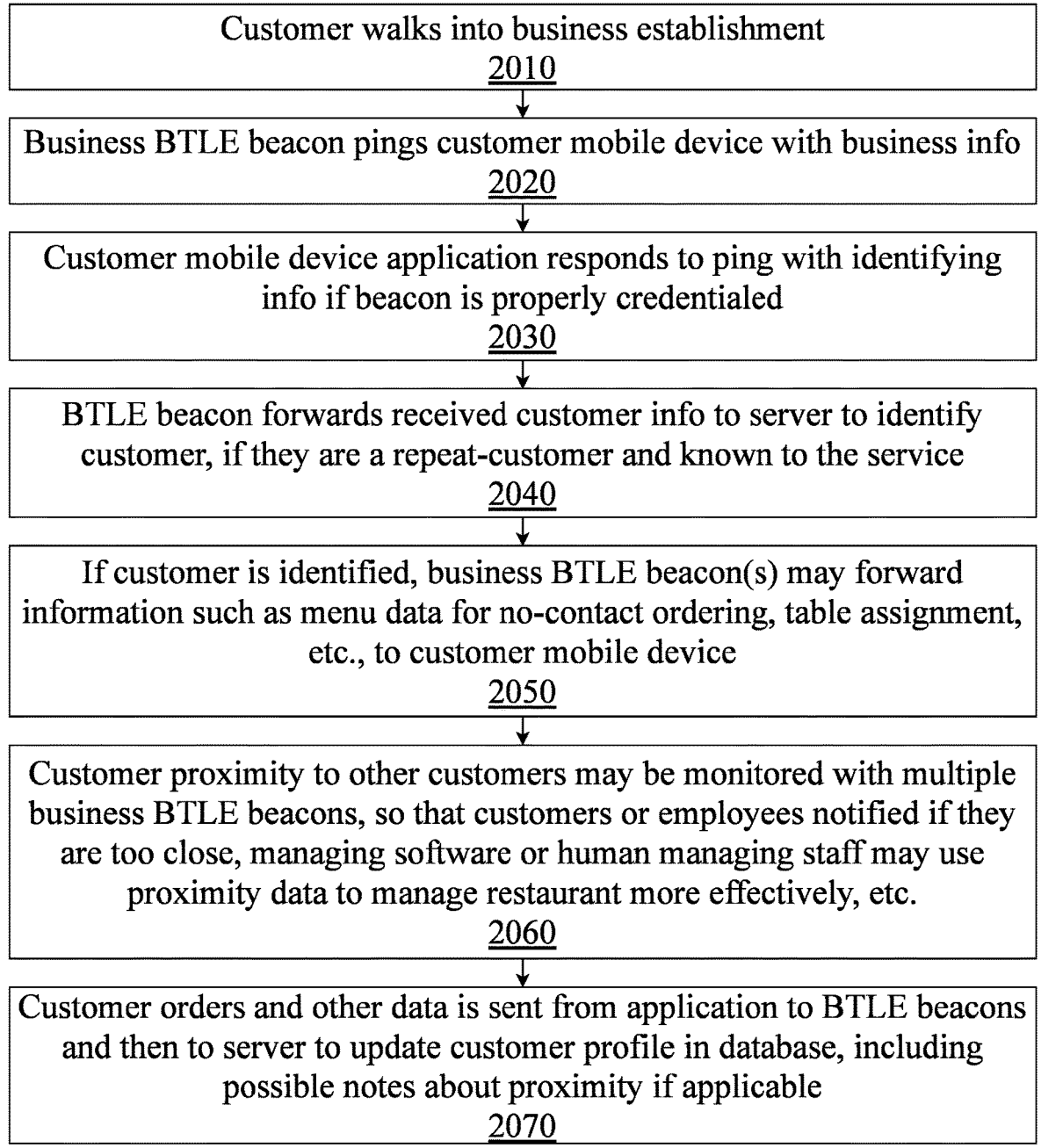
FIG. 20 is a method diagram illustrating a customer or patron walking into a business establishment, with employee devices acting as BTLE beacons and receivers to communicate with the customer or patron device.

FIG. 20 is a method diagram illustrating a customer or patron walking into a business establishment, with employee devices acting as BTLE beacons and receivers to communicate with the customer or patron device. A customer first may walk into a business establishment 2010, such as a restaurant, retail outlet, hotel, or other business, before a business-operated BTLE beacon pings customer mobile device with business info 2020. Such a BTLE beacon may be a mounted or affixed device such as built into the ceiling, built into a wall or walls, affixed to a desk, or it may be a mobile device with a BTLE transmitter and receiver and the associated application for driving the transmitter/receiver. The customer mobile device application may respond to the beacon ping with identifying info if the beacon is properly credentialed 2030, from the customer's own BTLE transmitter/receiver. Proper business beacon credentials may be something stored locally on the customer mobile device, or it may be stored on a server or cloud service that the application may communicate with over a network such as the Internet, and may be a defined set of credentials or a hash key that is defined by the application or application provider. The business BTLE beacon may forward any received customer info to a server or servers, or cloud service, to identify the customer, if they are a repeat-customer and known to the service 2040. A brand-new customer who has never used the application before, or who has not used the application with this business before, may not be able to be identified, but as a new customer their identity within the application may be saved such as a hash of their username or other identifying information in compliance with local regulations and laws surrounding personal information, and their preferences and habits in the business may be saved as well throughout their interaction in the business. If they are identified, the business BTLE beacon or beacons may forward information such as menu data for no-contact ordering, table assignment, reservation information for a hotel, or other business information that may be of interest to the customer, to the customer mobile device 2050, while the customer proximity to other customers, to employees, and to certain parts of the business may be monitored with a plurality of business BTLE beacons, so that customers or employees notified if they are too close, managing software or human managing staff may use proximity data to manage restaurant more effectively, and other functionality may be provided that requires use of proximity-based data 2060. Customer orders, requests, and other data input from the customer that is relevant to the business, may be sent from the client-side application to the BTLE beacon or beacons, which may be handled by the business point-of-sale and further sent to the server maintaining customer identification and usage data, to update the customer profile in the database, including recording any possible notes about the customer proximity if applicable 2070, such as notes about the customer's route through the business or their proclivity for being near others or responding well to certain proximity-based dynamics in the business.

Figure 21:
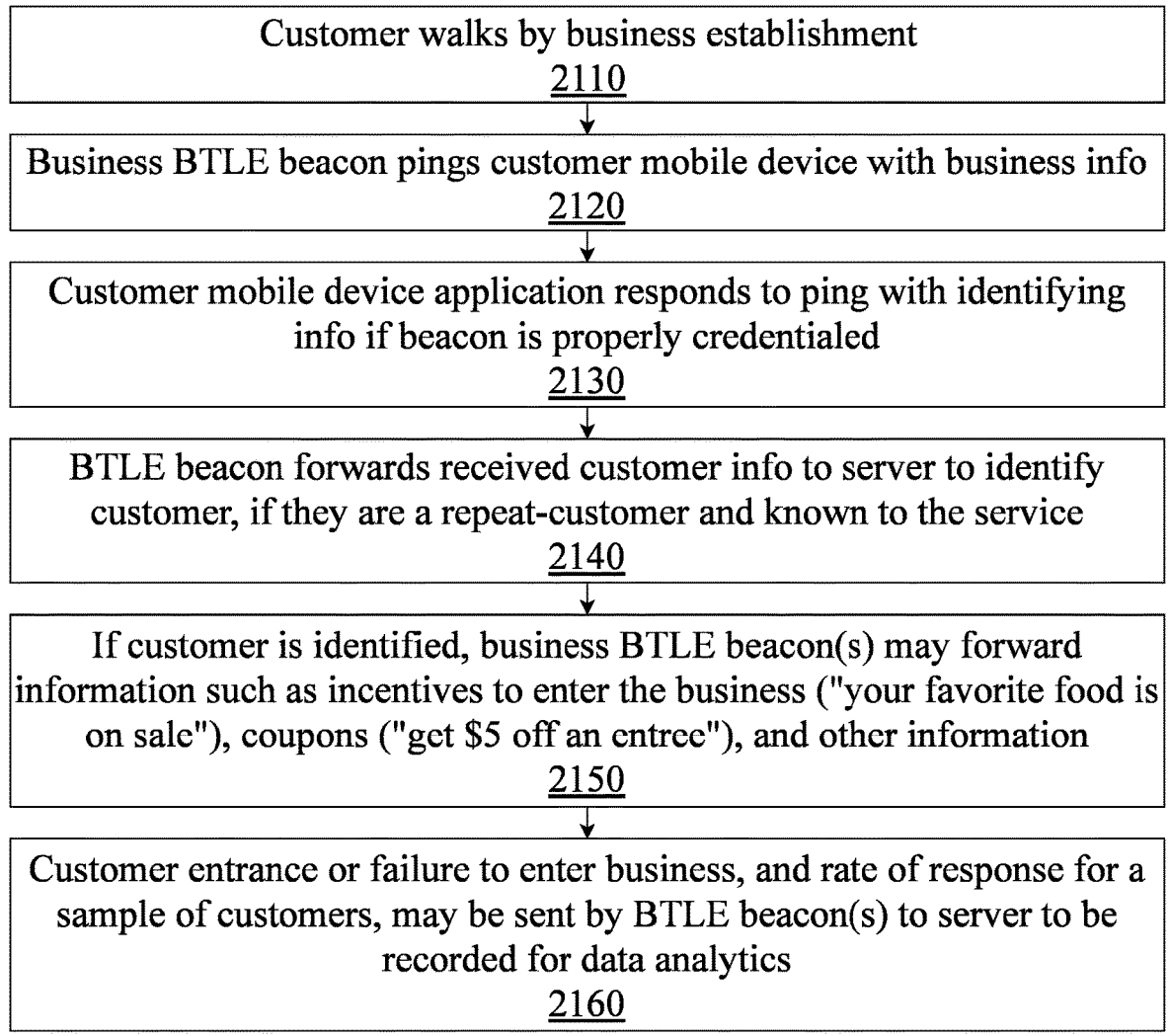
FIG. 21 is a method diagram illustrating a customer or patron walking past a business establishment, with a BTLE beacon or beacons and receivers communicating with the customer or patron device, such as one affixed to a door entryway or near a window facing a sidewalk.

FIG. 21 is a method diagram illustrating a customer or patron walking past a business establishment, with a BTLE beacon or beacons and receivers communicating with the customer or patron device, such as one affixed to a door entryway or near a window facing a sidewalk. A customer first may walk near or walk past a business establishment 2110, such as a restaurant, retail outlet, hotel, or other business, before a business-operated BTLE beacon pings customer mobile device with business info 2120. Such a BTLE beacon may be a mounted or affixed device such as built into the ceiling, built into a wall or walls, affixed to a desk, affixed to a door or by a window to reach customers outside of the business, or it may be a mobile device with a BTLE transmitter and receiver and the associated application for driving the transmitter/receiver. The customer mobile device application may respond to the beacon ping with identifying info if the beacon is properly credentialed 2130, from the customer's own BTLE transmitter/receiver. Proper business beacon credentials may be something stored locally on the customer mobile device, or it may be stored on a server or cloud service that the application may communicate with over a network such as the Internet, and may be a defined set of credentials or a hash key that is defined by the application or application provider. The business BTLE beacon may forward any received customer info to a server or servers, or cloud service, to identify the customer, if they are a repeat-customer and known to the service 2140. A brand-new customer who has never used the application before, or who has not used the application with this business before, may not be able to be identified, but as a new customer their identity within the application may be saved such as a hash of their username or other identifying information in compliance with local regulations and laws surrounding personal information, and their preferences and habits in the business may be saved as well throughout their interaction in the business. If they are identified, the business BTLE beacon or beacons may forward information such as incentives to enter the business, such as coupons, announcements of sales, special items the customer might be known to enjoy based on their prior data with the business, or other such data to attempt to gain the prospective customer, to the customer mobile device 2150. A customer's entry, or failure to enter the business, and the rate of response for a sample of customers, may be sent by the BTLE beacon via their application to a local, internet, or cloud server to be recorded for data analytics 2160, including which methods of communicating to the customer via beacon were successful and which were not.

Figure 22:
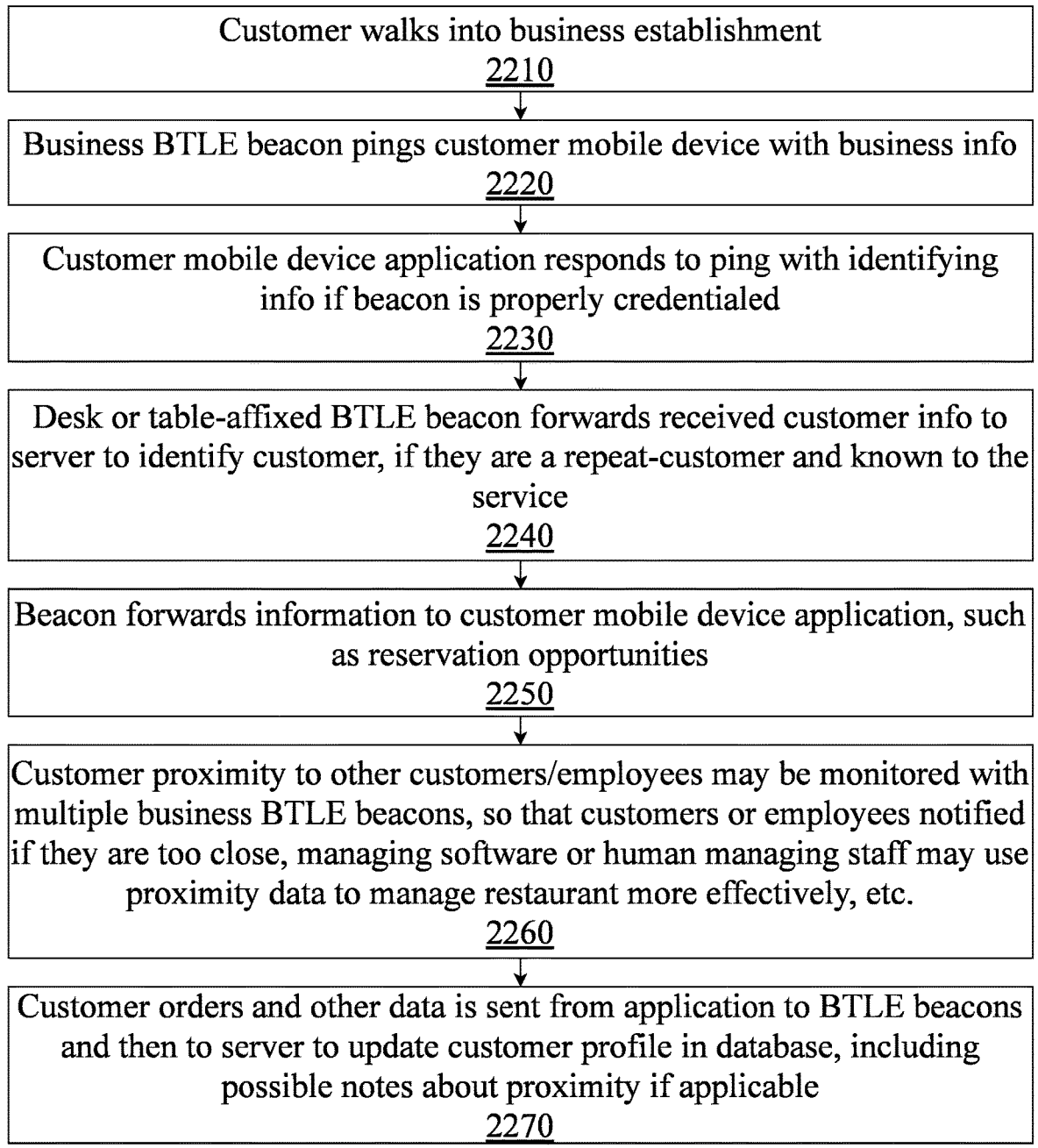
FIG. 22 is a method diagram illustrating a customer or patron walking up to a desk-mounted device such as one mounted in the front of a hotel or other business front-end, to assist or even take the place of a maître d'hôtel and communicate with a customer mobile device.

FIG. 22 is a method diagram illustrating a customer or patron walking up to a desk-mounted device such as one mounted in the front of a hotel or other business front-end, to assist or even take the place of a maître d'hôtel and communicate with a customer mobile device.

A customer first may walk into a business establishment 2210, such as a restaurant, retail outlet, hotel, or other business, before a business-operated BTLE beacon pings customer mobile device with business info 2220. Such a BTLE beacon may be a mounted or affixed device such as built into the ceiling, built into a wall or walls, affixed to a desk, or it may be a mobile device with a BTLE transmitter and receiver and the associated application for driving the transmitter/receiver. The customer mobile device application may respond to the beacon ping with identifying info if the beacon is properly credentialed 2230, from the customer's own BTLE transmitter/receiver. Proper business beacon credentials may be something stored locally on the customer mobile device, or it may be stored on a server or cloud service that the application may communicate with over a network such as the Internet, and may be a defined set of credentials or a hash key that is defined by the application or application provider. A desk or table-affixed BTLE beacon, which may take the place of, or supplement and aid, a maître d'hôtel such as at a hotel or a similar front-of-business manager for other types of establishments, may forward any received customer info to a local or remote server to identify the customer, if they are a repeat-customer and known to the service 2240. They A brand-new customer who has never used the application before, or who has not used the application with this business before, may not be able to be identified, but as a new customer their identity within the application may be saved such as a hash of their username or other identifying information in compliance with local regulations and laws surrounding personal information, and their preferences and habits in the business may be saved as well throughout their interaction in the business. If they are identified, the business BTLE beacon or beacons may forward information such as menu data for no-contact ordering, table assignment, reservation information for a hotel, or other business information that may be of interest to the customer, to the customer mobile device 2250, while the customer proximity to other customers, to employees, and to certain parts of the business may be monitored with a plurality of business BTLE beacons, so that customers or employees notified if they are too close, managing software or human managing staff may use proximity data to manage restaurant more effectively, and other functionality may be provided that requires use of proximity-based data 2260. Customer orders, requests, and other data input from the customer that is relevant to the business, may be sent from the client-side application to the BTLE beacon or beacons, which may be handled by the business point-of-sale and further sent to the server maintaining customer identification and usage data, to update the customer profile in the database, including recording any possible notes about the customer proximity if applicable 2270, such as notes about the customer's route through the business or their proclivity for being near others or responding well to certain proximity-based dynamics in the business.

Figure 23:
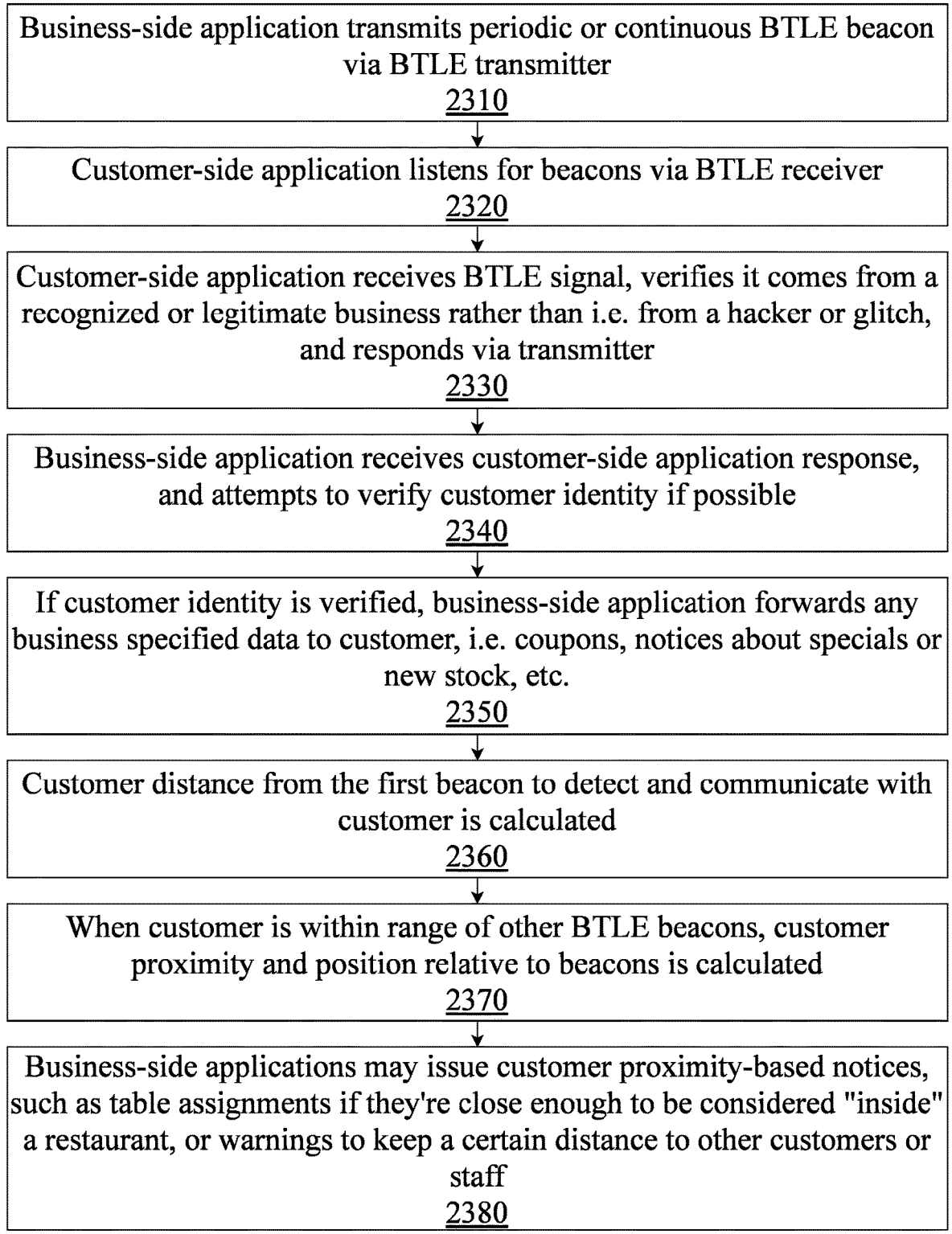
FIG. 23 is a method diagram illustrating steps in the functionality of a BTLE proximity application.

FIG. 23 is a method diagram illustrating steps in the functionality of a BTLE proximity application. A business-side application may be configured either from the application itself, or from a web portal or other application configuration tool, or from within the application itself with the configuration being copied over to other business devices. Such a business application may transmit periodic or continuous BTLE beacon signals via a BTLE transmitter 2310, essentially polling for in-range customer applications to respond to the signal. A customer-side application, which may also be configured to the customer's liking on their mobile device, may listen for beacon signals via a BTLE receiver 2320, while a mobile device is either being used or while it is idle such as in a pocket while the customer may be walking or sitting at a table. The customer-side application receives a business application's BTLE signal, and may verify that the signal comes from a recognized or legitimate business rather than i.e. from a hacker or glitch, and responds via transmitter 2330 to let the beacon know it has reached a customer. The validation process may take the form of checking the device's local storage for data on the business in question, or checking a server or cloud service for validation of the business, or the business may broadcast a hash that verifies it as legitimate with the client application even if the client application has never encountered the business before, such as with a piece of secure data that the application knows can only be generated by legitimate business BTLE beacon applications. The response may include basic customer identifying information if enabled and permitted by the user of the application, at which point the business-side application may receive the customer-side application's response, and attempt to verify the customer identity if possible 2340, either with local storage of customer information or with a remote server that has access to a database of customer information, including identifying information. Such a database may be a SQL™ or NOSQL™ database format, such as MONGODB™, and identifying information could for instance take the form of a user's password hash and their username with the application, which may be checked against the database records securely. If the customer's identity is able to be verified, the business-side application may forward any business specified data to the customer's application over the BTLE signal connection, such as coupons, notices about special sales or pricings, new inventory, and other business messages that may be specified by the business itself 2350. For proximity-based uses, the customer's distance from the first beacon that successfully communicated with the customer calculated 2360, based on the signal strength received from the customer, allowing for other beacons to further communicate with each other if the customer comes within range to triangulate the customer's location relative to the beacons with high accuracy 2370. The beacons, whether affixed or being hosted on mobile devices such as smartphones in use by employees, may issue to the customer various proximity-based notices, such as table assignments if they're close enough to be considered "inside" a restaurant, or warnings to keep a certain distance to other customers or staff 2380, or their proximity data may be used for analytics by the business.

Figure 24:
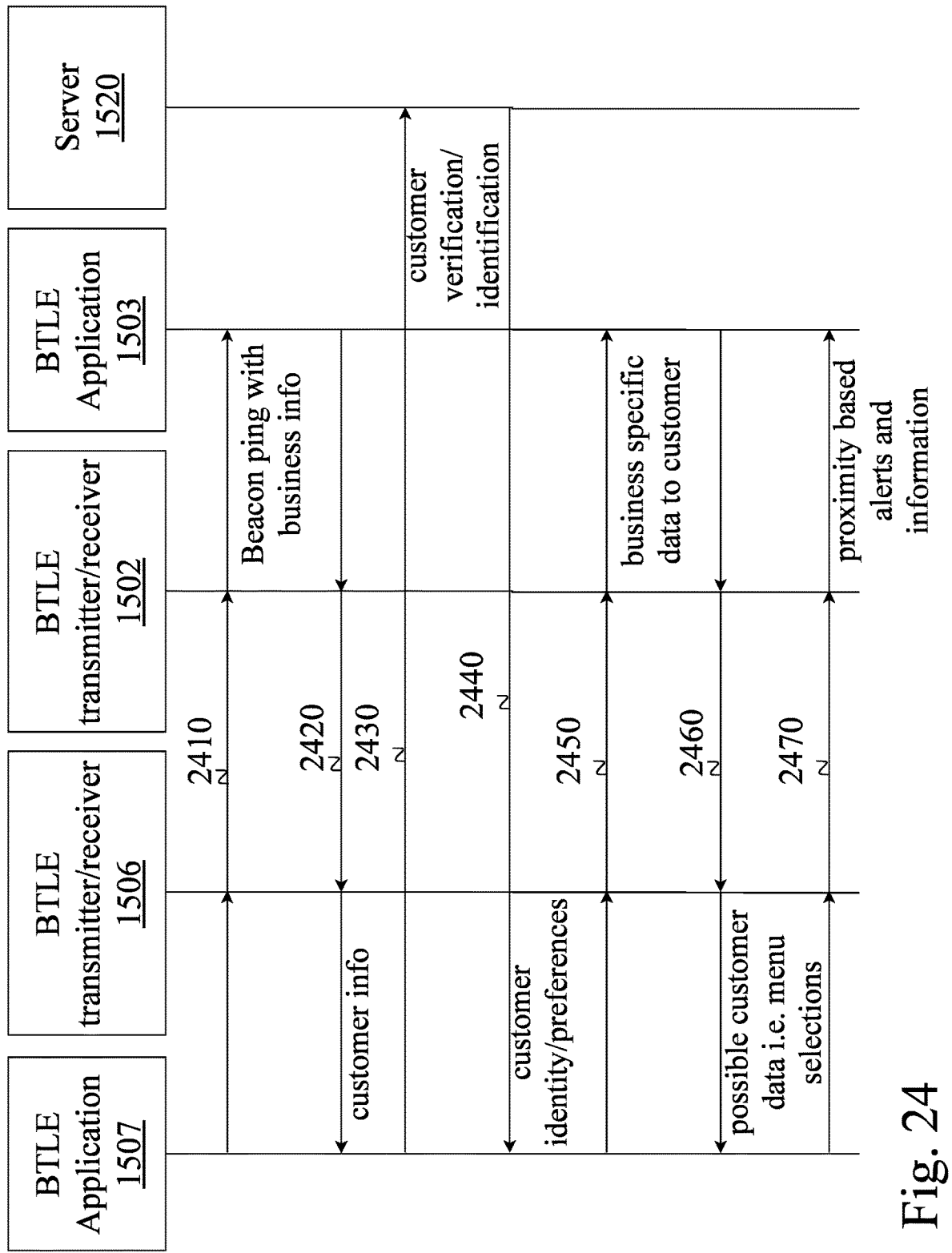
FIG. 24 is a message flow diagram illustrating messages transferred between components in a system for zero-step customer proximity detection using mobile device low emissions beacons.

FIG. 24 is a message flow diagram illustrating messages transferred between components in a system for zero-step customer proximity detection using mobile device low emissions beacons. At least two mobile devices exist, such as a smartphone, PDA, tablet, or other device, which may run an operating system including IOS™, WINDOWS MOBILE™, ANDROID™, and potentially others, and which may be in the possession of a customer or business client. The mobile devices are each connected to, or have built into them, individual BLUETOOTH™ Low Emissions ("BTLE") transmitters and receivers 1502, 1506, and an application that is configured to utilize such a transmitter/receiver 1503, 1507. Such an application may be written in a variety of programming languages, such as C, C++, C#, JAVA™, or others. The application may be written in a general-purpose manner to interact with any business BTLE beacon or mobile device acting as a beacon, such as a plurality of mobile devices operated by a business 1505, and may either maintain a local memory store of recognized and known businesses (which may be treated differently than unknown business beacons) or may connect to a network and server 1520 to determine of a business' supplied information over BTLE transmitter and receiver communications is legitimate. Business mobile devices may represent a plurality of devices such as smartphones, PDAs, tablets, or other devices, which do not necessarily need to all of one device type, which may run operating systems including IOS™, WINDOWS MOBILE™, ANDROID™, and potentially others, each of which possesses a BTLE transmitter and receiver 1506 and a business-side application configured to utilize the BTLE transmitter/receiver 1507.

As a possible first step in the flow of messages between these components, a business-side BTLE application 1507 forwards a data ping to its own transmitter/receiver 1506, to a customer's receiver 1502, which is then interpreted by the customer's application 1503, 2410. Such a data ping could simply be encoded or encrypted business-identifying information, which only a customer application 1503 could unencode or decrypt and properly validate, but which would be useless to interceptors. A customer application 1503 makes a response message, which is sent to its own transmitter 1502, to the beacon's receiver 1506, and interpreted by the beacon's application 1507, with the customer's information 2420, which may be identifying information such as a username and password hash, just a username, the customer's real name, or some other singular or combination of identifying information, and may include preference information relevant to the business if specified by the user. The business application 1507 may make a customer verification or identification call 2430 across a local area or wide area network to a server 1520 that may be able to determine in a connected database whether the customer is who they claim to be, and if there is any relevant data on the customer such as known preferences or habits that the business applications should be aware of, such as which coupons to entice a customer with. Any information on the customer that the server 1520 is able to verify and access is sent to the business application 1507, 2440. The business application 1507 then transmits to the customer application 1503 any business-specific data that the business application may determine is relevant to the customer 2450. For example, the business application may be told by the server 1520 that the customer has been to the business, such as a café, before, and ordered a slice of cheesecake. The business application may then offer the customer 10% off a slice of cheesecake as an informal loyalty reward, or may simply mention that they have a new variety or flavor of cheesecake available to order now, to entice the customer or provide better automated customer service. A customer application 1503 may then respond to a previous data transmission by the business application 1507, or send its own transmission regardless of a previous transmission from a business application 1507, such as a menu choice for no-contact menu ordering, setting reservations at a hotel, or responding to coupons offered by the business application 2460. A variety of proximity-based alerts and data transmissions may be possible from the business application 1507 to the client application 1503, 2470, such as telling them which table is theirs, letting them see where the nearest staff member is on a map of the business floor, warning them of their proximity to perhaps other customers or a fire exit, and more.

Many possible uses for proximity data and proximity-time-series data exist for businesses, and it will be apparent to many with average skill in the art that this system may be used for several other purposes using the same configuration and methods as described herein, for analytics, customer service, and more.

Figure 25:
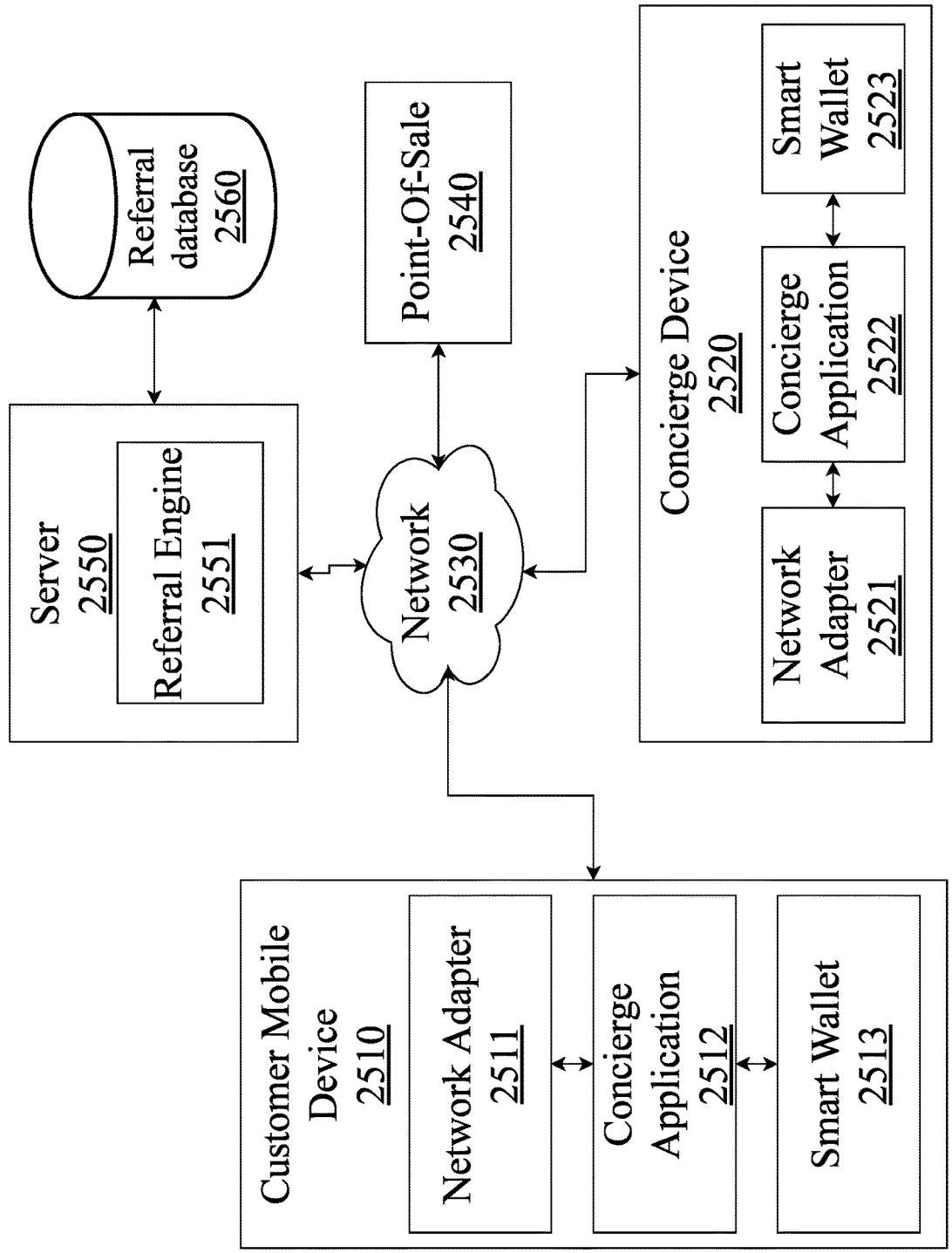
FIG. 25 is a system diagram illustrating components used for customer and business referral using a concierge system, according to a preferred aspect.

FIG. 25 is a system diagram illustrating components used for customer and business referral using a concierge system, according to a preferred aspect. A customer mobile device 2510 may be used by a regular business customer such as a restaurant diner, shopper, or similar. Such a mobile device 2510 may be a smartphone such as an IPHONE™, a phone operating an ANDROID™ operating system, other configurations of smartphones, a tablet, a personal digital assistant, or another type of mobile device capable of communicating wirelessly with other devices and networks such as over WiFi or BLUETOOTH™. Each such device 2510, 2520, must have a network adapter 2511, 2521 that is capable of communicating with local or wide area networks 2530 (LAN or WAN respectively) or with other devices wirelessly, a concierge application 2512, 2522, and a smart wallet application 2513, 2523. A concierge application 2512, 2522 may be written in any number of programming languages including JAVA™, C, C#™, GO™, JAVASCRIPT™, or a combination of programming languages. A concierge application 2512, 2522 may be designed to communicate with a server 2550 and referral engine 2551 over a network 2530, a business point-of-sale ("POS") 2540 over a network or directly such as with a BLUETOOTH™ connection, a smart wallet application 2513, 2523, and other devices with concierge applications 2510, 2520. The purpose and functionality of such a concierge application 2512, 2522 may be to place business orders and reservations with registered businesses through their POS 2540 either for itself or for another customer that may have a registration with a concierge application server 2550, refer non-users to the concierge application to facilitate the spread of the application among consumers, reimburse such referrers, and help individuals find each other and potentially share, exchange, or give placed orders or reservations to each other if desired, through the concierge application, for facilitating businesses. Such actions may be recorded in a referral database 2560, and compensation may be disbursed through either a hosting or owning company of the concierge application system, or through a business that has had its products referred or ordered via a concierge to another customer, essentially replicating and automating a "finder's fee" or "commission" for possible third-party concierges.

Figure 26:
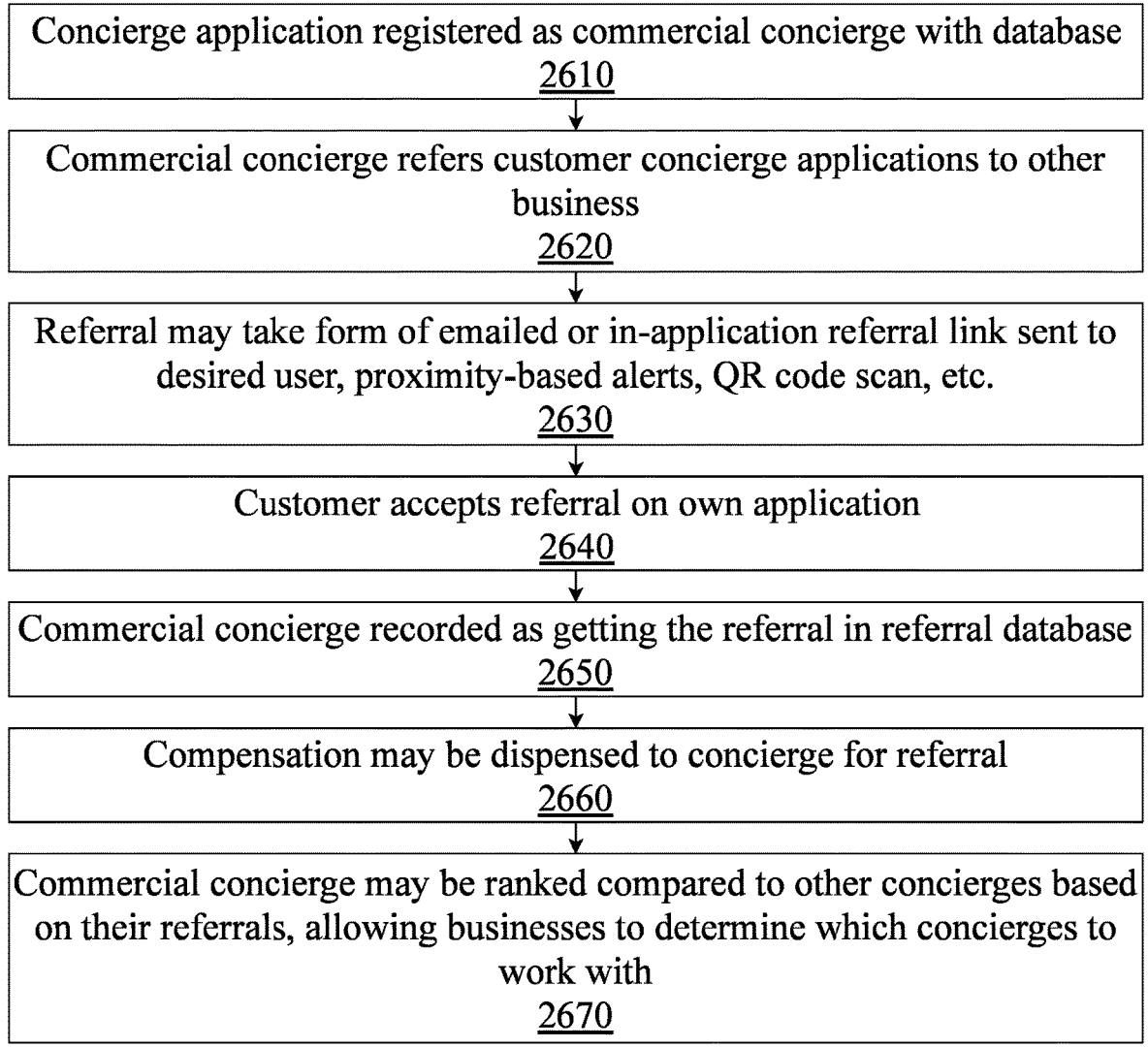
FIG. 26 is a method diagram illustrating steps in a commercial concierge account referring a user to other businesses.

FIG. 26 is a method diagram illustrating steps in a commercial concierge account referring a user to other businesses. A concierge application may register as a commercial concierge, a separate classification from other concierge applications and accounts, with a referral database 2610 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A commercial concierge first may refer a customer concierge application or applications to other businesses 2620, for instance a commercial concierge may be an in-human representative at the front-end of a hotel, and when asked by hotel guests about local attractions, refer them to a specific restaurant, and offer to make reservations for the hotel guests at the restaurant. The referral may take one of several forms on the customer's concierge application, including an emailed or in-application referral link, proximity-based alerts such as with BLUETOOTH™ or infrared scanning, QR code scanning, or the customer manually telling the commercial concierge their username to send the reservation to 2630. Many different potential methods of simply relaying the data about the reservation may be possible in the art. The customer may need to accept the referral or reservation on their own application 2640 to ensure proper security so that a commercial concierge cannot make dubious or outright fraudulent orders or reservations for a customer to earn unjustified commission or other compensations. The commercial concierge account may then be recorded as getting the referral in a referral database 2650, for recordkeeping purposes, such as if a success/fail ratio of referring customers may influence which businesses choose to allow a specific commercial concierge to do business with them, or what their compensation might be (i.e. more successful concierges might be able to command higher compensation for referrals). The compensation, if any, may then be dispersed to the commercial concierge, after the customer accepts the referred order or reservation 2660. This may be done with a point of sale system connected to the business and a smart wallet application owned by the commercial concierge, or some other financial arrangement such as a direct deposit for the concierge, or a coupon or discount on future goods ordered from the business. The commercial concierge may be ranked compared to other concierges based on their referrals and their success/failure ratio, allowing businesses to determine which concierges to work with 2670, as previously described, allowing for a gamification to take place and for competition to encourage commercial concierges to entice customers more successfully.

Figure 27:
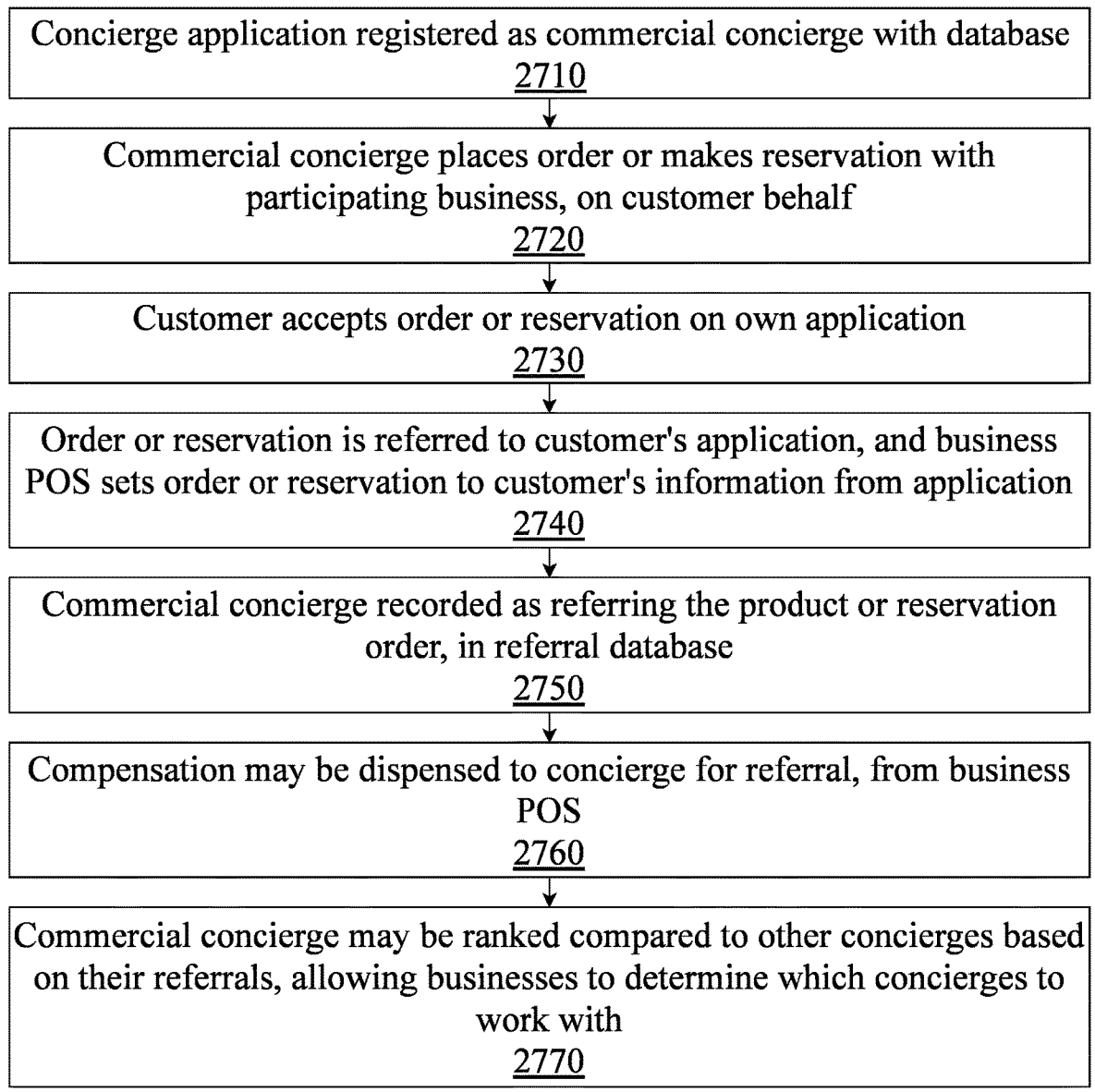
FIG. 27 is a method diagram illustrating steps in a commercial concierge account placing an order or reservation for a customer at a third party business.

FIG. 27 is a method diagram illustrating steps in a commercial concierge account placing an order or reservation for a customer at a third party business. A concierge application may register as a commercial concierge, a separate classification from other concierge applications and accounts, with a referral database 2710 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A commercial concierge first may place an order for a product, service, or reservation, at another business 2720, for instance a commercial concierge may be an in-human representative at the front-end of a hotel, and when asked by hotel guests about local attractions, refer them to a specific restaurant, and offer to make reservations for the hotel guests at the restaurant, the specific reservation being transferred to the customer's concierge application, from the commercial concierge. The referral may take one of several forms on the customer's concierge application, including an emailed or in-application referral link, proximity-based alerts such as with BLUETOOTH™ or infrared scanning, QR code scanning, or the customer manually telling the commercial concierge their username to send the reservation to 2730. In this aspect, the referral is not merely referring a customer to a business, but placing an actual order for the customer specifically. Many different potential methods of simply relaying the data about the reservation may be possible in the art. The customer may need to accept the referral or reservation on their own application to ensure proper security so that a commercial concierge cannot make dubious or outright fraudulent orders or reservations for a customer to earn unjustified commission or other compensations. The business POS or other systems such as an inventory or reservation system may set the customer's order or reservation information to the information on the customer for whom the reservation or product order was transferred 2740, by way of either the commercial or customer concierge application communicating with the business POS or other system over a network, or communication with the referral server which then updates the business POS or other system to have the newly updated customer information for order or reservation ownership. The commercial concierge account may then be recorded as getting the order referral in a referral database 2750, for recordkeeping purposes, such as if a success/fail ratio of referring customers may influence which businesses choose to allow a specific commercial concierge to do business with them, or what their compensation might be (i.e. more successful concierges might be able to command higher compensation for referrals). The compensation, if any, may then be dispersed to the commercial concierge, after the customer accepts the referred order or reservation 2760. This may be done with a point of sale system connected to the business and a smart wallet application owned by the commercial concierge, or some other financial arrangement such as a direct deposit for the concierge, or a coupon or discount on future goods ordered from the business. The commercial concierge may be ranked compared to other concierges based on their referrals and their success/failure ratio, allowing businesses to determine which concierges to work with 2770, as previously described, allowing for a gamification to take place and for competition to encourage commercial concierges to entice customers more successfully.

Figure 28:
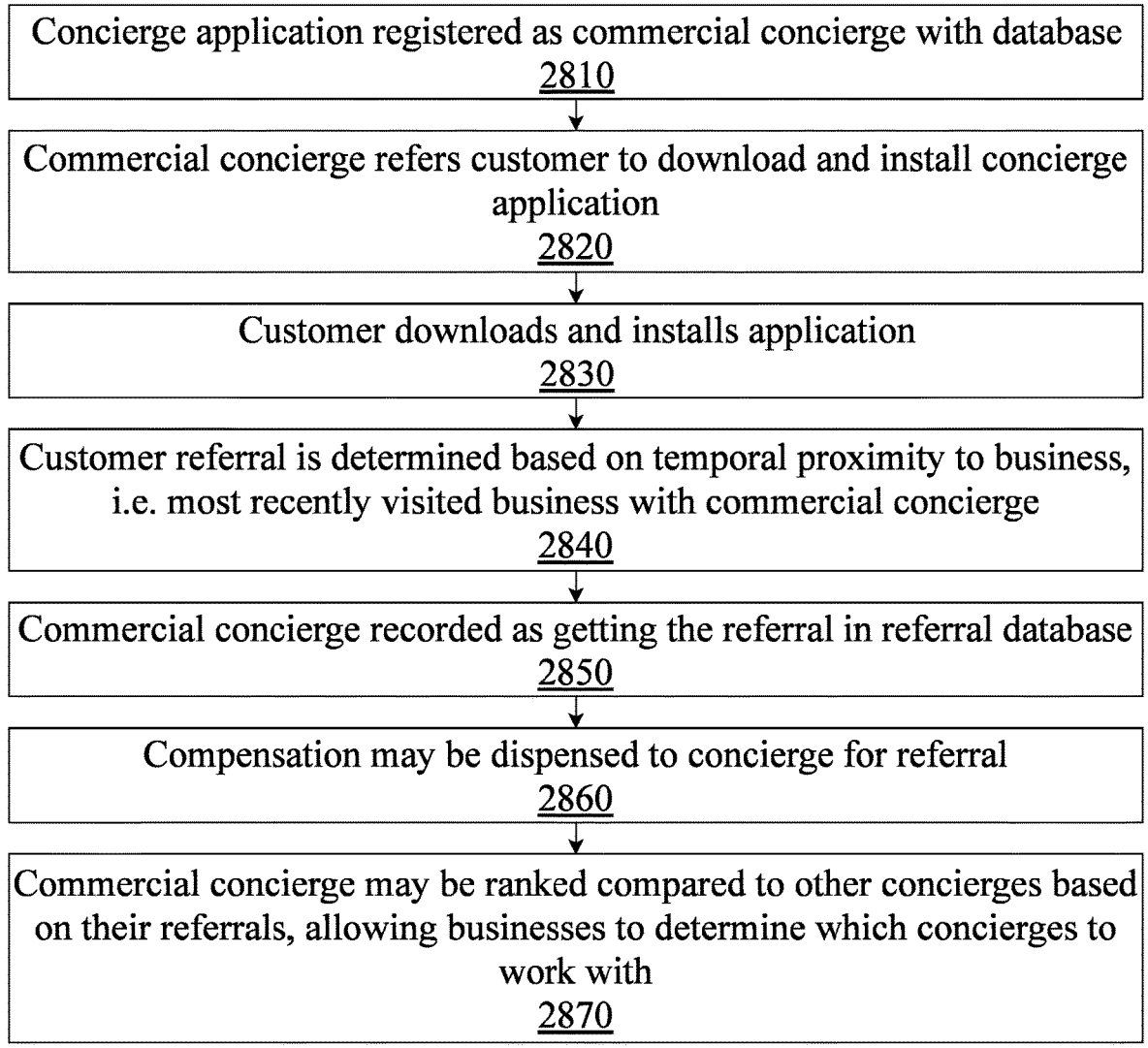
FIG. 28 is a method diagram illustrating steps in a customer signing up for a concierge account, with a business being referral credit based on temporal proximity from the time the account is created and the customer's visit to the business.

FIG. 28 is a method diagram illustrating steps in a customer signing up for a concierge account, with a business being referral credit based on temporal proximity from the time the account is created and the customer's visit to the business. A concierge application may register as a commercial concierge, a separate classification from other concierge applications and accounts, with a referral database 2810 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A commercial concierge first may refer a customer to download the concierge application (the same application as the commercial concierge, but without commercial concierge functionality unless the customer goes through the same registration and approval process) 2820, for instance a commercial concierge may be an in-human representative at the front-end of a restaurant, and refer them to the application for the features it offers in acquiring referrals and transferring orders and reservations for businesses and with other commercial concierges, and may offer to give them a code or link or other type of referral to the application, to acquire credit for the referral. The referral may take one of several forms on the customer's mobile device, including an emailed referral link, proximity-based alerts such as with BLUETOOTH™ or infrared scanning, QR code scanning, or temporal proximity to a registered commercial concierge or business with such a concierge registered to it 2830. Many different potential methods of simply relaying the data about the reservation may be possible in the art. The customer's referral is determined in this exemplary aspect by the temporal proximity to a business or commercial concierge, meaning that based on the most recent business or commercial concierge they were near that is capable of receiving referral credit, and in the absence of other reference indicators, that business or commercial concierge will acquire the referral credit 2840. The commercial concierge account may then be recorded as getting the referral in a referral database 2850, for record-keeping purposes, such as if a success/fail ratio of referring customers may influence the rates at which the commercial concierge is compensated for future referrals to the application. The compensation, if any, may then be dispersed to the commercial concierge, after the customer is referred 2860. This may be done with a point of sale system connected to the business and a smart wallet application owned by the commercial concierge, or some other financial arrangement such as a direct deposit for the concierge, or a coupon or discount on future goods ordered from a business. The commercial concierge may be ranked compared to other concierges based on their referrals and their success/failure ratio 2870, as previously described, allowing for a gamification to take place and for competition to encourage commercial concierges to entice customers more successfully.

Figure 29:
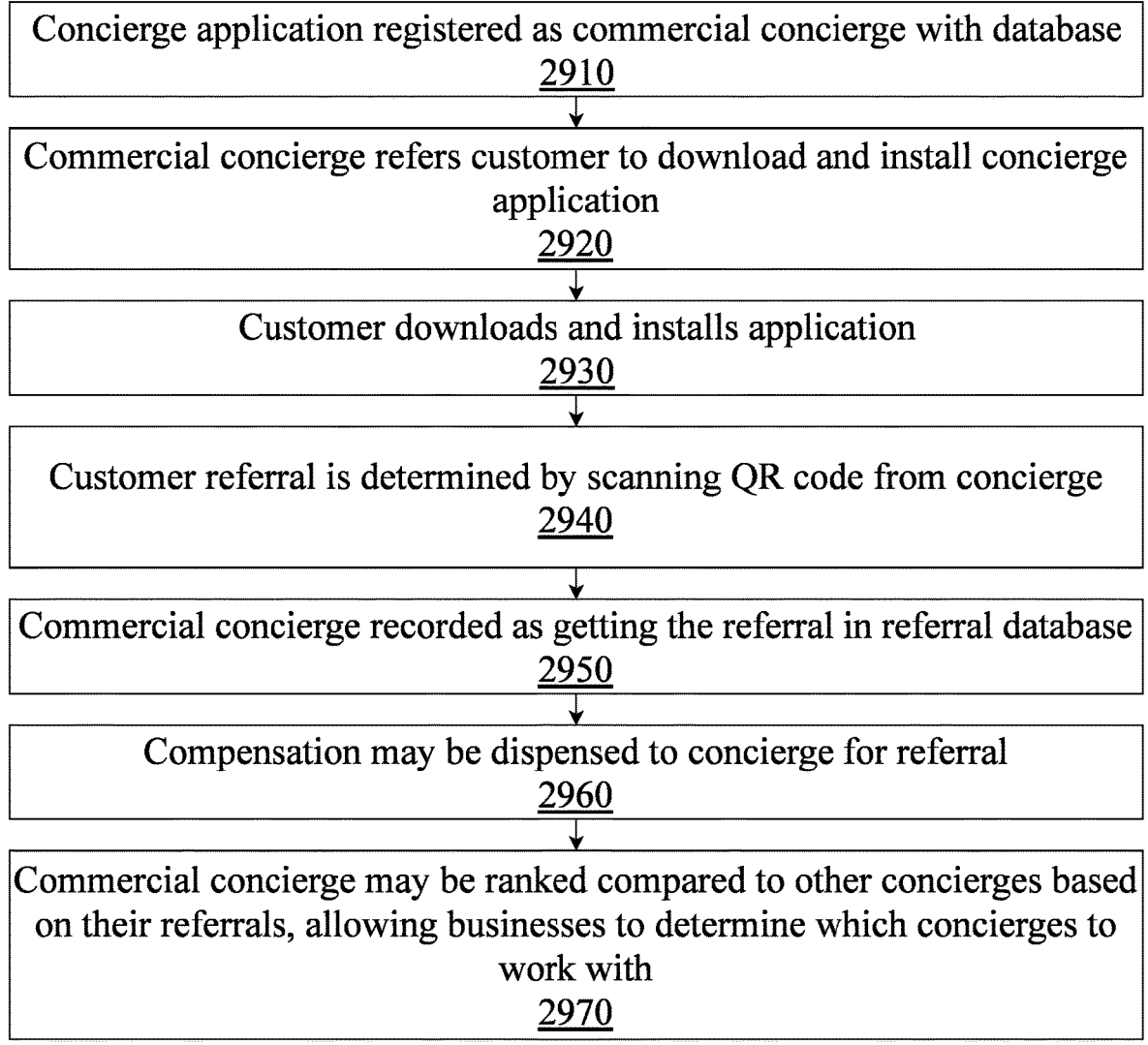
FIG. 29 is a method diagram illustrating steps in a customer signing up for a concierge account via a QR code to be scanned for application download and registration, with the QR code giving referral credit to the referring entity.

FIG. 29 is a method diagram illustrating steps in a customer signing up for a concierge account via a QR code to be scanned for application download and registration, with the QR code giving referral credit to the referring entity. A concierge application may register as a commercial concierge, a separate classification from other concierge applications and accounts, with a referral database 2910 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A commercial concierge first may refer a customer to download the concierge application (the same application as the commercial concierge, but without commercial concierge functionality unless the customer goes through the same registration and approval process) 2920, for instance a commercial concierge may be an in-human representative at the front-end of a restaurant, and refer them to the application for the features it offers in acquiring referrals and transferring orders and reservations for businesses and with other commercial concierges, and may offer to give them a code or link or other type of referral to the application, to acquire credit for the referral. The referral may take one of several forms on the customer's mobile device, including an emailed referral link, proximity-based alerts such as with BLUETOOTH™ or infrared scanning, QR code scanning, or temporal proximity to a registered commercial concierge or business with such a concierge registered to it 2930. Many different potential methods of simply relaying the data about the reservation may be possible in the art. The customer's referral is determined in this exemplary aspect by the scanning a QR code that, when generated, is associated with a registration link tied to the commercial concierge, so that the referring business or commercial concierge will acquire the referral credit 2940. The commercial concierge account may then be recorded as getting the referral in a referral database 2950, for record-keeping purposes, such as if a success/fail ratio of referring customers may influence the rates at which the commercial concierge is compensated for future referrals to the application. The compensation, if any, may then be dispersed to the commercial concierge, after the customer is referred 2960. This may be done with a point of sale system connected to the business and a smart wallet application owned by the commercial concierge, or some other financial arrangement such as a direct deposit for the concierge, or a coupon or discount on future goods ordered from a business. The commercial concierge may be ranked compared to other concierges based on their referrals and their success/failure ratio 2970, as previously described, allowing for a gamification to take place and for competition to encourage commercial concierges to entice customers more successfully.

Figure 30:
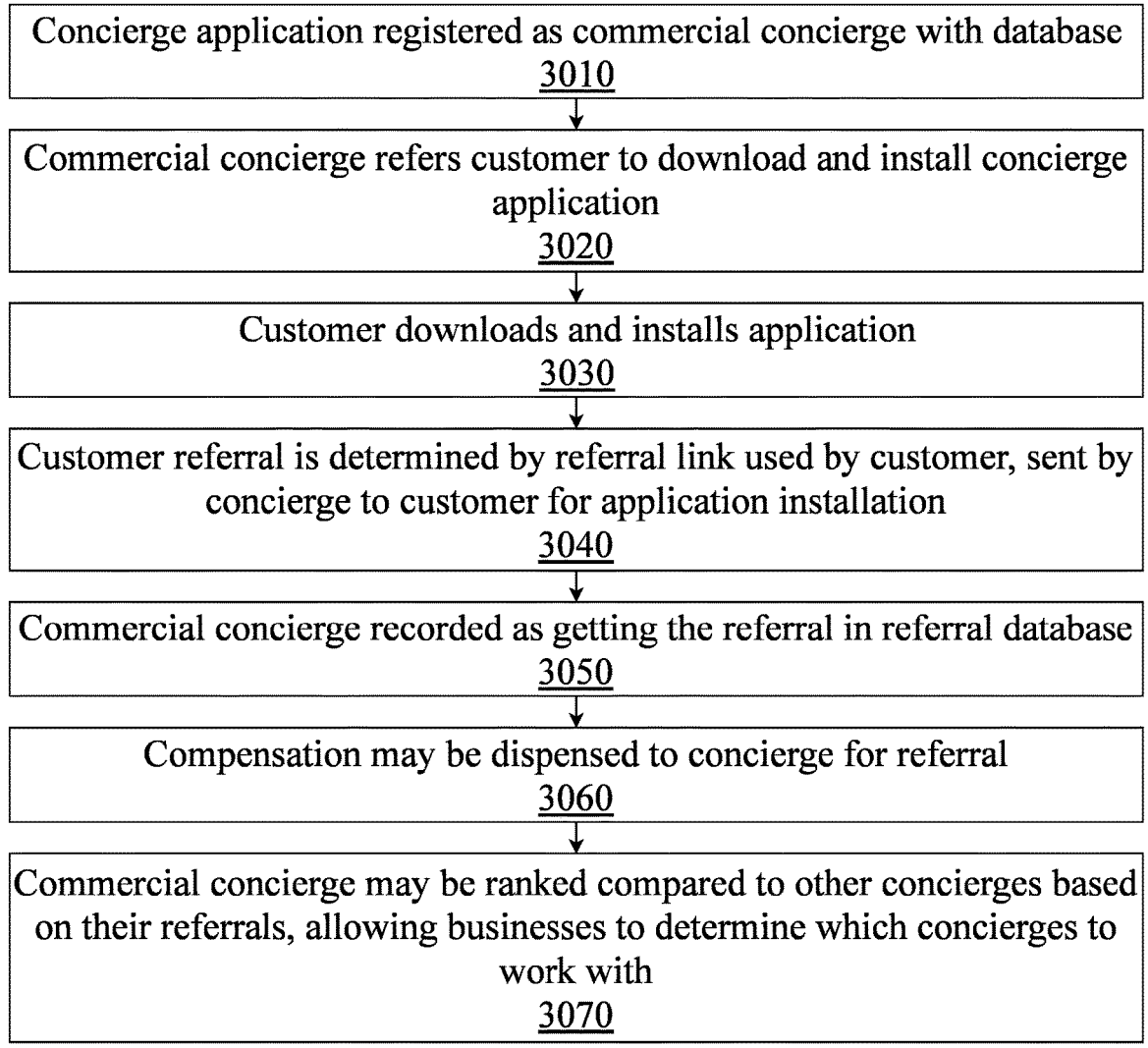
FIG. 30 is a method diagram illustrating steps in a customer signing up for a concierge account via a referral code or referral link, acquired from another concierge or referring business, with the referring link or code giving referral credit to the referring entity.

FIG. 30 is a method diagram illustrating steps in a customer signing up for a concierge account via a referral code or referral link, acquired from another concierge or referring business, with the referring link or code giving referral credit to the referring entity. A concierge application may register as a commercial concierge, a separate classification from other concierge applications and accounts, with a referral database 3010 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A commercial concierge first may refer a customer to download the concierge application (the same application as the commercial concierge, but without commercial concierge functionality unless the customer goes through the same registration and approval process) 3020, for instance a commercial concierge may be an in-human representative at the front-end of a restaurant, and refer them to the application for the features it offers in acquiring referrals and transferring orders and reservations for businesses and with other commercial concierges, and may offer to give them a code or link or other type of referral to the application, to acquire credit for the referral. The referral may take one of several forms on the customer's mobile device, including an emailed referral link, proximity-based alerts such as with BLUETOOTH™ or infrared scanning, QR code scanning, or temporal proximity to a registered commercial concierge or business with such a concierge registered to it 3030. Many different potential methods of simply relaying the data about the reservation may be possible in the art. The customer's referral is determined in this exemplary aspect by using a referral link that, when generated, is a link to download and install the application but tied to the commercial concierge such as with URL parameters indicating an ID or hash code that represents the commercial concierge, so that the referring business or commercial concierge will acquire the referral credit 3040. The commercial concierge account may then be recorded as getting the referral in a referral database 3050, for recordkeeping purposes, such as if a success/fail ratio of referring customers may influence the rates at which the commercial concierge is compensated for future referrals to the application. The compensation, if any, may then be dispersed to the commercial concierge, after the customer is referred 3060. This may be done with a point of sale system connected to the business and a smart wallet application owned by the commercial concierge, or some other financial arrangement such as a direct deposit for the concierge, or a coupon or discount on future goods ordered from a business. The commercial concierge may be ranked compared to other concierges based on their referrals and their success/failure ratio 3070, as previously described, allowing for a gamification to take place and for competition to encourage commercial concierges to entice customers more successfully.

Figure 31:
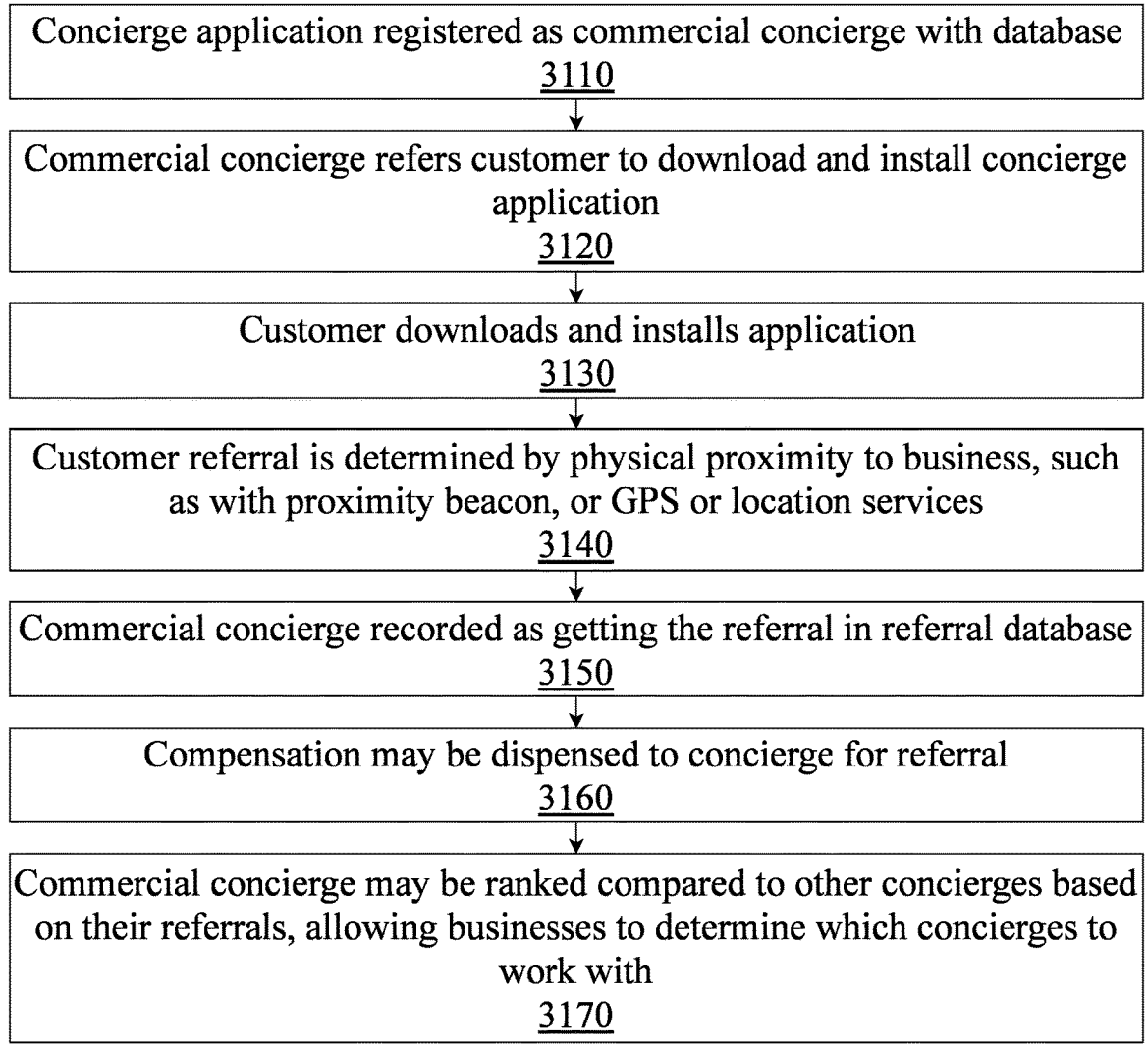
FIG. 31 is a method diagram illustrating steps in a customer downloading a concierge application, the application sensing a beacon or mapping the location of the customer to being associated with a registered business or commercial concierge, and associating that business or commercial concierge with referral credit for the customer's download.

FIG. 31 is a method diagram illustrating steps in a customer downloading a concierge application, the application sensing a beacon or mapping the location of the customer to being associated with a registered business or commercial concierge, and associating that business or commercial concierge with referral credit for the customer's download. A concierge application may register as a commercial concierge, a separate classification from other concierge applications and accounts, with a referral database 3110 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A commercial concierge first may refer a customer to download the concierge application (the same application as the commercial concierge, but without commercial concierge functionality unless the customer goes through the same registration and approval process) 3120, for instance a commercial concierge may be an in-human representative at the front-end of a restaurant, and refer them to the application for the features it offers in acquiring referrals and transferring orders and reservations for businesses and with other commercial concierges, and may offer to give them a code or link or other type of referral to the application, to acquire credit for the referral. The referral may take one of several forms on the customer's mobile device, including an emailed referral link, proximity-based alerts such as with BLUETOOTH™ or infrared scanning, QR code scanning, or temporal proximity to a registered commercial concierge or business with such a concierge registered to it 3130. Many different potential methods of simply relaying the data about the reservation may be possible in the art. The customer's referral is determined in this exemplary aspect by using proximity to the business such as through a BLUETOOTH™ enabled beacon, wireless network identity, or GPS or location services placing them in a business or near a commercial concierge, so that the referring business or commercial concierge will acquire the referral credit 3140. The commercial concierge account may then be recorded as getting the referral in a referral database 3150, for recordkeeping purposes, such as if a success/fail ratio of referring customers may influence the rates at which the commercial concierge is compensated for future referrals to the application. The compensation, if any, may then be dispersed to the commercial concierge, after the customer is referred 3160. This may be done with a point of sale system connected to the business and a smart wallet application owned by the commercial concierge, or some other financial arrangement such as a direct deposit for the concierge, or a coupon or discount on future goods ordered from a business. The commercial concierge may be ranked compared to other concierges based on their referrals and their success/failure ratio 3170, as previously described, allowing for a gamification to take place and for competition to encourage commercial concierges to entice customers more successfully.

Figure 32:
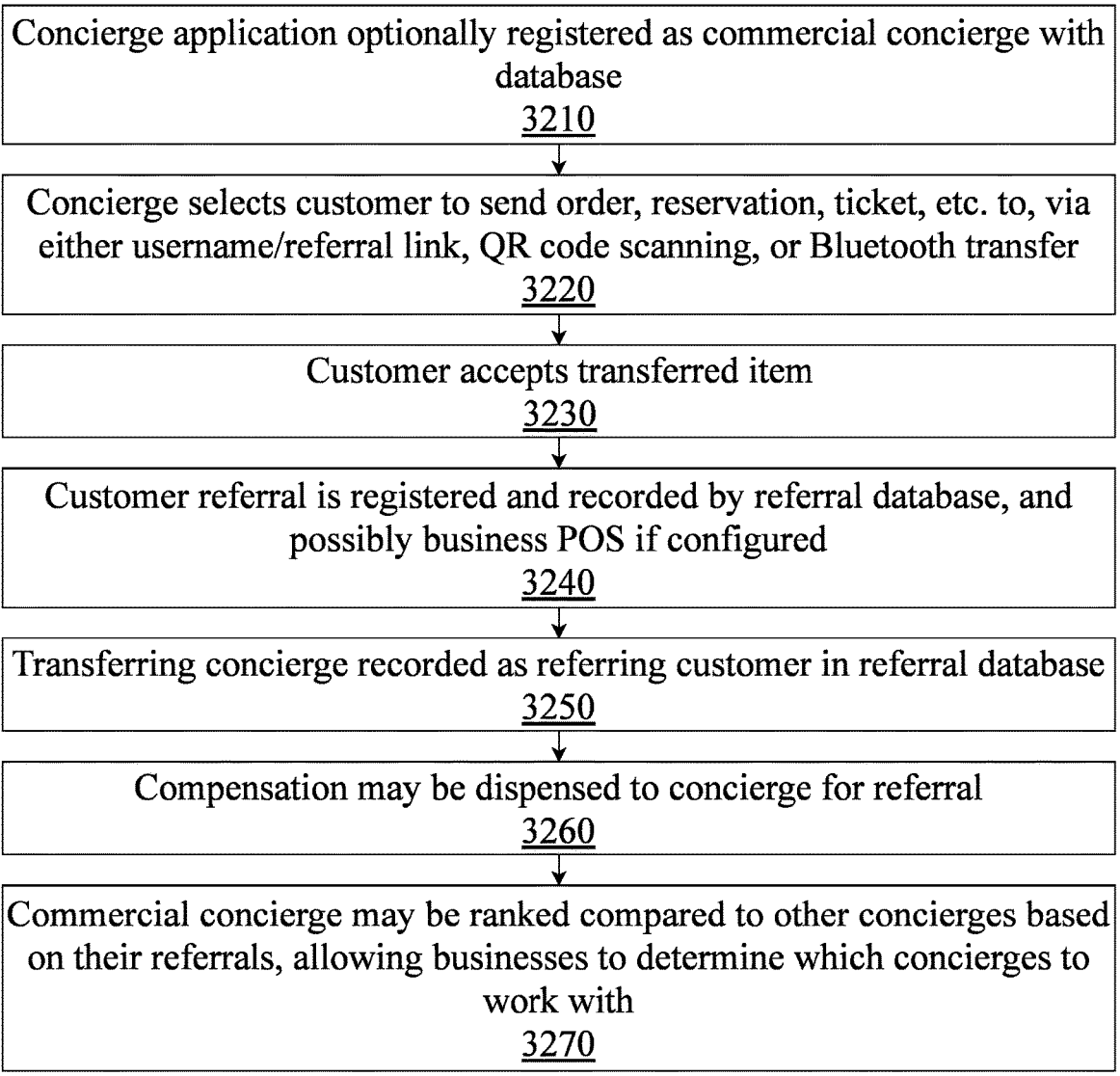
FIG. 32 is a method diagram illustrating steps in a customer or commercial concierge transferring an order or reservation item to another customer using a concierge application.

FIG. 32 is a method diagram illustrating steps in a customer or commercial concierge transferring an order or reservation item to another customer using a concierge application. A concierge application may register as a commercial concierge, a separate classification from other concierge applications and accounts, with a referral database 3210 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A concierge, which may or may not be a commercial concierge, first may place an order for a good, service, or reservation, such as an order for a to-go meal at a restaurant across town, or a ticket for a play on a specified date, and then chooses the item, reservation, or service that they have ordered, that they wish to send to another concierge account user 3220. For instance, a user may register for a cruise trip for one person, then give that to someone else for a birthday gift, using the application for management of the ticket and transfer of it to their friend or loved one. The user that is receiving the transferred good must accept it on their application, so that they do not receive goods or services or reservations they do not want, and the offering user does not transfer goods, services, or reservations wastefully 3230. The customer referral and change of ownership of the ordered good, service, or reservation, may be recorded in either or both a referral database, and a business' POS or inventory management or customer management system 3240, to ensure accurate tracking of the owner of the good, product, service, or reservation in question. The concierge account may then be recorded as getting the referral in a referral database 3250, for recordkeeping purposes, such as if a success/fail ratio of referring customers may influence the rates at which the concierge is compensated for future referrals to the application. The compensation, if any, may then be dispersed to the concierge, after the customer is referred 3260. This may be done with a point of sale system connected to the business and a smart wallet application owned by the commercial concierge, or some other financial arrangement such as a direct deposit for the concierge, or a coupon or discount on future goods ordered from a business. The commercial concierge may be ranked compared to other concierges based on their referrals and their success/failure ratio 3270, as previously described, allowing for a gamification to take place and for competition to encourage commercial concierges to entice customers more successfully.

Figure 33:
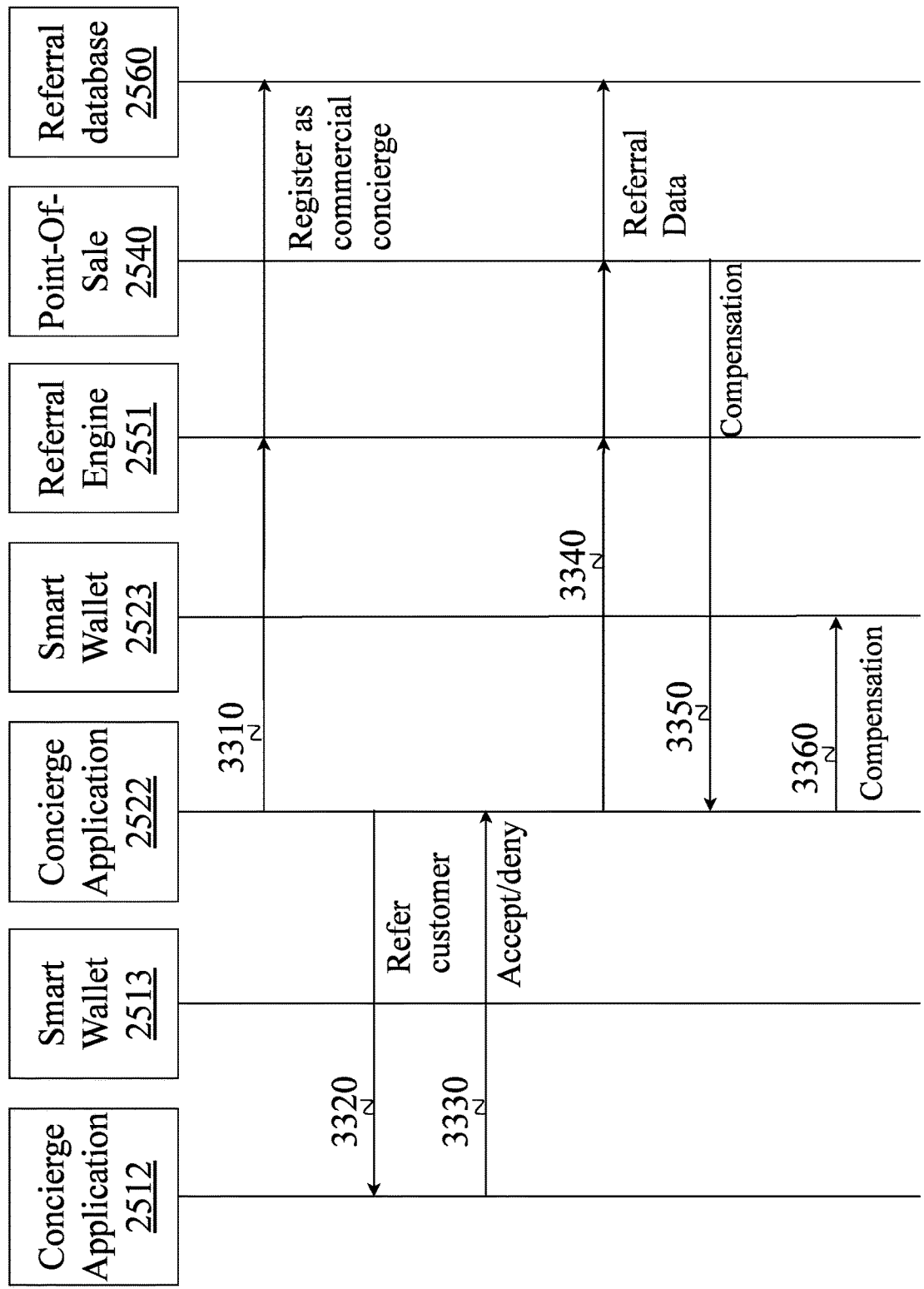
FIG. 33 is a message flow diagram illustrating messages exchanged in a commercial concierge account referring a user to other businesses, and placing orders or reservations for the user.

FIG. 33 is a message flow diagram illustrating messages exchanged in a commercial concierge account referring a user to other businesses, and placing orders or reservations for the user. A customer mobile device may be used by a regular business customer such as a restaurant diner, shopper, or similar. Such a mobile device may be a smartphone such as an IPHONE™, a phone operating an ANDROID™ operating system, other configurations of smartphones, a tablet, a personal digital assistant, or another type of mobile device capable of communicating wirelessly with other devices and networks such as over WiFi or BLUETOOTH™. Each such device must have a network adapter that is capable of communicating with local or wide area networks (LAN or WAN respectively) or with other devices wirelessly, a concierge application 2512, 2522, and a smart wallet application 2513, 2523. A concierge application 2512, 2522 may be written in any number of programming languages including JAVA™, C, C#™, GO™, JAVASCRIPT™, or a combination of programming languages. A concierge application 2512, 2522 may be designed to communicate with a server and referral engine 2551 over a network, a business point-of-sale ("POS") 2540 over a network or directly such as with a BLUETOOTH™ connection, a smart wallet application 2513, 2523, and other devices with concierge applications. The purpose and functionality of such a concierge application 2512, 2522 may be to place business orders and reservations with registered businesses through their POS 2540 either for itself or for another customer that may have a registration with a concierge application server, refer non-users to the concierge application to facilitate the spread of the application among consumers, reimburse such referrers, and help individuals find each other and potentially share, exchange, or give placed orders or reservations to each other if desired, through the concierge application, for facilitating businesses. Such actions may be recorded in a referral database 2560, and compensation may be disbursed through either a hosting or owning company of the concierge application system, or through a business that has had its products referred or ordered via a concierge to another customer, essentially replicating and automating a "finder's fee" or "commission" for possible third-party concierges. A concierge application may register as a commercial concierge, a separate classification from other concierge applications and accounts, with a referral database 3310 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A commercial concierge first may refer a customer concierge application or applications to other businesses 3320, for instance a commercial concierge may be an in-human representative at the front-end of a hotel, and when asked by hotel guests about local attractions, refer them to a specific restaurant, and offer to make reservations for the hotel guests at the restaurant. The referral may take one of several forms on the customer's concierge application, including an emailed or in-application referral link, proximity-based alerts such as with BLUETOOTH™ or infrared scanning, QR code scanning, or the customer manually telling the commercial concierge their username to send the reservation to. Many different potential methods of simply relaying the data about the reservation may be possible in the art. The customer may need to accept the referral or reservation on their own application 3330 to ensure proper security so that a commercial concierge cannot make dubious or outright fraudulent orders or reservations for a customer to earn unjustified commission or other compensations. The commercial concierge account may then be recorded as getting the referral in a referral database 3340, for recordkeeping purposes, such as if a success/fail ratio of referring customers may influence which businesses choose to allow a specific commercial concierge to do business with them, or what their compensation might be (i.e. more successful concierges might be able to command higher compensation for referrals). The compensation, if any, may then be dispersed to the commercial concierge, after the customer accepts the referred order or reservation 3350. This may be done with a point of sale system connected to the business and a smart wallet application owned by the commercial concierge, or some other financial arrangement such as a direct deposit for the concierge, or a coupon or discount on future goods ordered from the business. Such a compensation may also be deposited or recorded in a smart wallet application 3360, hosted on the same device as the concierge application 2522 or on a different device, connected over a secure network such as with HTTPS. The commercial concierge may be ranked compared to other concierges based on their referrals and their success/failure ratio, allowing businesses to determine which concierges to work with, as previously described, allowing for a gamification to take place and for competition to encourage commercial concierges to entice customers more successfully.

Messages exchanged between components on the same device may take the form of inter-process data transfers, local file data reading and writing, accessing data from RAM as is common in computer processes, or interacting with remote services such as web APIs that act as an intermediary between local processes, to process data remotely. Messages exchanged between remote, separate, connected, or network-separated devices, such as multiple mobile devices or a web server and a mobile device, may be exchanged over any one of or a plurality of messaging protocols such as HTTP, TCP, or UTP, and may implement any one of or a plurality of security, encoding, or encrypting techniques and standards to provide secure communications and data transfers between the devices and services.

Figure 34:
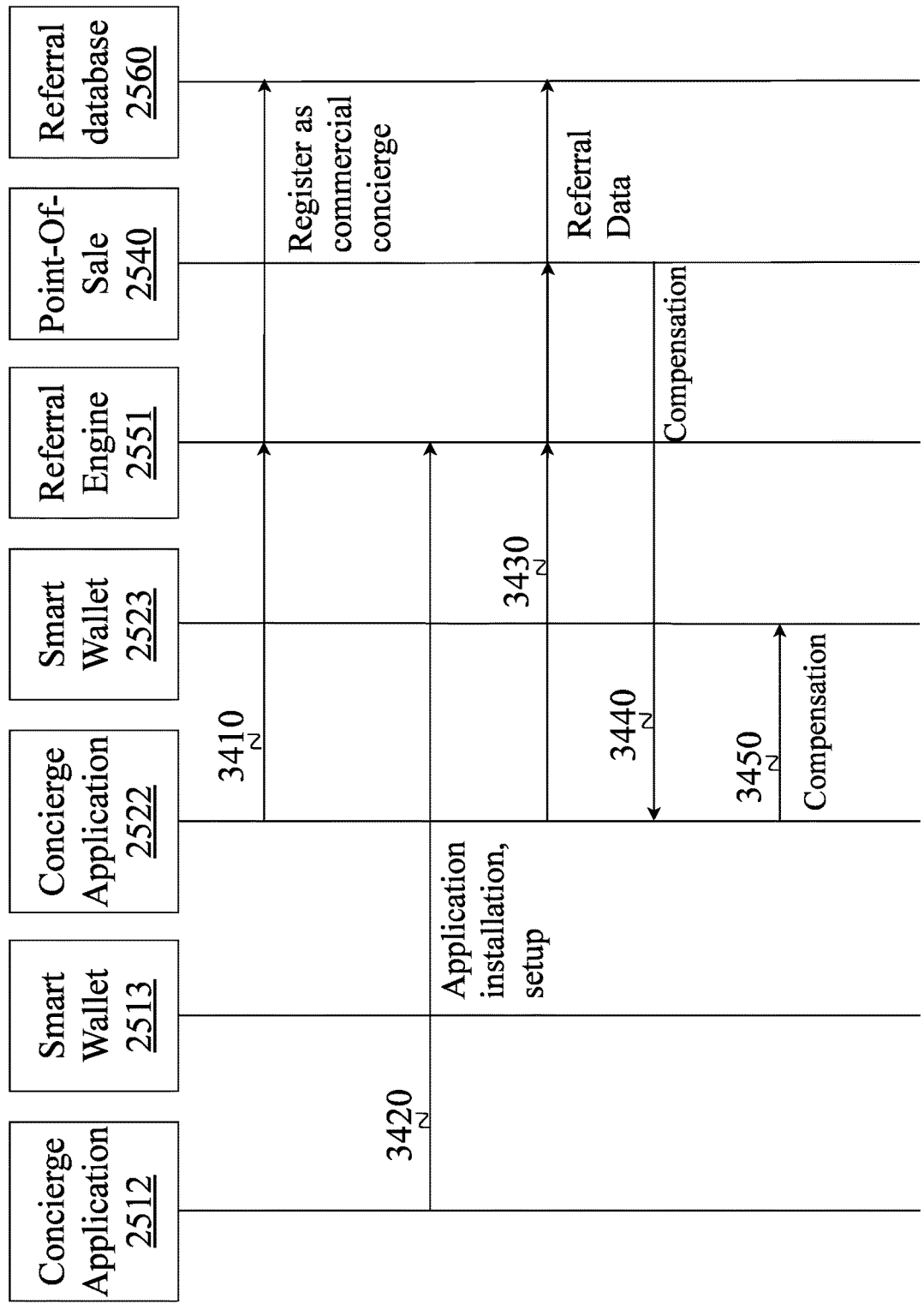
FIG. 34 is a message flow diagram illustrating messages exchanged in a customer signing up for a concierge account, with a business being referral credit based on temporal proximity from the time the account is created and the customer's visit to the business.

FIG. 34 is a message flow diagram illustrating messages exchanged in a customer signing up for a concierge account, with a business being referral credit based on temporal proximity from the time the account is created and the customer's visit to the business. A customer mobile device may be used by a regular business customer such as a restaurant diner, shopper, or similar. Such a mobile device may be a smartphone such as an IPHONE™, a phone operating an ANDROID™ operating system, other configurations of smartphones, a tablet, a personal digital assistant, or another type of mobile device capable of communicating wirelessly with other devices and networks such as over WiFi or BLUETOOTH™. Each such device must have a network adapter that is capable of communicating with local or wide area networks (LAN or WAN respectively) or with other devices wirelessly, a concierge application 2512, 2522, and a smart wallet application 2513, 2523. A concierge application 2512, 2522 may be written in any number of programming languages including JAVA™, C, C#™, GO™, JAVASCRIPT™, or a combination of programming languages. A concierge application 2512, 2522 may be designed to communicate with a server and referral engine 2551 over a network, a business point-of-sale ("POS") 2540 over a network or directly such as with a BLUETOOTH™ connection, a smart wallet application 2513, 2523, and other devices with concierge applications. The purpose and functionality of such a concierge application 2512, 2522 may be to place business orders and reservations with registered businesses through their POS 2540 either for itself or for another customer that may have a registration with a concierge application server, refer non-users to the concierge application to facilitate the spread of the application among consumers, reimburse such referrers, and help individuals find each other and potentially share, exchange, or give placed orders or reservations to each other if desired, through the concierge application, for facilitating businesses. Such actions may be recorded 3430 in a referral database 2560, and compensation may be disbursed through either a hosting or owning company of the concierge application system, or through a business that has had its products referred or ordered via a concierge to another customer, essentially replicating and automating a "finder's fee" or "commission" for possible third-party concierges. A concierge application may register as a commercial concierge, a separate classification from other concierge applications and accounts, with a referral database 3410 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A customer may install the concierge application shortly after visiting a business or dealing with a commercial concierge 3420, the installation being marked in the referral engine 2551 as being a referral from the most recently visited commercial concierge , in the absence of other referral criteria, if a sufficiently recent visit has been made. The commercial concierge account may then be recorded as getting the referral in a referral database 3440, for record-keeping purposes, such as if a success/fail ratio of referring customers may influence which businesses choose to allow a specific commercial concierge to do business with them, or what their compensation might be (i.e. more successful concierges might be able to command higher compensation for referrals). The compensation, if any, may then be dispersed to the commercial concierge, after the customer accepts the referred order or reservation 3450. This may be done with a point of sale system connected to the business and a smart wallet application owned by the commercial concierge, or some other financial arrangement such as a direct deposit for the concierge, or a coupon or discount on future goods ordered from the business. Such a compensation may also be deposited or recorded in a smart wallet application 3460, hosted on the same device as the concierge application 2522 or on a different device, connected over a secure network such as with HTTPS. The commercial concierge may be ranked compared to other concierges based on their referrals and their success/failure ratio, allowing businesses to determine which concierges to work with, as previously described, allowing for a gamification to take place and for competition to encourage commercial concierges to entice customers more successfully.

Messages exchanged between components on the same device may take the form of inter-process data transfers, local file data reading and writing, accessing data from RAM as is common in computer processes, or interacting with remote services such as web APIs that act as an intermediary between local processes, to process data remotely. Messages exchanged between remote, separate, connected, or network-separated devices, such as multiple mobile devices or a web server and a mobile device, may be exchanged over any one of or a plurality of messaging protocols such as HTTP, TCP, or UTP, and may implement any one of or a plurality of security, encoding, or encrypting techniques and standards to provide secure communications and data transfers between the devices and services.

Figure 35:
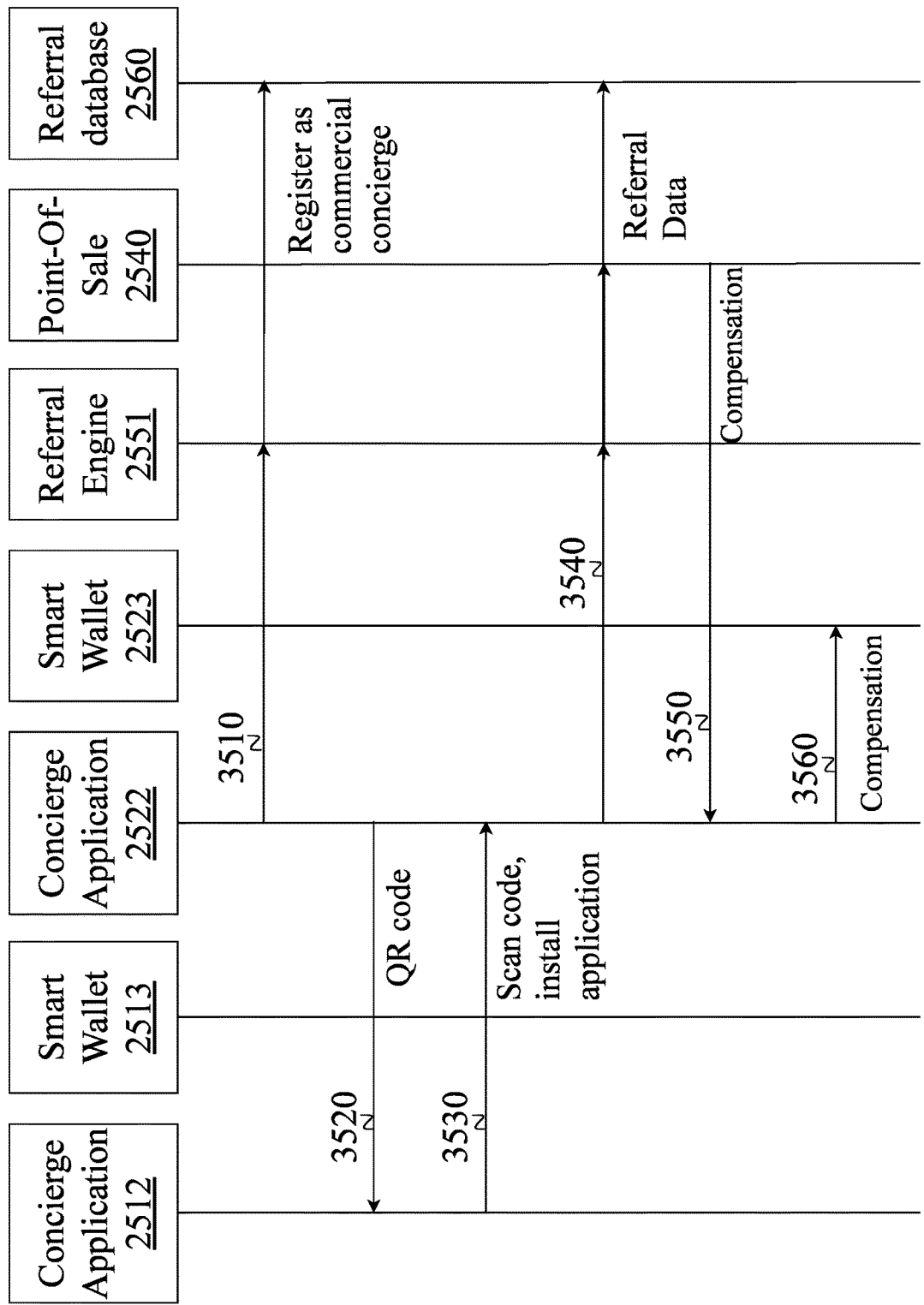
FIG. 35 is a message flow diagram illustrating messages exchanged in a customer signing up for a concierge account via a QR code to be scanned for application download and registration, with the QR code giving referral credit to the referring entity.

FIG. 35 is a message flow diagram illustrating messages exchanged in a customer signing up for a concierge account via a QR code to be scanned for application download and registration, with the QR code giving referral credit to the referring entity. A customer mobile device may be used by a regular business customer such as a restaurant diner, shopper, or similar. Such a mobile device may be a smartphone such as an IPHONE™, a phone operating an ANDROID™ operating system, other configurations of smartphones, a tablet, a personal digital assistant, or another type of mobile device capable of communicating wirelessly with other devices and networks such as over WiFi or BLUETOOTH™. Each such device must have a network adapter that is capable of communicating with local or wide area networks (LAN or WAN respectively) or with other devices wirelessly, a concierge application 2512, 2522, and a smart wallet application 2513, 2523. A concierge application 2512, 2522 may be written in any number of programming languages including JAVA™, C, C#™, GO™, JAVASCRIPT™, or a combination of programming languages. A concierge application 2512, 2522 may be designed to communicate with a server and referral engine 2551 over a network, a business point-of-sale ("POS") 2540 over a network or directly such as with a BLUETOOTH™ connection, a smart wallet application 2513, 2523, and other devices with concierge applications. The purpose and functionality of such a concierge application 2512, 2522 may be to place business orders and reservations with registered businesses through their POS 2540 either for itself or for another customer that may have a registration with a concierge application server, refer non-users to the concierge application to facilitate the spread of the application among consumers, reimburse such referrers, and help individuals find each other and potentially share, exchange, or give placed orders or reservations to each other if desired, through the concierge application, for facilitating businesses. Such actions may be recorded in a referral database 2560, and compensation may be disbursed through either a hosting or owning company of the concierge application system, or through a business that has had its products referred or ordered via a concierge to another customer, essentially replicating and automating a "finder's fee" or "commission" for possible third-party concierges. A concierge application may register as a commercial concierge, a separate classification from other concierge applications and accounts, with a referral database 3510 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A commercial concierge first may refer a customer to install a concierge application with a QR code that may be scanned by a mobile device 3520, for instance a commercial concierge may be an in-human representative at the front-end of a hotel, and when asked by hotel guests about local attractions, refer them first to the application, or having a poster or pamphlet with the QR code printed in it to help customers access the application. The referral in this instance takes the form of a QR code scan, whereby the QR code, when scanned, may cause an app store such as GOOGLE PLAY™ to be accessed, or a URL with data about the referring concierge or business being delivered to a referral engine 2551. Many different potential methods of simply relaying the data about the reservation may be possible in the art. The customer may then install the application 3530, after which the commercial concierge account may then be recorded as getting the referral in a referral database 3540, for record-keeping purposes, such as if a success/fail ratio of referring customers may influence which businesses choose to allow a specific commercial concierge to do business with them, or what their compensation might be (i.e. more successful concierges might be able to command higher compensation for referrals). The compensation, if any, may then be dispersed to the commercial concierge, after the customer accepts the referred order or reservation 3550. This may be done with a point of sale system connected to the business and a smart wallet application owned by the commercial concierge, or some other financial arrangement such as a direct deposit for the concierge, or a coupon or discount on future goods ordered from the business. Such a compensation may also be deposited or recorded in a smart wallet application 3560, hosted on the same device as the concierge application 2522 or on a different device, connected over a secure network such as with HTTPS. The commercial concierge may be ranked compared to other concierges based on their referrals and their success/failure ratio, allowing businesses to determine which concierges to work with, as previously described, allowing for a gamification to take place and for competition to encourage commercial concierges to entice customers more successfully.

Messages exchanged between components on the same device may take the form of inter-process data transfers, local file data reading and writing, accessing data from RAM as is common in computer processes, or interacting with remote services such as web APIs that act as an intermediary between local processes, to process data remotely. Messages exchanged between remote, separate, connected, or network-separated devices, such as multiple mobile devices or a web server and a mobile device, may be exchanged over any one of or a plurality of messaging protocols such as HTTP, TCP, or UTP, and may implement any one of or a plurality of security, encoding, or encrypting techniques and standards to provide secure communications and data transfers between the devices and services.

Figure 36:
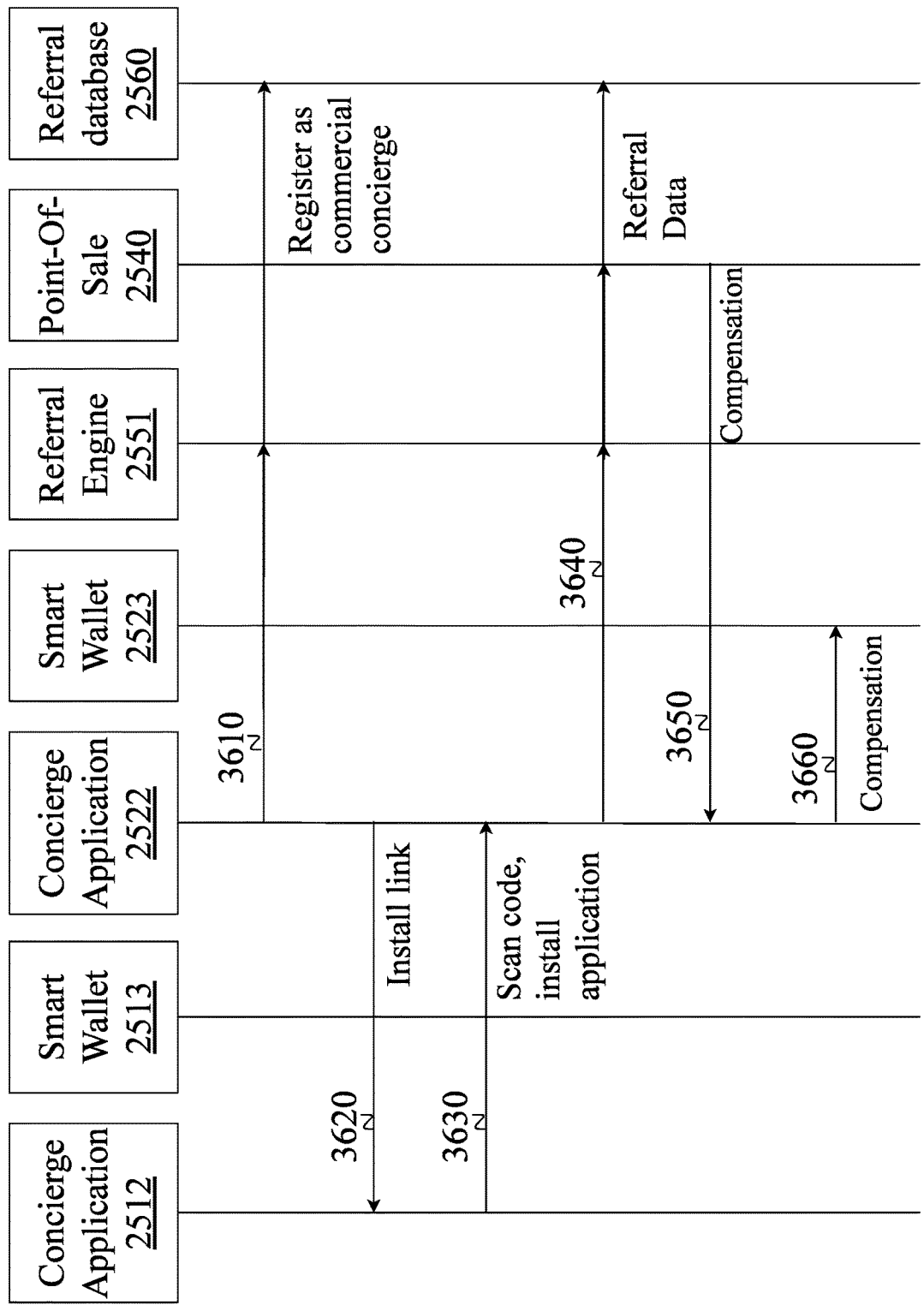
FIG. 36 is a message flow diagram illustrating messages exchanged in a customer signing up for a concierge account via a referral code or referral link, acquired from another concierge or referring business, with the referring link or code giving referral credit to the referring entity.

FIG. 36 is a message flow diagram illustrating messages exchanged in a customer signing up for a concierge account via a referral code or referral link, acquired from another concierge or referring business, with the referring link or code giving referral credit to the referring entity. A customer mobile device may be used by a regular business customer such as a restaurant diner, shopper, or similar. Such a mobile device may be a smartphone such as an IPHONE™, a phone operating an ANDROID™ operating system, other configurations of smartphones, a tablet, a personal digital assistant, or another type of mobile device capable of communicating wirelessly with other devices and networks such as over WiFi or BLUETOOTH™. Each such device must have a network adapter that is capable of communicating with local or wide area networks (LAN or WAN respectively) or with other devices wirelessly, a concierge application 2512, 2522, and a smart wallet application 2513, 2523. A concierge application 2512, 2522 may be written in any number of programming languages including JAVA™, C, C#™, GO™, JAVASCRIPT™, or a combination of programming languages. A concierge application 2512, 2522 may be designed to communicate with a server and referral engine 2551 over a network, a business point-of-sale ("POS") 2540 over a network or directly such as with a BLUETOOTH™ connection, a smart wallet application 2513, 2523, and other devices with concierge applications. The purpose and functionality of such a concierge application 2512, 2522 may be to place business orders and reservations with registered businesses through their POS 2540 either for itself or for another customer that may have a registration with a concierge application server, refer non-users to the concierge application to facilitate the spread of the application among consumers, reimburse such referrers, and help individuals find each other and potentially share, exchange, or give placed orders or reservations to each other if desired, through the concierge application, for facilitating businesses. Such actions may be recorded in a referral database 2560, and compensation may be disbursed through either a hosting or owning company of the concierge application system, or through a business that has had its products referred or ordered via a concierge to another customer, essentially replicating and automating a "finder's fee" or "commission" for possible third-party concierges. A concierge application may register as a commercial concierge, a separate classification from other concierge applications and accounts, with a referral database 3610 over a network such as the Internet. A referral database may be accessed through an intermediary server, or may be hosted on a server that also operates an engine or Application Programming Interface ("API") for accessing and writing data into the database, such as with a Representational State Transfer ("REST") API. A commercial concierge differs from other concierge application accounts in that it is capable of referring other customers to download and install the concierge application, and capable of referring customers to third party businesses for the purchase of products or reservations that a customer might be interested in, potentially in exchange for compensation or a commission from the business. A commercial concierge first may refer a customer to install a concierge application with a referral link that may be scanned by a mobile device 3620, for instance a commercial concierge may be an in-human representative at the front-end of a hotel, and when asked by hotel guests about local attractions, refer them first to the application, or having a poster or pamphlet with the referral link printed in it to help customers access the application, or send the link to them via text, email, or some other manner. The referral in this instance takes the form of a referral link tap or click, whereby the referral link, when tapped or clicked, may cause an app store such as GOOGLE PLAY™ to be accessed, or a URL with data about the referring concierge or business being delivered to a referral engine 2551. Many different potential methods of simply relaying the data about the reservation may be possible in the art. The customer may then install the application 3630, after which the commercial concierge account may then be recorded as getting the referral in a referral database 3640, for recordkeeping purposes, such as if a success/fail ratio of referring customers may influence which businesses choose to allow a specific commercial concierge to do business with them, or what their compensation might be (i.e. more successful concierges might be able to command higher compensation for referrals). The compensation, if any, may then be dispersed to the commercial concierge, after the customer accepts the referred order or reservation 3650. This may be done with a point of sale system connected to the business and a smart wallet application owned by the commercial concierge, or some other financial arrangement such as a direct deposit for the concierge, or a coupon or discount on future goods ordered from the business. Such a compensation may also be deposited or recorded in a smart wallet application 3660, hosted on the same device as the concierge application 2522 or on a different device, connected over a secure network such as with HTTPS. The commercial concierge may be ranked compared to other concierges based on their referrals and their success/failure ratio, allowing businesses to determine which concierges to work with, as previously described, allowing for a gamification to take place and for competition to encourage commercial concierges to entice customers more successfully.

Messages exchanged between components on the same device may take the form of inter-process data transfers, local file data reading and writing, accessing data from RAM as is common in computer processes, or interacting with remote services such as web APIs that act as an intermediary between local processes, to process data remotely. Messages exchanged between remote, separate, connected, or network-separated devices, such as multiple mobile devices or a web server and a mobile device, may be exchanged over any one of or a plurality of messaging protocols such as HTTP, TCP, or UTP, and may implement any one of or a plurality of security, encoding, or encrypting techniques and standards to provide secure communications and data transfers between the devices and services.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
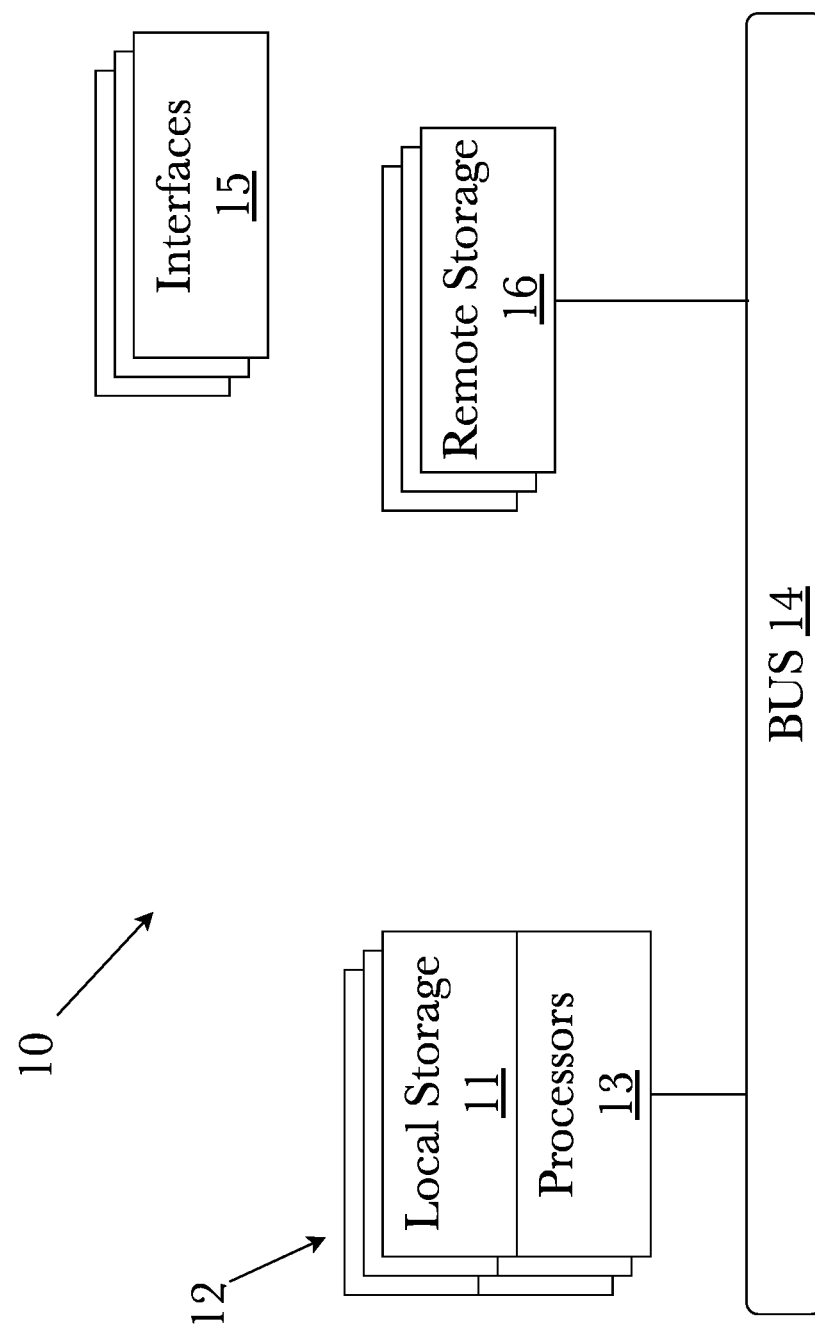
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
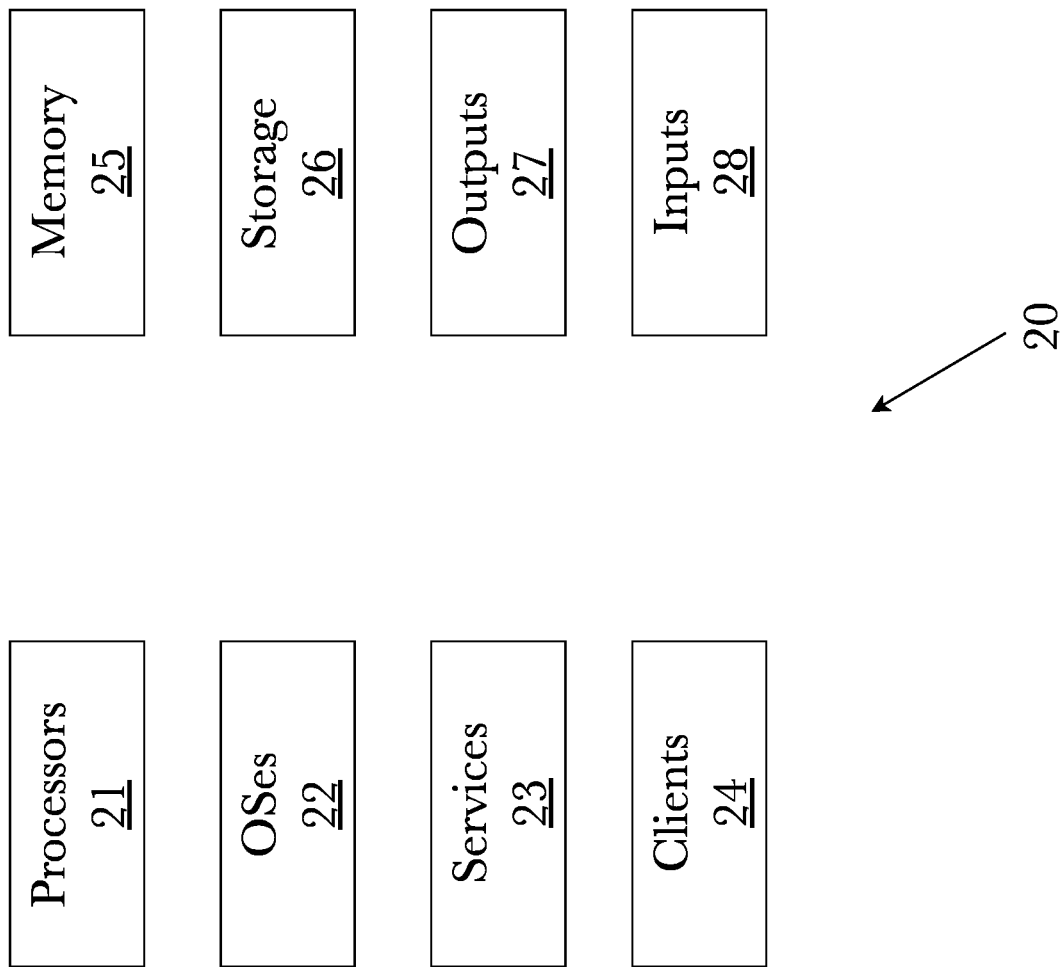
FIG. 12 is a block diagram illustrating an exemplary logical architecture for a client device.

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
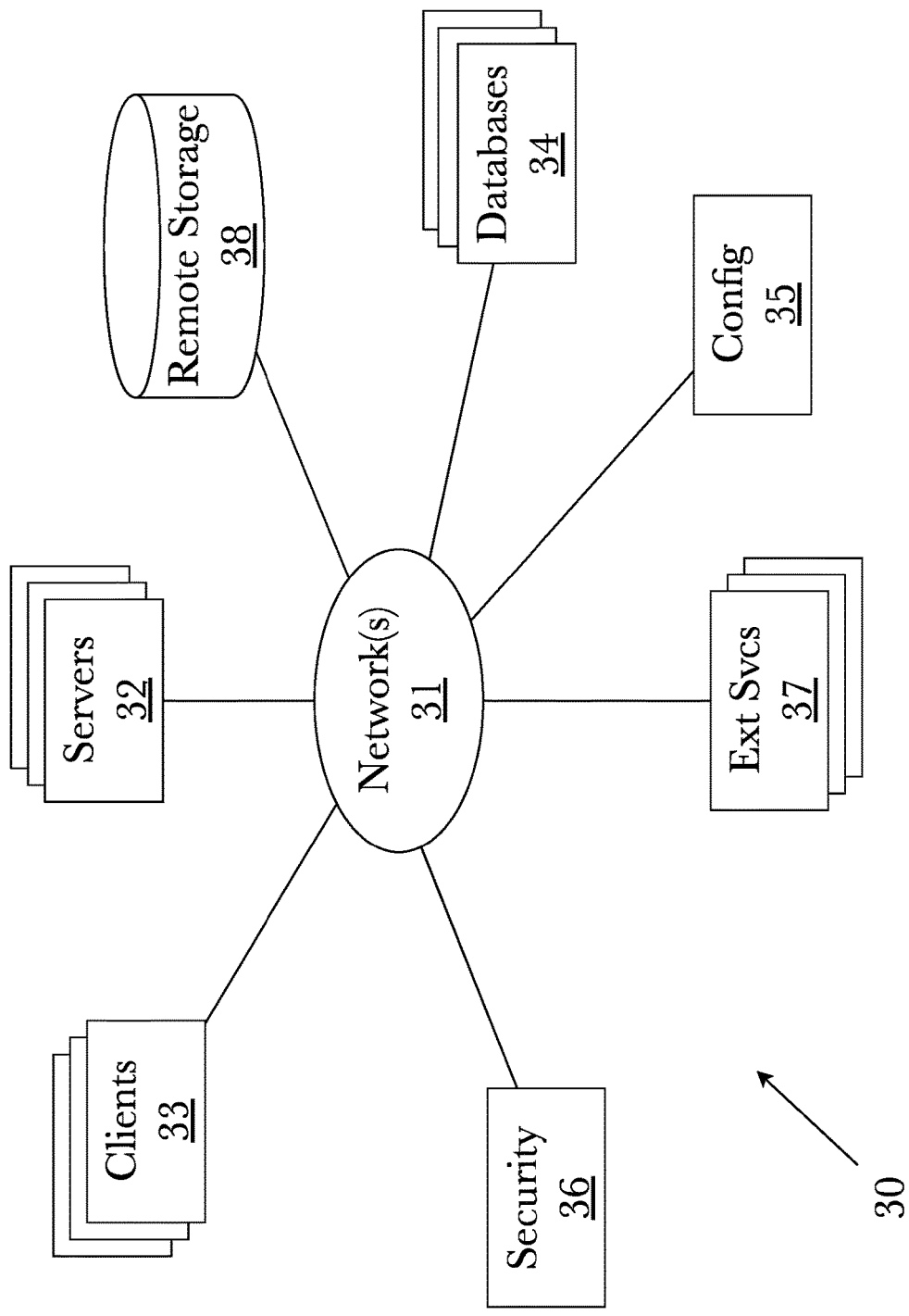
FIG. 13 is a block diagram showing an exemplary architectural arrangement of clients, servers, and external services.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation unless a specific security 36 or configuration system 35 or approach is specifically required by the description of any specific aspect.

Figure 14:
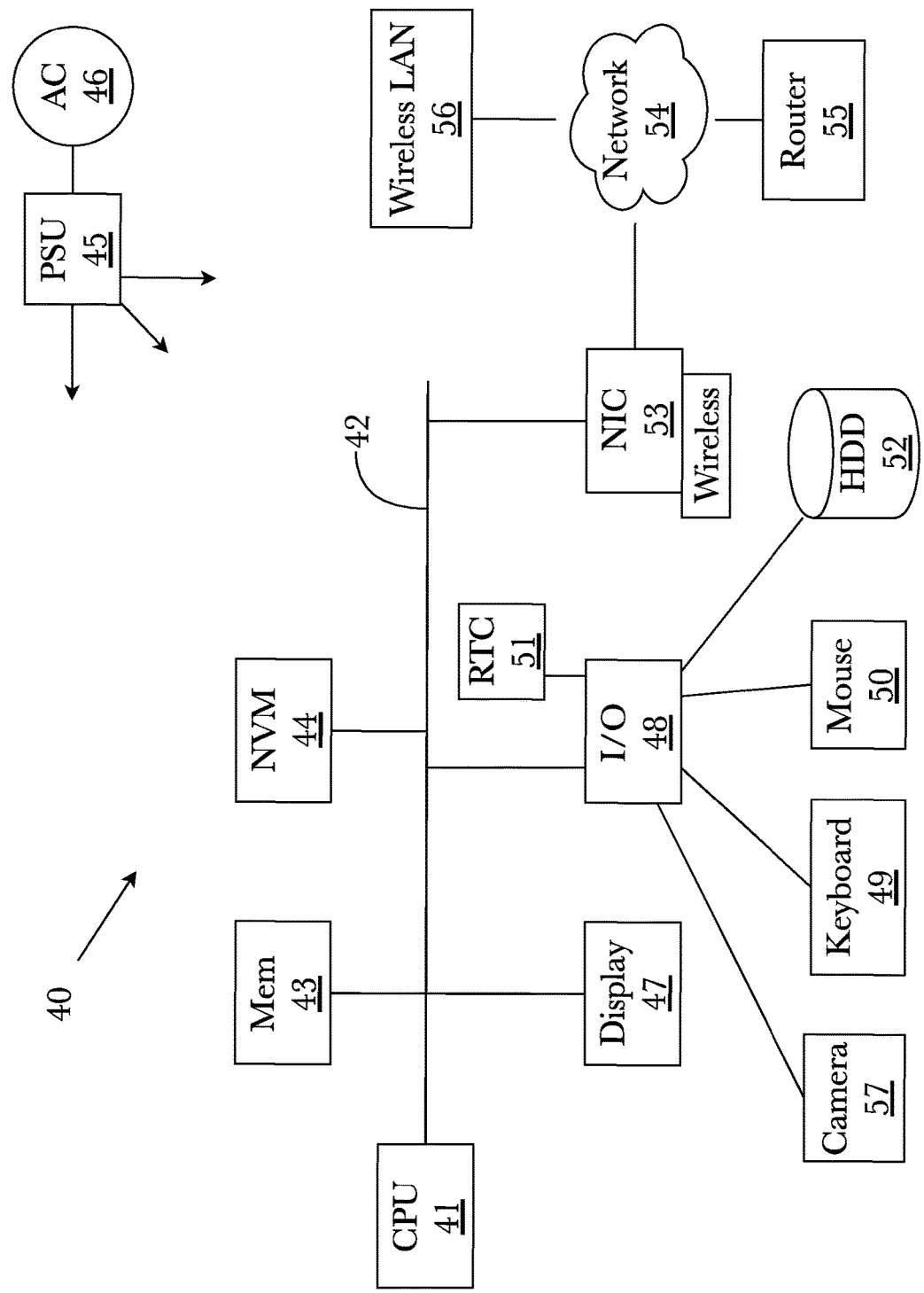
FIG. 14 is another block diagram illustrating an exemplary hardware architecture of a computing device.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for customer and business referrals with a concierge system, comprising:
    a referral engine comprising a memory, a processor, and a plurality of programming instructions stored in the memory, and operating on the processor, wherein the plurality of programming instructions, when operating on the processor, cause the referral engine to communicate with a mobile device operating a concierge application;
    register the mobile device as a commercial concierge;
    store a registration record of the commercial concierge;
    wherein the commercial concierge may receive compensation for referring non-users of a concierge application to install and use the concierge application, or for sending product orders or business reservations to other users of a concierge application;
    register a plurality of businesses as concierge affiliates, wherein a concierge affiliate provides compensation to the commercial concierge based on the stored registration record for the commercial concierge;
    store a record of all successful and unsuccessful referral attempts by the commercial concierge; and
    store a record of the compensation distributed to the commercial concierge
    wherein the commercial concierge is independent of any retail business establishment.

2. The system of claim 1, wherein compensation is not given to a commercial concierge for referring a user to download the concierge application.

3. The system of claim 1, wherein compensation is not given to a commercial concierge for sending or receiving a product order or business reservation to or from another mobile device.

4. The system of claim 1, wherein the compensation is dispersed and received via a smart wallet.

5. A method for customer and business referral with a concierge system, comprising the steps of:
    communicating with a mobile device operating a concierge application;
    registering the mobile device as a commercial concierge;
    storing a registration record of the commercial concierge;
    wherein the commercial concierge may receive compensation for referring non-users of a concierge application to install and use the concierge application, or for sending product orders or business reservations to other users of a concierge application;
    registering a plurality of businesses as concierge affiliates, wherein a concierge affiliate provides compensation to the commercial concierge based on the stored registration record for the commercial concierge;
    storing a record of all successful and unsuccessful referral attempts by the commercial concierge; and
    storing a record of the compensation distributed to the commercial concierge;
    wherein the commercial concierge is independent of any retail business establishment.

6. The method of claim 5, wherein compensation is not given to a commercial concierge for referring a user to download the concierge application.

7. The method of claim 5, wherein compensation is not given to a commercial concierge for sending or receiving a product order or business reservation to or from another mobile device.

8. The method of claim 5, wherein the compensation is dispersed and received via a smart wallet.

* * * * *